US006205434B1

(12) United States Patent
Ryan et al.

(10) Patent No.: US 6,205,434 B1
(45) Date of Patent: Mar. 20, 2001

(54) COMPUTERIZED INDENTURE PLAN ALLOCATION DETERMINATION MANAGEMENT AND REPORTING SYSTEM

(75) Inventors: Raymond B. Ryan, Darien; Wendy J. Engel, Norwalk, both of CT (US)

(73) Assignee: The Evergreen Group Incorporated, Stamford, CT (US)

( * ) Notice: Subject to any disclaimer, the term of this patent is extended or adjusted under 35 U.S.C. 154(b) by 0 days.

(21) Appl. No.: 08/574,057

(22) Filed: Dec. 18, 1995

(51) Int. Cl.[7] .................................................. G06F 17/60

(52) U.S. Cl. ............................... 705/35; 705/36; 707/104

(58) Field of Search .............................. 705/1, 4, 30, 35, 705/36; 707/102, 104; 364/400; 700/90

(56) References Cited

U.S. PATENT DOCUMENTS

| 4,346,442 | 8/1982 | Musmanno | 364/408 |
| 4,376,978 | 3/1983 | Musmanno | 364/408 |
| 4,597,046 | 6/1986 | Musmanno et al. | 364/408 |
| 4,642,768 | 2/1987 | Roberts | 364/408 |
| 4,648,037 | 3/1987 | Valentino | 364/408 |
| 4,674,044 | 6/1987 | Kalmus et al. | 364/408 |
| 4,700,297 | 10/1987 | Hagel, Sr. et al. | 364/408 |
| 4,722,055 | 1/1988 | Roberts | 364/408 |
| 4,742,457 | 5/1988 | Leon et al. | 364/408 |
| 4,750,119 | 6/1988 | Cohen et al. | 364/401 |
| 4,750,121 | 6/1988 | Halley et al. | 364/408 |

(List continued on next page.)

OTHER PUBLICATIONS

Deloitte & Touche, *Emerging Issues Task Force Minutes/Issue Summaries*, Dec. 18, 1992, Issue 93–3, 14 pgs.

Kra et al., Retiree Medical Benefits: Making the Fund or Finance Decision, The Journal of Corporate Accounting & Finance, Spring 1992, pp. 285–301.

Uyl et al, Funding Retiree Health Benefits With Life Insurance in a Veba, Journal of Compensation and Benefits, May/Jun. 1992, pp. 22–31.

Dankner et al., Your Retiree Health Benefits Plan: Good Design, Safe Fundings,Financial Executive, Mar./Apr. 1991, pp. 47–54.

How to Meet Your OPEB Obligation, Financial Executive, Jan./Feb. 1992, pp. 17–26.

Ryan et al., Fund OPEB Now, Not Later, Financial Executive, May/Jun. 1992, pp. 46–47.

Alice Jacobs Carles, Esq., *Non–Qualified Deferred Compensation*, Feb., 1995.

Institute for International Research Insurance Division, *Financing & Funding Executi8ve Benefits*, Jan.,1995.

*Primary Examiner*—Edward R. Cosimano
(74) *Attorney, Agent, or Firm*—Peter K. Trzyna, Esq.

(57) ABSTRACT

A computerized indenture plan allocation determination, management and reporting system and method is disclosed. The system determines allocations relating to an indenture plan, manages indenture plan assets and reports allocation information to an administration system. The system includes a controller and a number of user workstations. The controller is coupled to administration system. The controller receives indenture plan information electronically transmitted from the administration system. The user workstations, also coupled to the controller, electronically transmits expense information to the controller. The controller, upon receipt of the expense information, determines allocation information for the indenture plan, determines management information as a function of the indenture plan information, and electronically transmits the allocation information and the management information to the administration system and/or some or all of the user workstations. In short, the controller monitors corporate benefits paid, compares corporate benefits paid to cumulative life insurance policy distributions and compares unreimbursed corporate benefit expenses with life insurance policy benefits payable to determine an amount available for distribution.

66 Claims, 41 Drawing Sheets

U.S. PATENT DOCUMENTS

| | | | |
|---|---|---|---|
| 4,751,640 | 6/1988 | Lucas et al. | 364/408 |
| 4,752,877 | 6/1988 | Roberts et al. | 364/408 |
| 4,774,663 | 9/1988 | Musmanno et al. | 364/408 |
| 4,837,693 | 6/1989 | Schotz | 364/408 |
| 4,839,804 | 6/1989 | Roberts et al. | 364/408 |
| 4,876,648 | 10/1989 | Lloyd | 364/408 |
| 4,885,685 | 12/1989 | Wolfberg et al. | 364/401 |
| 4,933,842 | 6/1990 | Durbin et al. | 364/408 |
| 4,953,085 | 8/1990 | Atkins | 364/408 |
| 4,969,094 | 11/1990 | Halley et al. | 364/408 |
| 4,975,840 | 12/1990 | DeTore et al. | 364/401 |
| 4,994,964 | 2/1991 | Wolfberg et al. | 364/408 |
| 5,025,138 | 6/1991 | Cuervo | 235/379 |
| 5,083,270 | 1/1992 | Gross et al. | 364/408 |
| 5,132,899 | 7/1992 | Fox | 364/408 |
| 5,136,501 | 8/1992 | Silverman et al. | 364/408 |
| 5,136,502 | 8/1992 | Van Remortel et al. | 705/2 |
| 5,191,522 | 3/1993 | Bosco et al. | 364/401 |
| 5,193,056 | 3/1993 | Boes | 364/408 |
| 5,202,827 | 4/1993 | Sober | 364/408 |
| 5,206,803 | 4/1993 | Vitagliano et al. | 364/408 |
| 5,210,687 | 5/1993 | Wolfberg et al. | 364/408 |
| 5,214,579 | 5/1993 | Wolfberg et al. | 364/408 |
| 5,220,500 | 6/1993 | Baird et al. | 364/408 |
| 5,227,967 | 7/1993 | Bailey | 364/408 |
| 5,231,571 | 7/1993 | D'Agostino | 364/408 |
| 5,237,500 | 8/1993 | Perg et al. | 364/408 |
| 5,270,922 | 12/1993 | Higgins | 364/408 |
| 5,291,398 | 3/1994 | Hagan | 364/408 |
| 5,297,032 | 3/1994 | Trojan et al. | 364/408 |
| 5,429,506 | 7/1995 | Brophy et al. | 434/107 |
| 5,446,653 | 8/1995 | Miller | 364/401 |
| 5,479,344 | 12/1995 | Keziah | 364/406 X |
| 5,523,942 | 6/1996 | Tyler et al. | 364/401 |
| 5,590,037 | 12/1996 | Ryan et al. | 395/204 |
| 5,611,052 | 3/1997 | Dykstra et al. | 705/38 |
| 5,613,072 | 3/1997 | Hammond et al. | 705/4 |
| 5,631,828 | 5/1997 | Hagan | 705/4 |
| 5,636,117 | 6/1997 | Rothstein | 705/4 |
| 5,649,116 | 7/1997 | McCoy et al. | 705/38 |
| 5,655,085 | 8/1997 | Ryan | 364/401 R |
| 5,673,402 | 9/1997 | Ryan | 705/38 |

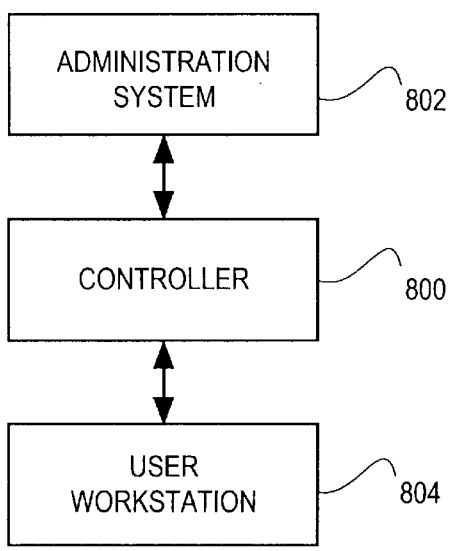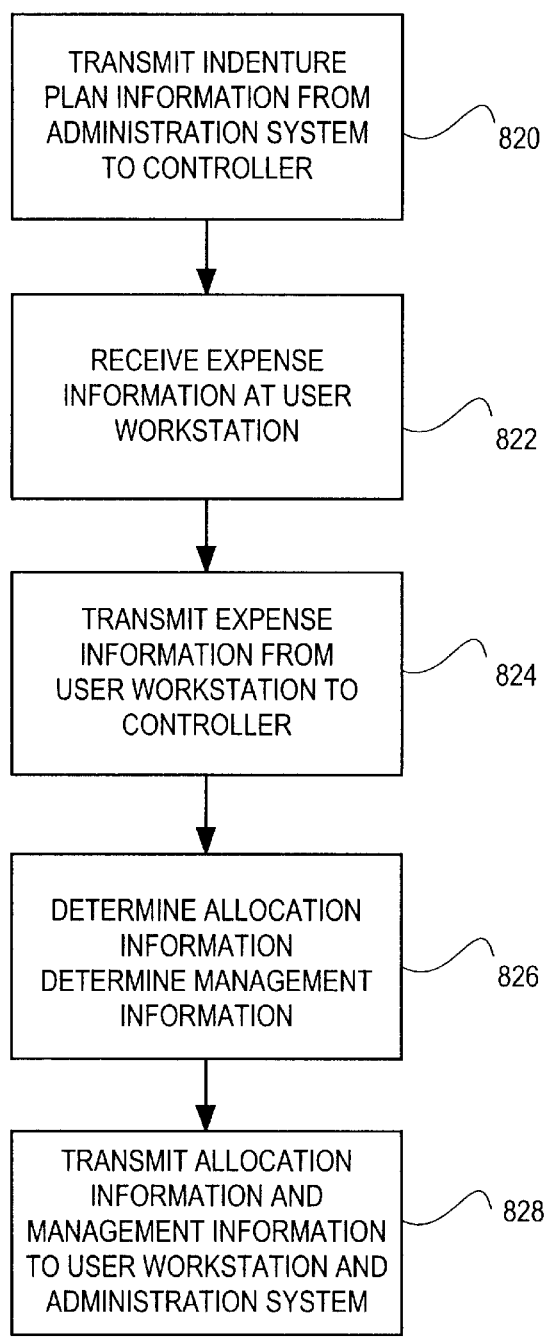

FIG. 3a

 ENTER AND RETURN DENOTE POINTS OF ENTRY INTO AND EXIT FROM A FIXED SECTION OF THE COMPUTER PROGRAM.

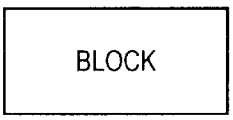 BLOCK DENOTES A FIXED SET OF ACTIONS WHICH EITHER A PERSON OR A COMPUTER PROGRAM PERFORMS.

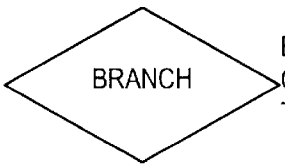 BRANCH DENOTES THE EVALUATION OF A LOGICAL (YES/NO) QUESTION; YES AND NO ANSWERS TO THE QUESTION LEAD TO TWO DIFFERENT SUBSEQUENT LOGICAL PATHS.

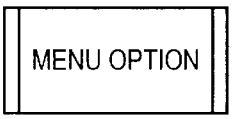 MENU OPTION DENOTES ONE OF SEVERAL CHOICES THAT THE USER OF A COMPUTER PROGRAM CAN MAKE WHEN OPERATION THE PROGRAM; EACH MENU OPTION (EACH CHOICE) LEADS TO A DIFFERENT SUBSEQUENT LOGICAL PATH

 INPUT BLOCK DENOTES A POINT DURING THE EXECUTION OF A COMPUTER PROGRAM AT WHICH A USER MANUALLY ENTERS DATA

 MANUAL STEP DENOTES A SEQUENCE OF ACTIONS WHICH IS PERFORMED BY THE USER OF A COMPUTER PROGRAM IN ORDER TO INTERACT WITH THE PROGRAM

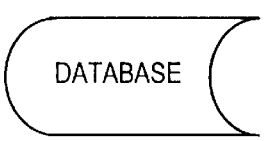 DATABASE IS A DEVICE- -PAPER, ELECTRONIC - FOR STORING DATA.

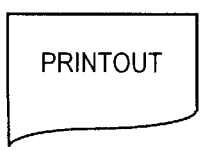 PRINTOUT IS A PAPER REPORT.

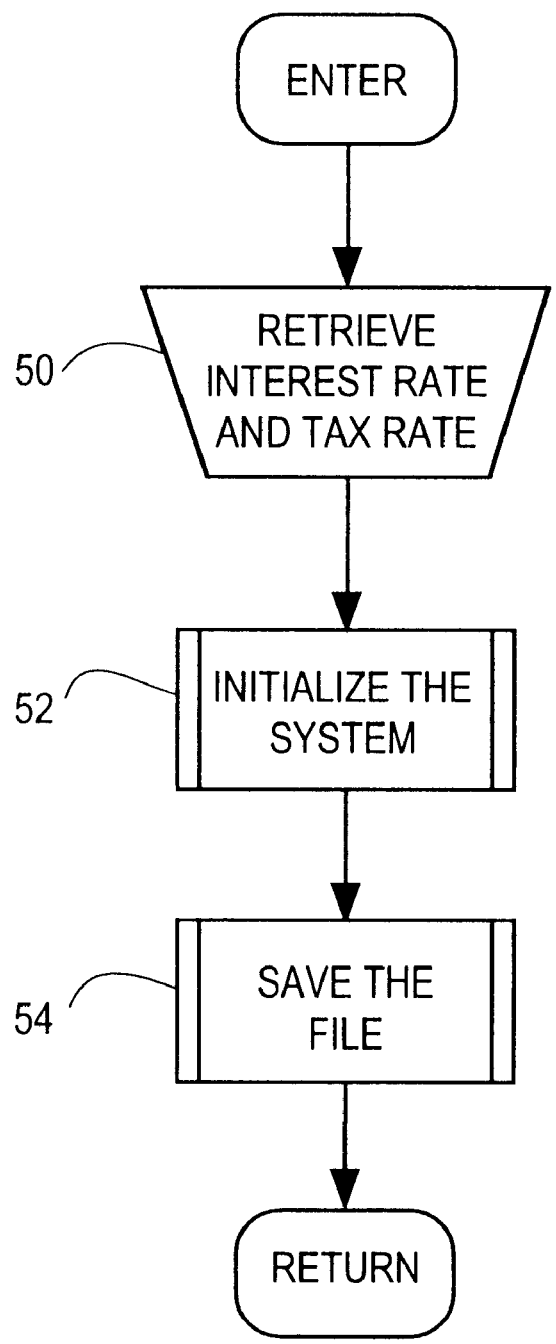

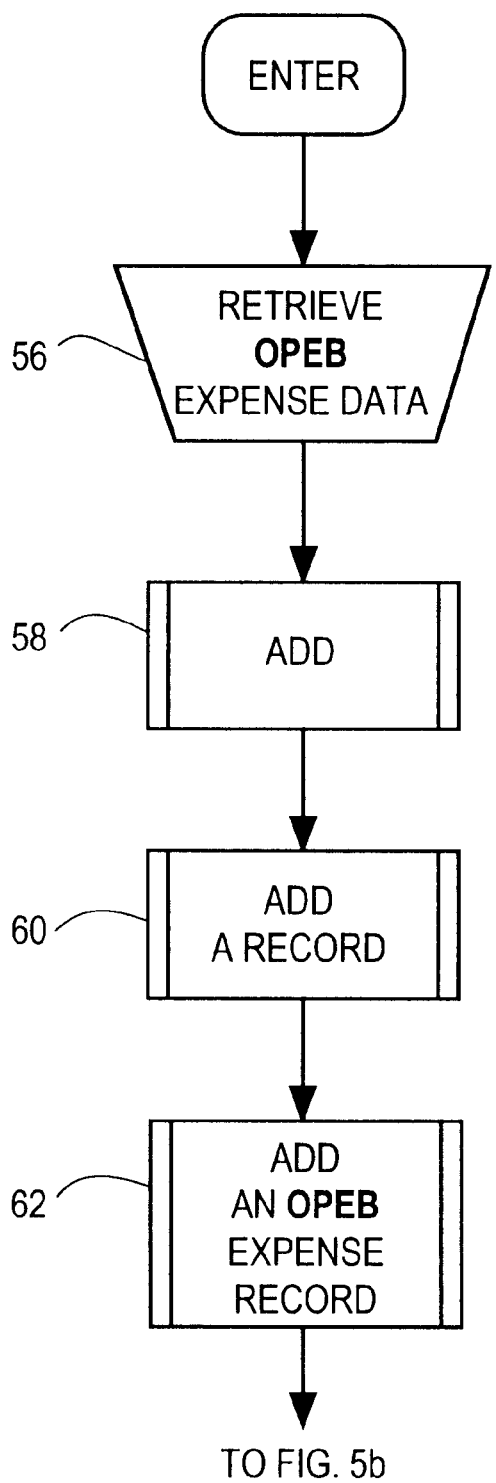

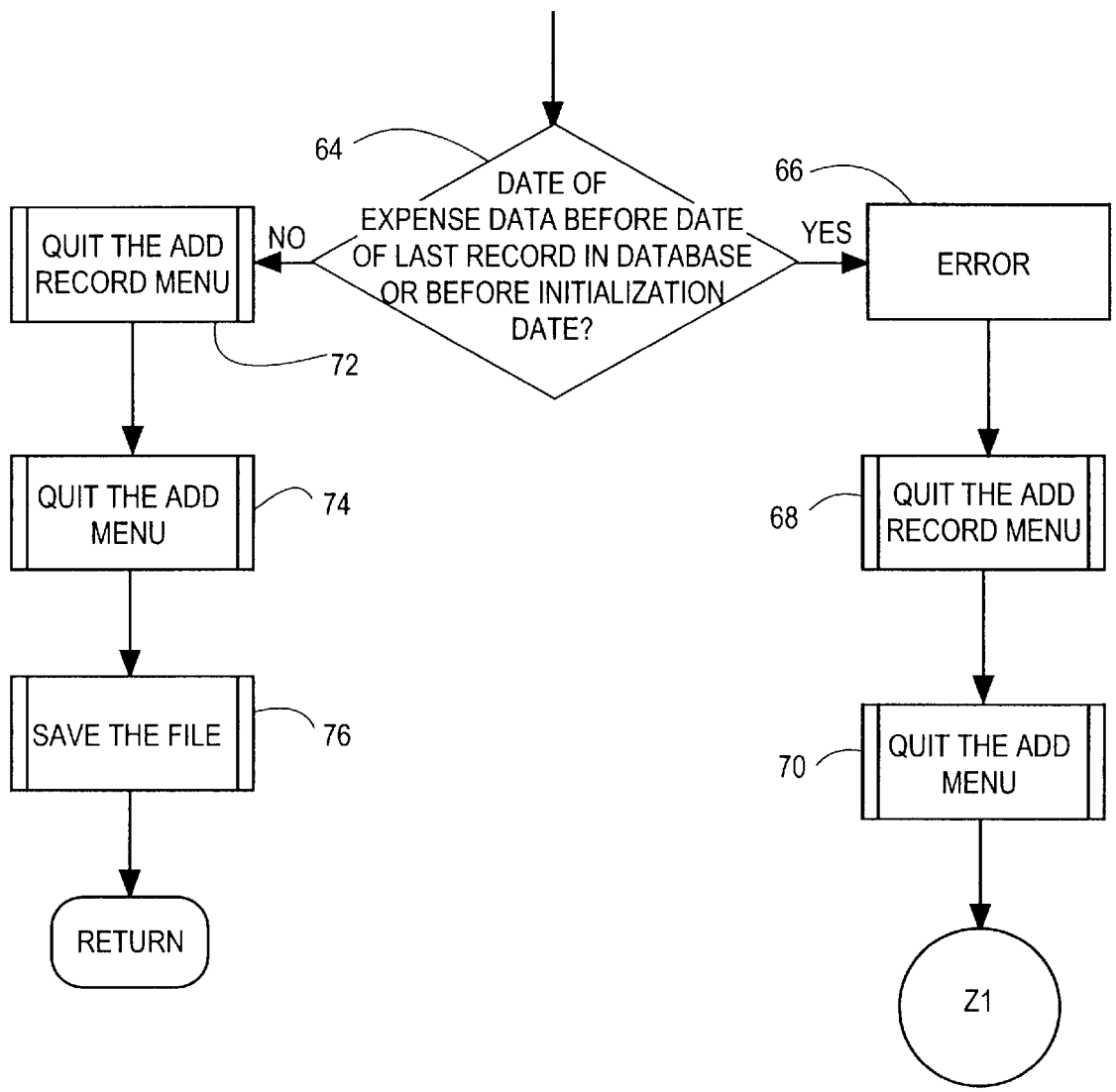

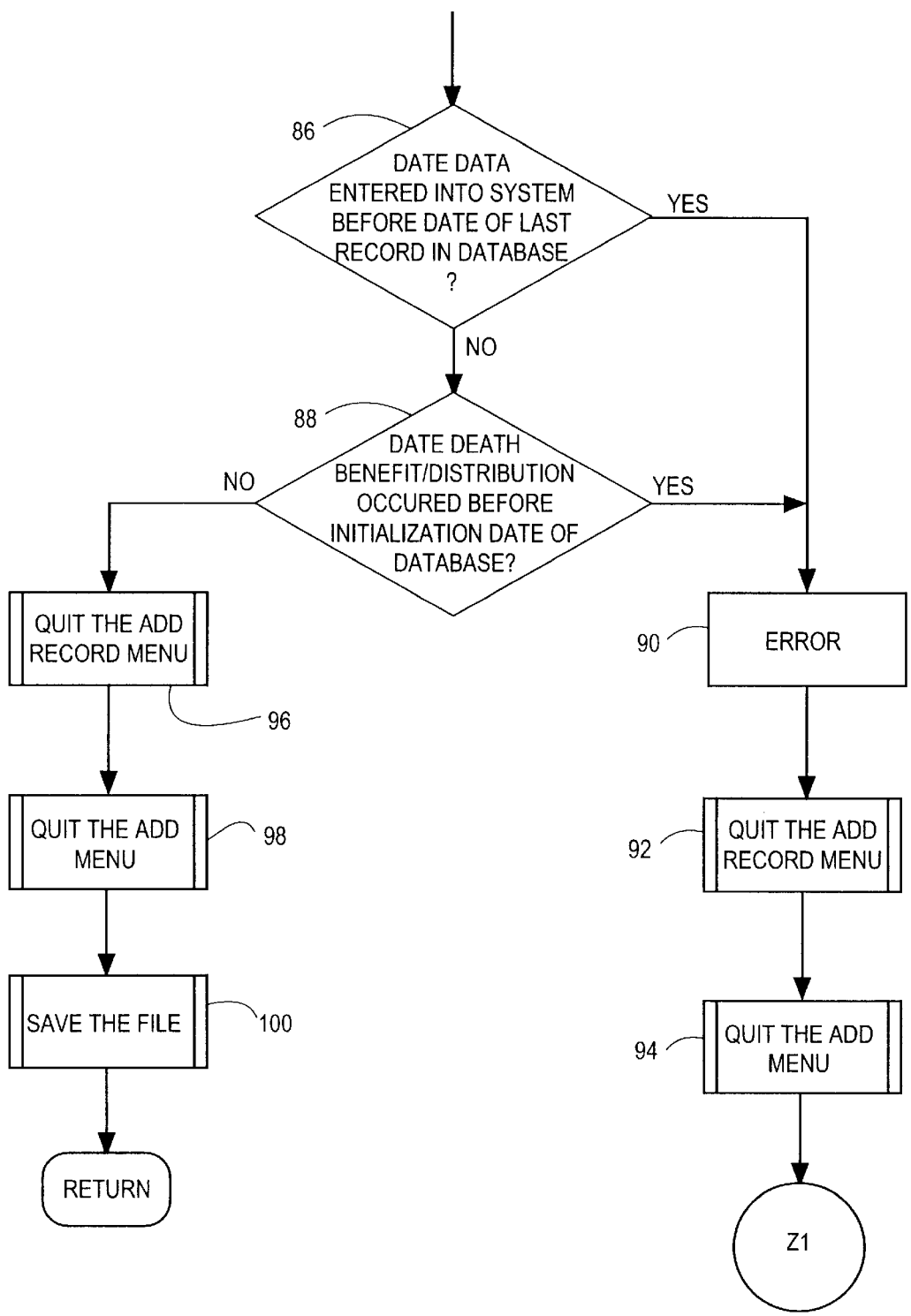

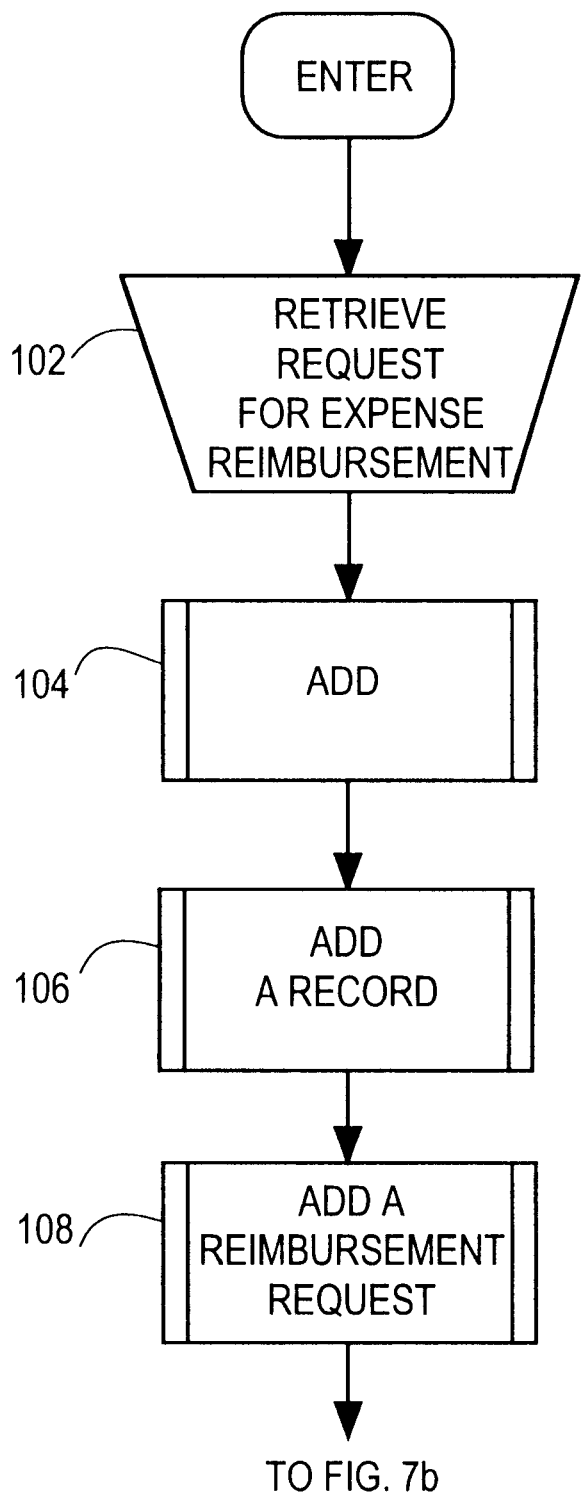

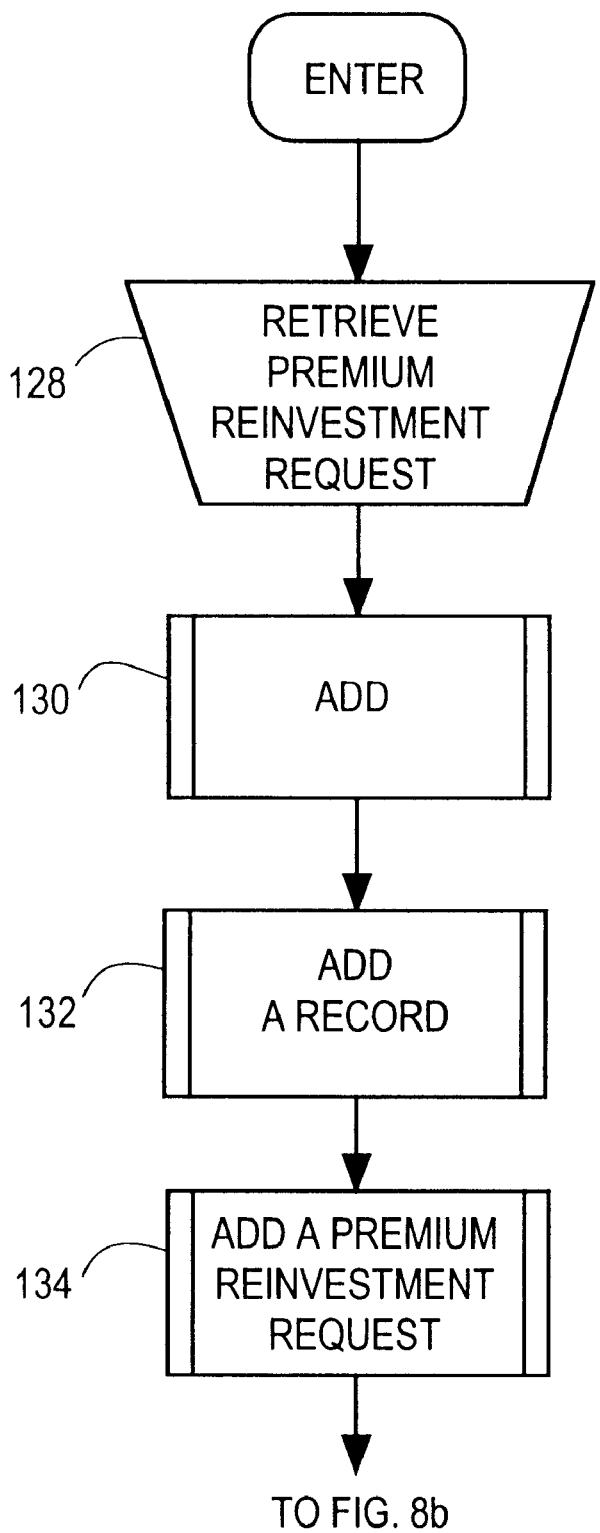

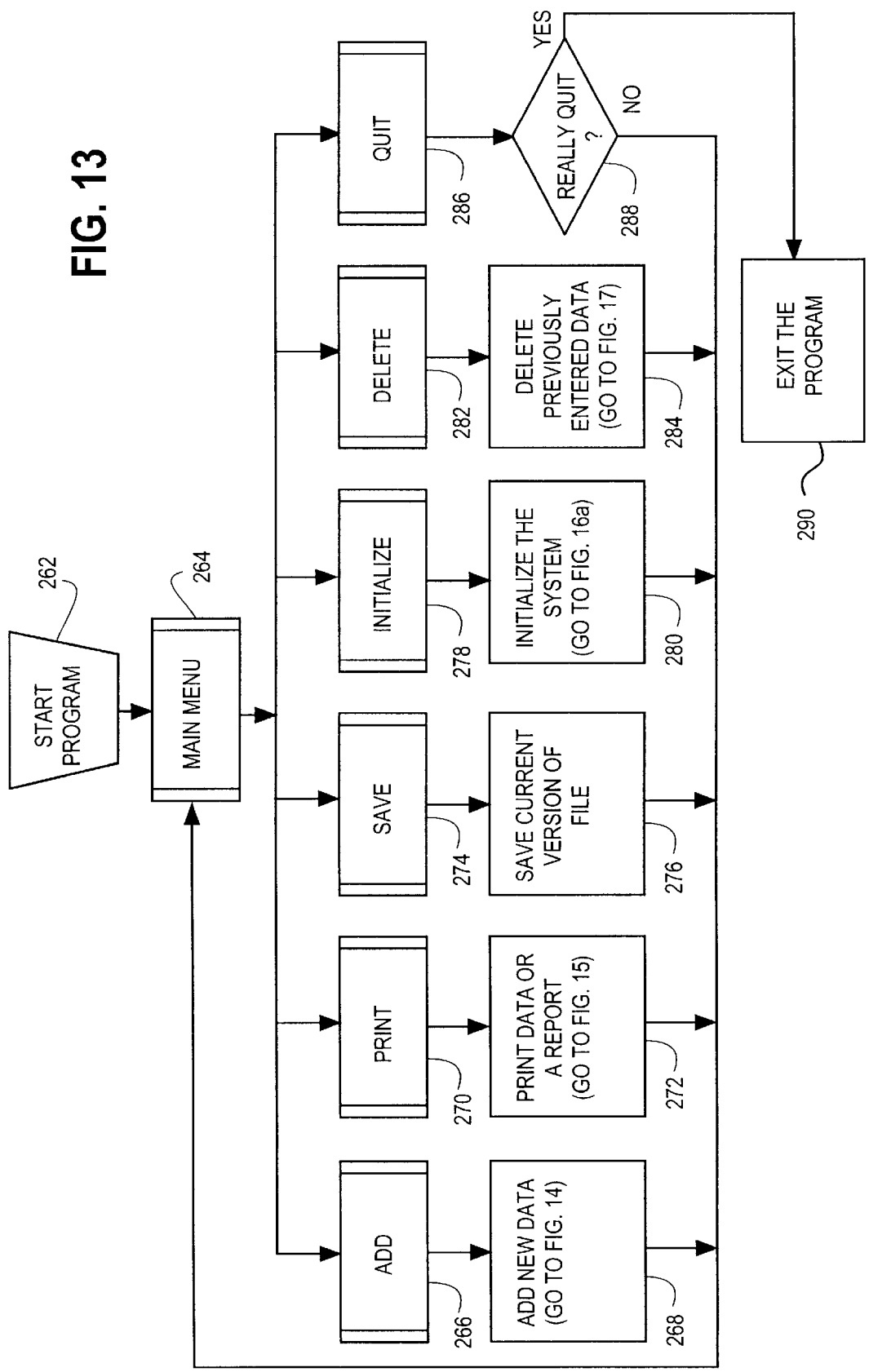

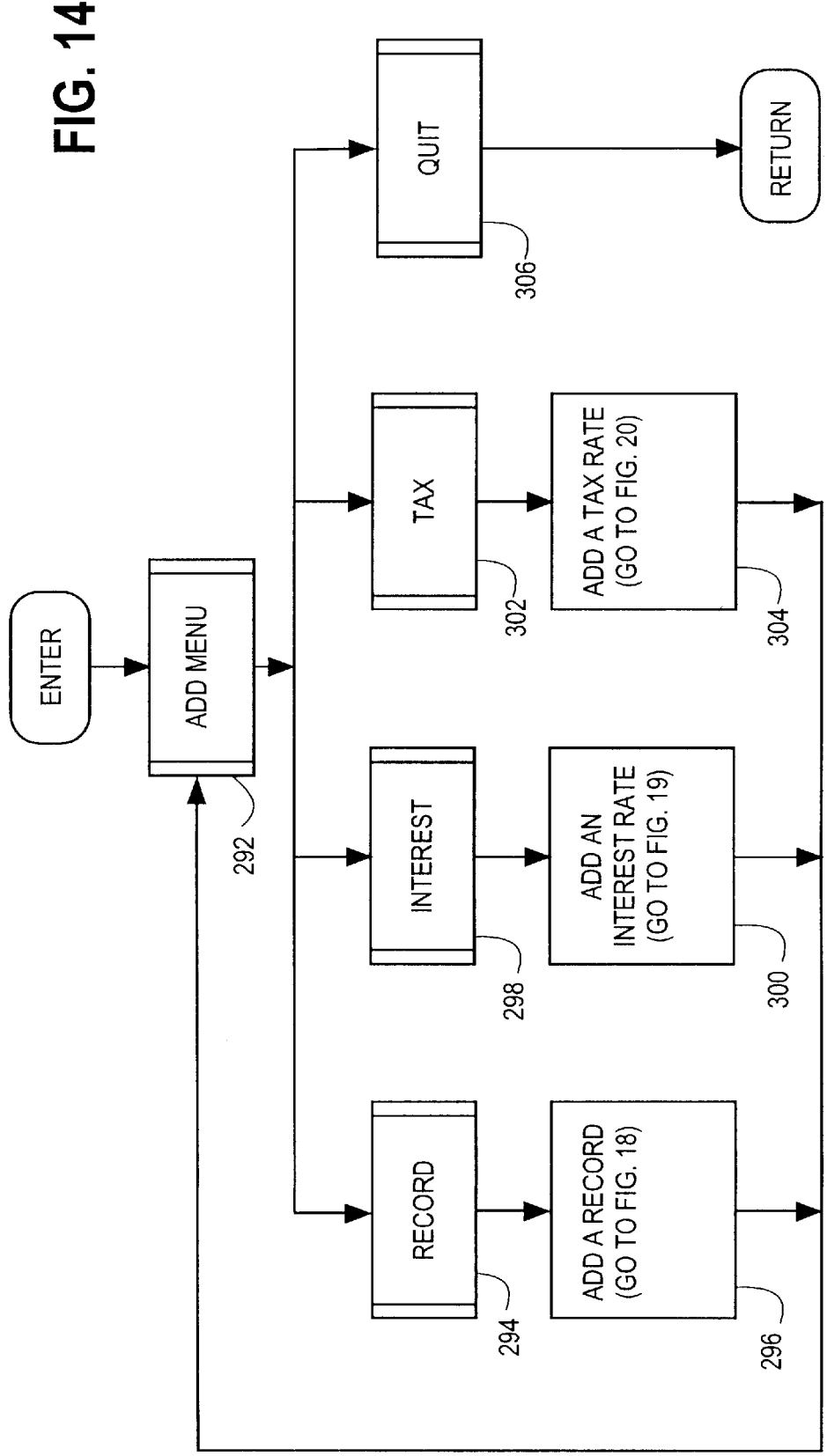

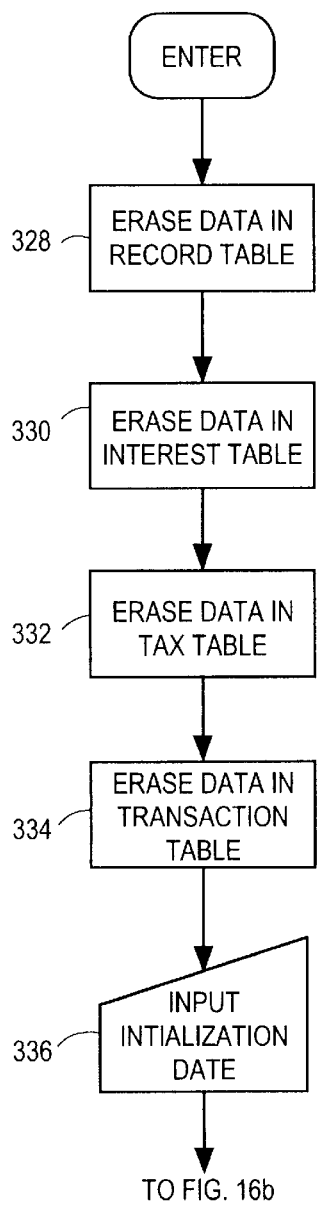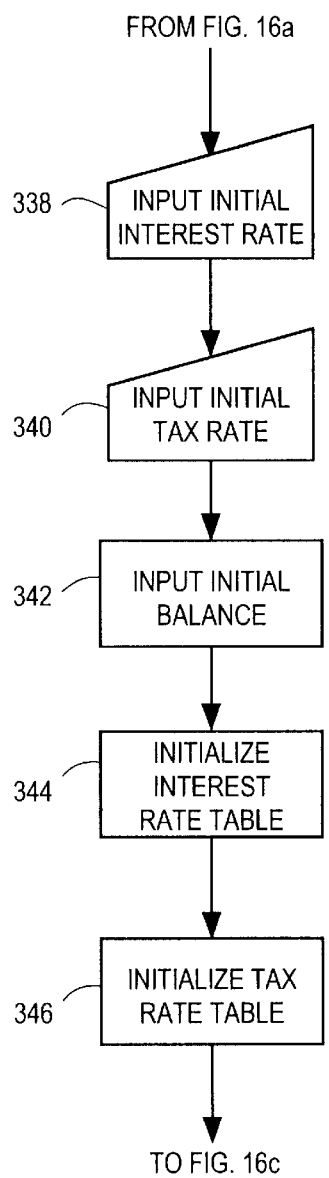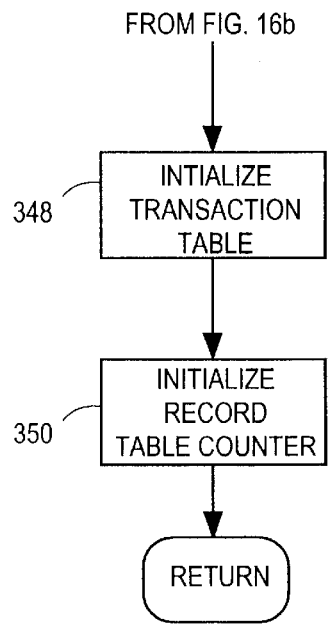

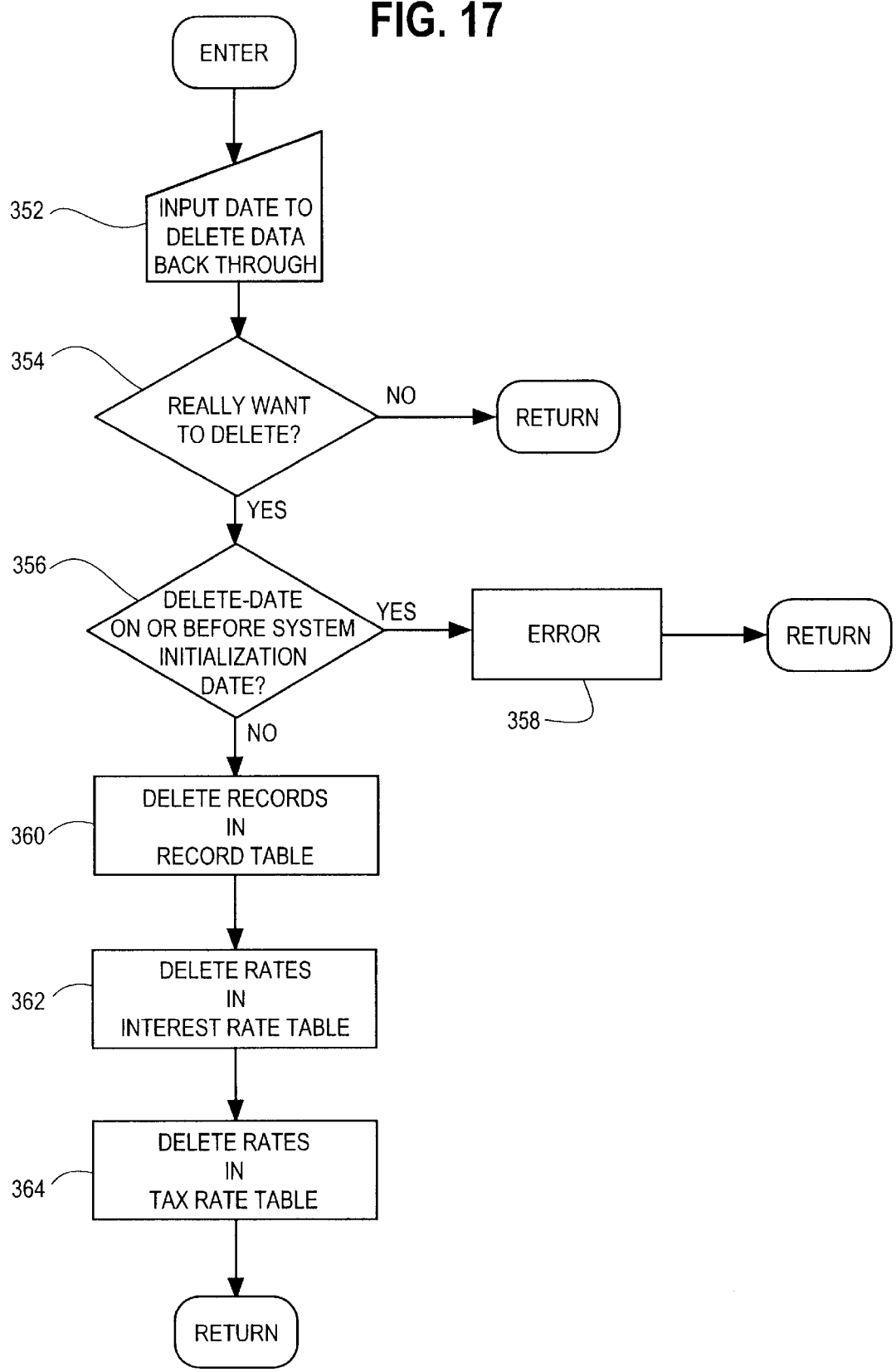

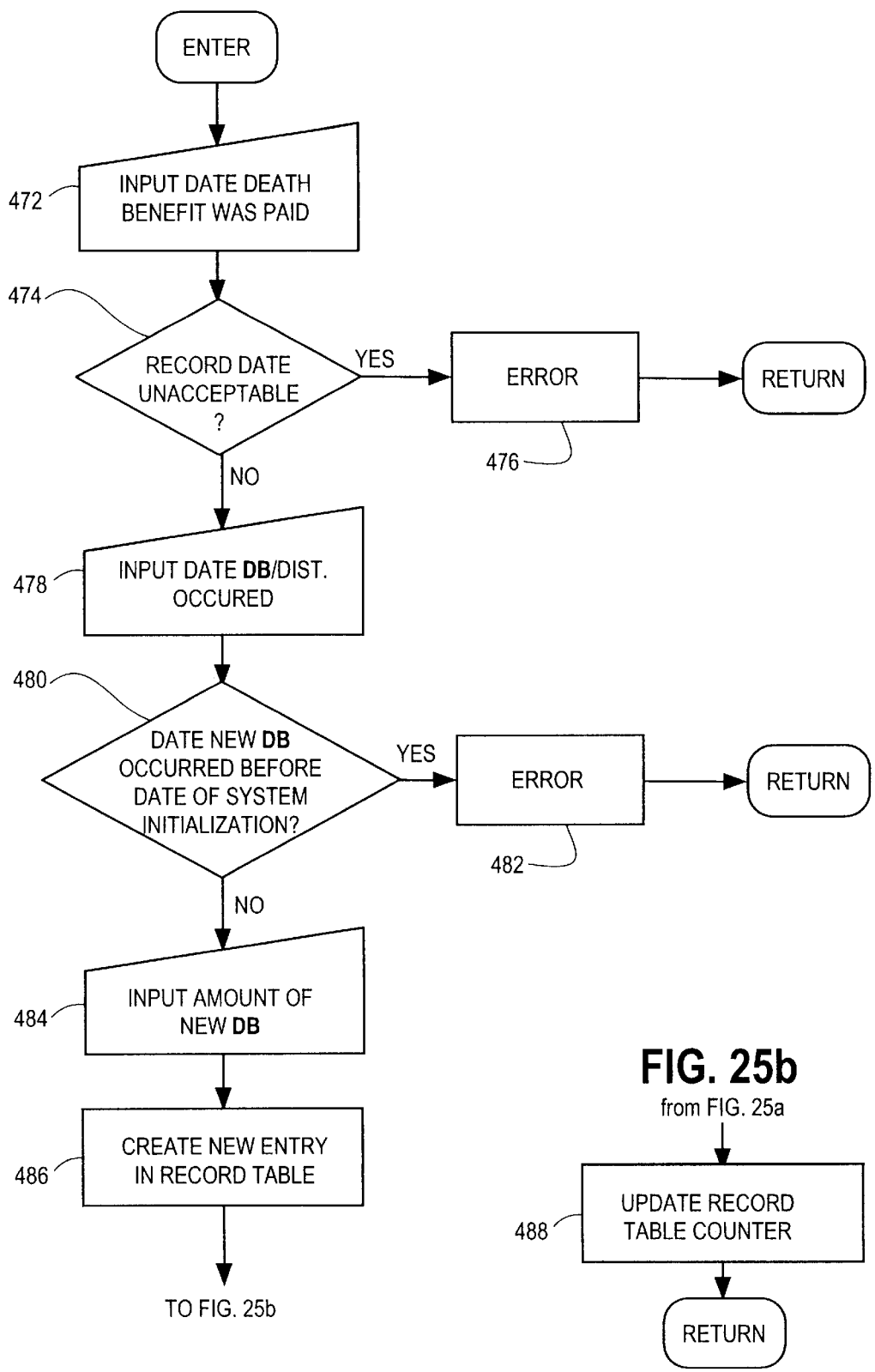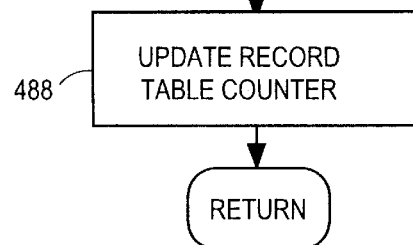

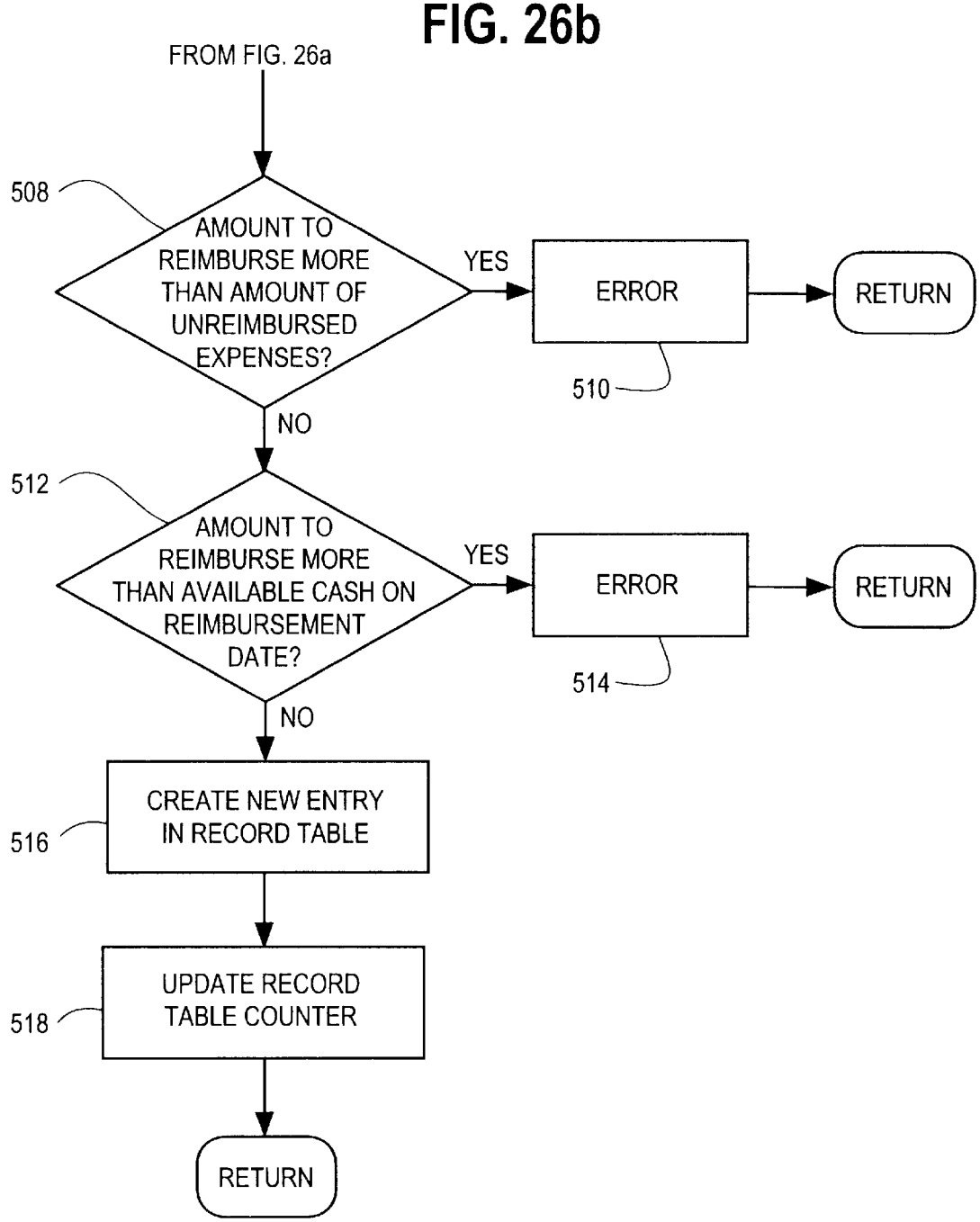

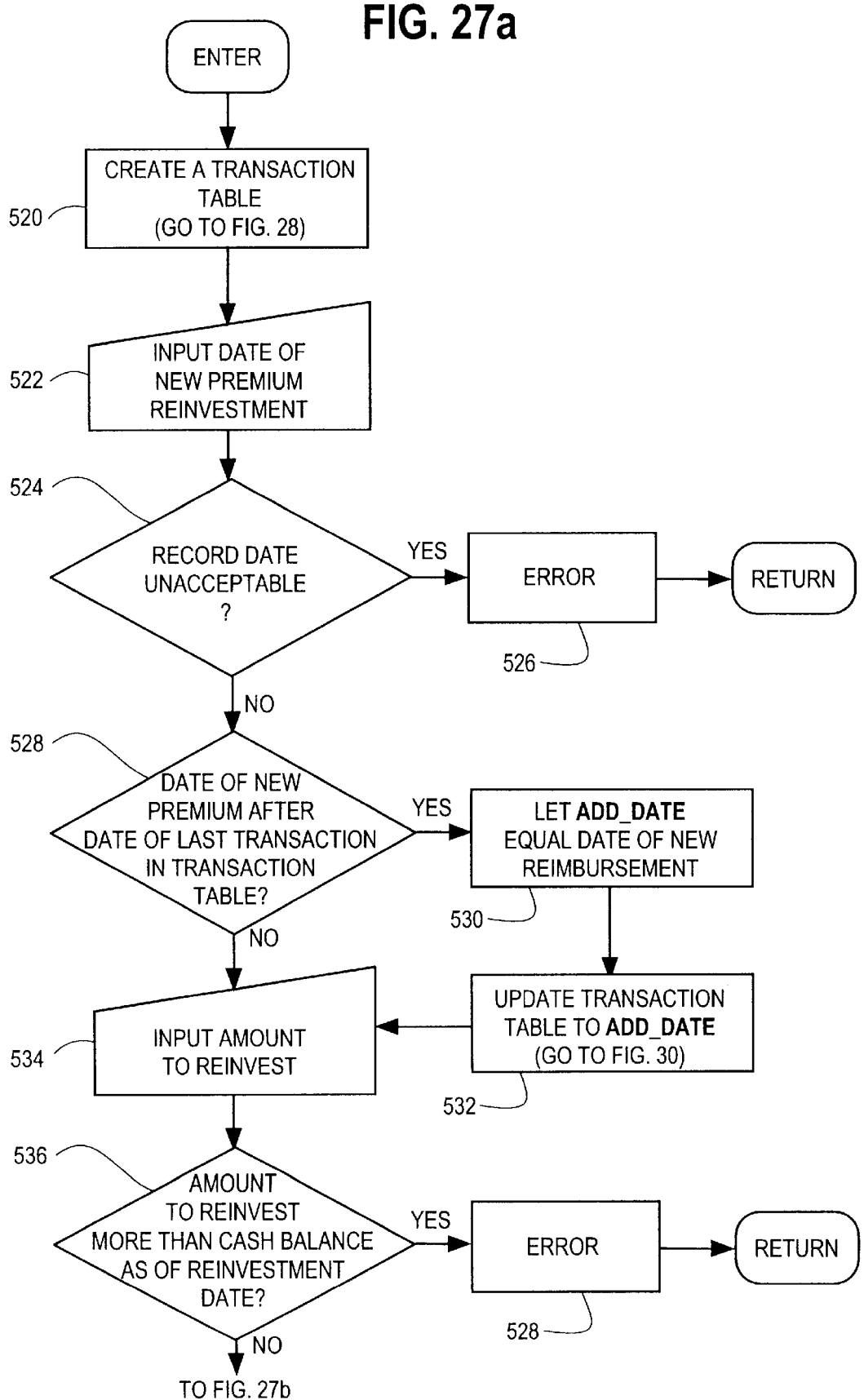

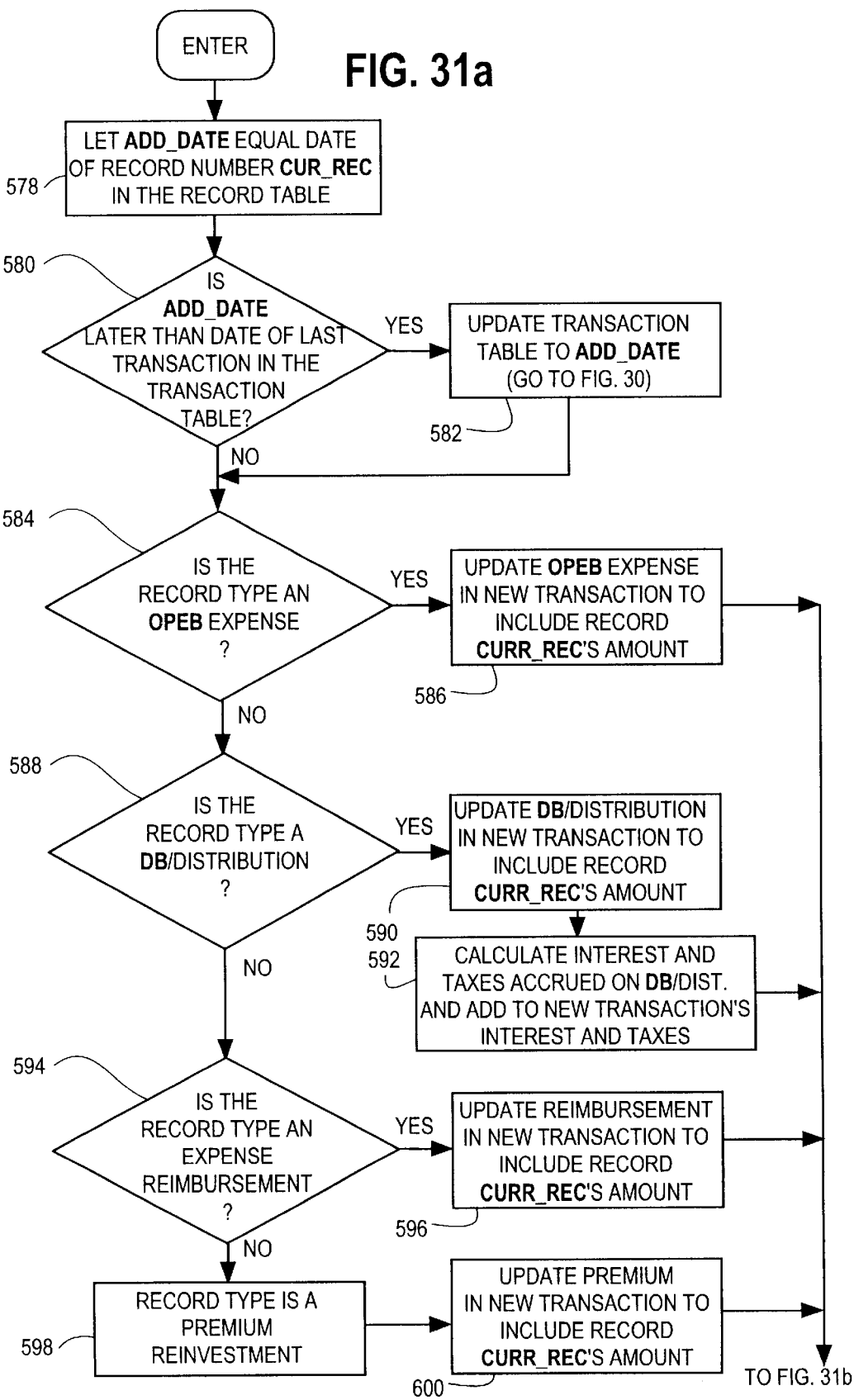

COMPUTERIZED INDENTURE PLAN ALLOCATION DETERMINATION MANAGEMENT AND REPORTING SYSTEM

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

FIELD OF THE INVENTION

The present invention relates to a computerized management and reporting system and method as applied to insurance and benefit funding, and in particular, to a system and method for determining, managing and reporting indenture plan allocations in support of, for example, the administration of a prefunding program.

BACKGROUND OF THE INVENTION

For many years corporations have sought an efficient and flexible method of funding for corporate employee benefits. For example, U.S. Pat. No. 5,136,502 to Van Remortel et al. teaches a system which permits a corporation to prefund corporate retiree health care liabilities using a VEBA trust and variable life insurance. The problem facing US businesses, however, is that the use of a trust (such as a VEBA trust) typically carries with it a significant problem—a trust, such as the one described in the Van Remortel patent (a 501(c)(9) trust under the tax code), is exposed to a 100 percent reversionary tax. This means that even if for some reason a funded liability disappears, monies contributed to the trust cannot be used for any other corporate purpose. The practical implication of this law is that a dollar contributed to a 501(c)(9) trust cannot be used by the corporation for anything other than health care, even in the event the corporation's obligation to pay for health care disappears.

As a result, the system and the funding method which the Van Remortel patent describes has seen limited application. Great uncertainty exists regarding the future of the retiree health care liability, and how it will be paid in the future. Therefore, few companies have actually implemented the funding method described in the Van Remortel patent. Thus, most companies have maintained significant unfunded retiree health care obligations, and accordingly, most workers face the risk that someday their benefits will not be paid to them should their employer have future financial difficulties.

There is a need for a system that provides corporations with a means for funding corporate liabilities so as to permit the corporation to establish a savings vehicle that does not require the corporation to "throw away the key" once the funds are placed in the vehicle. Thus, the savings may be used to pay for a corporate benefit obligation so long as the obligation remains in effect. However, corporations want to know that the savings vehicle will allow the corporation to have access to the funds in event, for whatever reason, the liability disappears in the future. Accordingly, there exists a need to determine, manage and determine allocations, in real time, for an indenture plan that has the foregoing attributes. In particular, there is a need for a system that implements a new employee benefit funding program that avoids exposure to reversion tax.

According to the present invention, such a program (herein called a BENCORE[SM] program) exists when a corporation purchases corporate owned life insurance (COLI) on its employees and/or retirees and the following features are added 1) The insurance policy includes a spendthrift settlement option that applies to all policy distributions.
2) An "Indenture Agreement" is signed between the corporate policy owner and carrier who issues the policy.

Very briefly, the terms of the Indenture Agreement require that all death benefits (and any other policy distributions) be retained by the carrier until such time as the corporation pays the employee benefit named in the Indenture. The test is a cumulative one, from the date of inception of the funding program. When cumulative death proceeds exceed cumulative benefit payments, then the excess is held at interest by the carrier to be remitted only when additional future benefit payments are made.

By limiting policy distributions to the benefits being funded, a BENCORE[SM] program is able to achieve "plan assets" status under Generally Accepted Accounting Principles (GAAP). As a result, the assets can be offset against the benefit accrued liability and the income from the policy is an offset against the annual net periodic expense accrual. The different types of employee benefits that could be addressed by a BENCORE[SM] funding program include those described in FASB Statement No. 106 (postretirement benefits other than pensions, e.g., retiree health care), FASB Statement No. 112 (postemployment benefits, e.s., disability payments) and even FASB Statement No. 87 (pensions).

The spendthrift settlement feature of the insurance contract helps to assure that the payment of death proceeds (and other policy distributions) can only be applied to reimburse the particular benefit being funded. As a result, once in place, policy distributions cannot be diverted from their intended purpose.

As a result, so long as the life insurance funding program remains in effect, the benefit obligation will be paid. If future generations of management fail to pay the benefits owed employees, then under the indenture agreement the corporation will not receive the life insurance policy death benefits. If, on the other hand, for some reason the benefit obligation disappears (e.g., in the case of retiree medical benefits, health care reform legislation eliminates the corporate obligation to pay for promised health care benefits), the indenture agreement would expire, allowing the corporation to have complete and unencumbered rights to the policy(ies).

In order for the BENCORE[SM] program to be successfully implemented and operated, however, there must be a real time means of comparing the cumulative benefit payment amount with the cumulative policy death proceeds (and any other distributions). Over the life of the benefit obligation (for example, the lifetime of the longest living employee in a group) the amount of the benefit obligation for the group from plan inception (e.g., the retiree health care cost) is compared with the policy proceeds (life insurance policy death benefits).

Possibly even more important is the real time tracking of the funds on deposit with the carrier when policy death proceeds (and other distributions) exceed benefit payments. These funds will earn interest which is added to the deposit balance. The interest income is taxable to the corporate policy owner—as a result, the amount due for income taxes can be distributed to the policy owner. Accordingly, the amount of taxes accrued must be treated in the same manner as benefit payments. To effectively administer the program, it is necessary to have available a current tax expense accrued amount at any point in time.

Therefore, in order for the carrier to perform its duties under the indenture agreement, it is necessary to have on-going real time monitoring of corporate benefit obligations and indentured assets on an integrated basis. Specifically, it is essential to have a computer system that:

(1) monitors the relevant company benefits paid and compares that amount to the cumulative life insurance policy distributions;

(2) in real time, compares unreimbursed company benefit expenses to life insurance policy benefits payable so as to determine what amount may be distributed;

(3) prepares reports that aid the company in fulfilling its reporting requirements under Generally Accepted Accounting Principles; and (4) aids in the reconciliation of its data and calculations with those of other computer systems at the Carrier.

To date, no known monitoring or accounting system exists that is capable of fulfilling the four tasks defined above. The operations that are required to be performed by a system having the above features are complex, particularly when the results are required on a real time basis.

SUMMARY OF THE INVENTION

The present invention relates to a system used to implement aspects of a new structure used to prefund for employee benefits. The system of the present invention includes a computer system that handles indenture plan allocation determination, management and reporting functions in support of the administration of a prefunding program. The system of the present invention can determine, manage, and report allocations to and from an indenture plan, can manage indenture plan assets, and can report allocation information to an administration system or subsystem. In the representative embodiment, the present invention accomplishes its tasks by linking into a peripheral system, obtaining certain information, comparing relevant benefits information and insurance information data, performing numerical calculations, sending information, controlling certain functions and generating reports.

The system of the representative embodiment of the present invention utilizes a controller, such as, for example, a microprocessor or microcomputer, coupled to the administration system which may be located the premises of or operated by, for example, an insurance carrier, plan administrator or some other agency that is the overseer of the indenture plan assets. The controller receives indenture plan information, which may be, for example, total asset value information, interest earned on indenture plan assets, death benefit receipts, or distribution of assets information, electronically transmitted by the administration system via, for example, LAN, WAN, modem, or some other means of transmission.

Coupled to the controller, for example, over a LAN, WAN, or Ethernet connection, is a user workstation, which may be, for example, a simple I/O device, a personal computer or a microcomputer. The user workstation receives expense information, for example, via user input or via input from an expert system, applications program, peripheral device or outside source, and electronically transmits it to the controller. This expense information may include, for example, employee or retiree health benefit payments. Other information may also be communicated from the user workstation to the controller, such as, for example, new employee information and employee termination information.

Upon receipt of the expense and other information, the controller determines allocation information for the indenture plan. Allocation process performed by the controller may include, for example, shifting funds toward benefit reimbursement or premium reinvestment, or increasing indenture plan asset balances. Thus, the allocation process produces allocation information for the indenture plan and which can be transmitted to the administration system and/or user workstation.

The controller also determines management information as a function of the indenture plan information received from the administration system. Management information that is determined and/or calculated by the controller according to the principles of the present invention may include, for example, values for indenture plan transaction data such as death benefit proceeds or premium reinvestment amounts, reimbursement for health and medical benefit expenses, interest earned on indenture plan assets and tax liabilities, reinvested distributions, policy exchange or surrender amounts, restructured or updated asset balances and unreimbursed benefit expense balances in response to accounting events, earned interest allocations, and tax expense allocations. The controller can perform functions relating to overdraft prevention, limiting payment of indenture plan distributions, and retaining indenture plan distributions.

The controller electronically transmits the allocation information and the management information to the administration system, for example, so as to update the carrier as to the status of the indenture plan and any changes thereto. The controller also electronically transmits the allocation information and the management information to the user workstation.

The controller can also generate a report, for example, daily, weekly or monthly, and electronically transmit the report, for example, to the user workstation, the administration system, or some other peripheral device or location.

The controller can also reconcile allocation information with indenture plan information from the administration system. This would allow the insurance carrier, plan administrator or some other agency that is the overseer of the indenture plan assets to effectively interact and coordinate with the company maintaining the indenture plan.

The system according to the present invention may provide an insurance carrier with an on-going monitoring system for accounting events relevant to an indenture plan.

The system according to the present invention may be used to guard against over-allocation or over-disbursements from indenture plan assets, when allocating funds for benefits reimbursement or premium reinvestment, and against recording a reimbursement that will cause total reimbursements to exceed cumulative benefit expenses.

The system according to the representative embodiment of the present invention automatically performs calculations to provide up-to-date cumulative values for insurance transaction data such as death benefit receipts or premium reinvestment.

The system according to the present invention allows for variation in interest rates and may respond to these changes by accurately calculating and recording the interest earned on indenture plan assets and any resulting tax liability from these earnings. It responds to new accounting events by automatically updating both plan asset balances and unreimbursed benefit expense balances. Additionally, the system according to the present invention allows for variation in tax rates and may respond to these changes by accurately calculating and recording tax expenses over time.

The system according to the present invention provides an efficient facility for accounting for an indenture plan such that the program's funds conform with the definition of "Plan Assets" under an accounting rule.

The system according to the present invention can automatically provide reports that complement an insurance carrier's separate accounting system and can automatically generate up-to-date hard copy reports regarding the indenture plan.

The system according to the present invention can be structured to minimize data entry error so as to help maintain accuracy in the system's databases.

The system according to the representative embodiment of the present invention is menu-driven, and automatically records and stores accounting information related to an indenture plan in a reliable and consistent manner, and may guard a user against accidentally corrupting the invention's programming code.

The system according to the present invention may be operable, for example, on a digital computer such as an IBM-compatible computer using, for example, LOTUS 1-2-3 Release 3.1. The various data entered into the system may be obtained from, for example, either or both of the Employer-Participant's internal sources and the insurance carrier. The system may include, for example, an automated menu system that facilitates record entry, as well as other functions. Via menu system commands, the digital computer may also output computed data to a data presentation system, such as, for example, an overhead projector, computer screen, film or video tape, and save the output data to, for example, a permanent or temporary magnetic, electronic or optical storage system or medium.

System output, shown by means of a printer, would permit a carrier to administer an indenture plan in compliance with the terms of the indenture. The system output would provide the carrier with a control tool for proofing account balances against those reported by the carrier's mainframe accounting system. (It is noted here that it is not material whether the carrier's accounting system is on a mainframe computer. It might also be on, for example, a file server or personal computer. Throughout this document, we will refer to the carrier's mainframe accounting system.) With these verified reports then, it is possible for the carrier to authoritatively monitor the Employer-Participant's transactions.

The system of the present invention can be configured to operate with more than one indenture plan. For example, the system of the present invention can administer a number of indenture plans, e.g., for different corporations and for different groups of employees.

The indenture plan implemented according to the principles of the present invention is, among other things, an innovative response to the Financial Accounting Standards Board (FASB) Statement 106. The following is a detailed example of an embodiment of certain functionality provided for according to the present invention as it may be applied to that accounting statement. The indenture plan discussed below is representative of the type of indenture plan that is administered by the system and method of the present invention. This type of plan could not successfully be implemented or administered prior to the invention of the system and method described herein.

The FASB statement, issued in December of 1990, provides that by 1993 "calendar year" corporations reporting under Generally Accepted Accounting Principles (GAAP) use an accrual method of accounting for OPEBs. Prior to the ruling, the practice for corporations was to record these OPEB expenses on a pay-as-you-go basis.

The shift to an accrual system under Statement 106 represents a significant change. The new accounting standard requires that corporations accrue expected OPEB expenses over the working life of the employee, rather than record them upon retirement or as they are paid. Thus, the new accounting rule effectively brings significant future expenses into the present. For most companies, the impact of the new accounting standard has been to create book expenses that are from three to six times what they would be under a pay-as-you-go method.

Under Statement 106, a corporation may use assets contributed to a trust (or other vehicle that adequately "segregates and restricts" the use of the assets) as an offset to the accrued OPEB liability that is recorded on a company's balance sheet. Assets eligible to offset OPEB liabilities are labeled as "plan assets." Furthermore, the new accounting standard permits recognition of the growth in "plan assets" as an offset to the accrual expense charge for OPEBs.

Given the option of offsetting OPEB expenses with "plan assets," some alternative trust vehicles have been proposed and utilized prior to the existence of the plan made possible by the current invention. Each of these alternatives has had significant limitations and risks that hinder its effectiveness as a funding tool.

The plan made possible by this invention overcomes the obstacles inherent in the use of a trust by utilizing a corporate owned life insurance policy with a specially designed settlement option in concert with a formal Indenture Agreement between the corporate buyer-policy owner ("the Corporation" or "Employer-Participant") and the insurance carrier ("the Carrier"). The Indenture Agreement, signed with the formality of a deed by all parties to the transaction, guarantees that the assets of the program meet the accounting test of being "segregated and restricted" and are accounted for as "plan assets" under paragraph 63 of FASB Statement 106.

For example, a corporation may select a group of employees that are eligible, or are expected to become eligible, for OPEB payments. These employee lives may be insured with the corporation named as the owner and the beneficiary of the policy(ies). The insurance policies are specially designed cash value insurance contracts and may be universal life or variable universal life.

At the time that the policies are applied for and delivered, the insurance carrier and the corporate buyer enter into a written Indenture Agreement that will govern the administration of the insurance contracts as well as all withdrawals, distributions and death benefit settlements thereunder.

The Indenture Agreement contains a series of provisions that are directly relevant to the current invention. First, the Indenture Agreement provides that from funding program inception, the amount of cumulative death proceeds (and other policy distributions) payable to the corporate policy owner shall be limited to the amount of cumulative OPEB pay-as-you-go expenditures. As a part of this provision, an independent auditor must periodically certify to the Carrier the amount of OPEB expenses paid. Since the only death benefits payable directly to the corporation are amounts which are not in excess of actual OPEB costs incurred and paid, death benefits are clearly committed (e.g., restricted) to the payment (reimbursement) of OPEB expenditures.

Second, where death benefits and any other withdrawals or distributions from the insurance policy(ies) exceed OPEB payments, the Indenture Agreement calls for such excess amounts to be retained by the carrier and paid out under a specially designed settlement option. Also, if the corporation elects to surrender the policies, the surrendered proceeds are treated in the same manner as any other policy distribution under the Indenture Agreement and spendthrift payment option. The account into which these excess amounts are deposited is the Indenture Plan Excess Account.

The settlement option incorporates a standard insurance spendthrift payment option. If at some time cash is present in the Excess Account and the cumulative total pay-as-you-go costs incurred and paid since the inception of the policy exceed the cumulative total of previous death benefits (and other policy distributions) received, a part of the Excess Account on deposit with the Carrier may be released to the Corporation. The remittance amounts are limited to unreimbursed OPEB pay-as-you-go expenditures.

Included in the Excess Account is any interest earned on the cash on deposit. Similarly, included in the cumulative total of pay-as-you-go OPEB expenses is the tax accrued on the interest earned in the Excess Account.

The Indenture Agreement permits the policy owner to direct the carrier at any time to reinvest death proceeds and amounts on deposit in additional premiums for policies subject to the Indenture Agreement. This election gives the corporation the flexibility to increase its plan assets, rather than just meeting current pay-as-you-go expenses with cash flow from the policies. Also, funds that otherwise would have been held under a settlement option can be returned to policy cash value and accumulate tax free.

Finally, the Corporation may exchange the policy as long as the new policy has the necessary spendthrift payment option and the new carrier signs the Indenture Agreement. Normally, a policy exchange is a tax-free event. An exchange might occur when the corporation is dissatisfied with the services of the carrier or wants other investment options.

Thus, regardless of its fortunes, the Corporation must meet its OPEB obligations in order to collect death benefits and other distributions from the insurance policies under the plan made possible by this invention. Said another way, payments from the policy can only be applied toward OPEB expenditures. Also, program flexibility is built in by having the option to exchange a policy and/or to reinvest death proceeds (and other policy distributions) as additional premium dollars.

Through the use of the Indenture Agreement and the spendthrift payment option, the indenture plan meets Statement 106's requirement that "plan assets" be "segregated and restricted." To help the corporation comply with the provisions of Statement 106, it is essential for the Carrier to track these assets, as well as the income and expenses associated with them.

Under the provisions of Statement 106, in each accounting period, plan assets are to be tracked such that they are netted against the accrued OPEB liability to compute the accrued or prepaid postretirement benefit cost. In the case of a funding plan made possible by this invention, these "plan assets" consist of the policy cash value and any funds held by the carrier under the settlement option.

Similarly, growth of plan assets must be tracked, so that the growth may be used as an offset to the period's accrual expense charge for OPEBs. In the Indenture Plan, interest income earned on funds held by the carrier under the settlement option is included in the net periodic expense computation. Because these assets are the property of the corporation and the income on these deposits is taxable, the net periodic income must include an accrual for the corporate tax on the interest income.

For corporate accounting purposes, death proceeds paid and policy cash value increases are also income that is included in the net periodic expense computation. Death proceeds and cash value growth, however, are exempt from taxation—no tax provision is required for these two items of income in the net periodic expense computation.

GAAP requires the Corporation to measure the temporary difference between OPEB expenses accounted for income tax accounting purposes and those accounted for under Statement 106. In any period, for the Indenture Plan, this difference is measured by comparing the pay-as-you-go costs to the Statement 106 accrued OPEB cost for service, interest, and amortization of the transition obligation. The earnings on plan assets are not included in the accrued OPEB cost for purposes of computing the tax accounting temporary difference.

To summarize, the present invention, if implemented to comply with FASB Statement 106, requires accounting information for a number of distinct, but related, purposes.

One purpose is to compare insurance information with corporate benefits information to ensure that the Carrier and Corporation comply with the Indenture Agreement. To comply, the parties to the contract must ensure that two relationships are never violated. The first relationship is that the sum of cumulative pay-as-you-go expenses—including OPEB expenses and taxes accrued on interest earned in the Indenture Plan Excess Account—must always be greater than or equal to the cumulative sum of death benefits and other policy distributions paid to the Corporation. This ensures that plan assets are dedicated to the payment of OPEB expenses. (Throughout the remainder of this document, we will refer to the difference between these two sums as the "net unreimbursed expenses.") This required accounting relationship is maintained if and only if net unreimbursed expenses do not fall below zero. The second relationship is that the amounts reimbursed to the Corporation or reinvested in additional premium must never drive the balance in the Excess Account below zero. This ensures that the Carrier does not improperly loan money to the Corporation.

Another use for the invention is to permit the Corporation to be sure that its funding plan complies with the financial reporting requirements of Statement 106 and other GAAP as they relate to Statement 106. For example, to report the value of plan assets in any reporting period, the Corporation must be informed by the Carrier of the value of the assets in the Indenture Plan Excess Account. To calculate the OPEB accruals during any reporting period, the Carrier must know the value of taxes accrued on Excess Account interest income during that period. To determine the growth in plan assets that may offset OPEB accruals, the Carrier must know the value of the interest earned on Excess Account balances during the period.

Accordingly, the system and method of the present invention has capabilities to: (1) monitor and periodically update the relevant aforementioned information; (2) ensure that net unreimbursed expenses and the Excess Account balance never fall below zero; (3) prepare reports that aid the Corporation in fulfilling its reporting requirements under Statement 106 and related GAAP; and (4) aid in the reconciliation of its data and calculations with those of other computer systems at the Carrier.

BRIEF DESCRIPTION OF THE DRAWINGS

FIG. 1a depicts a block diagram of a system according to the present invention;

FIG. 1b shows a flow chart of a method of operation according to the present invention;

FIG. 3a describes the flow chart symbols used in FIGS. 2 through 31;

FIG. 4 is a flow chart illustrating how an operator uses the invention to attain the objectives of the invention;

FIG. 5a is a flow chart illustrating how an operator uses the invention to attain the objectives of the invention;

FIG. 5b is a flow chart illustrating how an operator uses the invention to attain the objectives of the invention;

FIG. 6b is a flow chart illustrating how an operator uses the invention to attain the objectives of the invention;

FIG. 7a is a flow chart illustrating how an operator uses the invention to attain the objectives of the invention;

FIG. 8a is a flow chart illustrating how an operator uses the invention to attain the objectives of the invention;

FIG. 13 is a flow chart diagramming the structure and operation of the invention's computer program;

FIG. 14 is a flow chart diagramming the structure and operation of the invention's computer program;

FIG. 16a is a flow chart diagramming the structure and operation of the invention's computer program;

FIG. 16b is a flow chart diagramming the structure and operation of the invention's computer program;

FIG. 16c is a flow chart diagramming the structure and operation of the invention's computer program;

FIG. 17 is a flow chart diagramming the structure and operation of the invention's computer program;

FIG. 25a is a flow chart diagramming the structure and operation of the invention's computer program;

FIG. 25b is a flow chart diagramming the structure and operation of the invention's computer program;

FIG. 26b is a flow chart diagramming the structure and operation of the invention's computer program;

FIG. 27a is a flow chart diagramming the structure and operation of the invention's computer program;

FIG. 31a is a flow chart diagramming the structure and operation of the invention's computer program;

DETAILED DESCRIPTION

Figure 2:
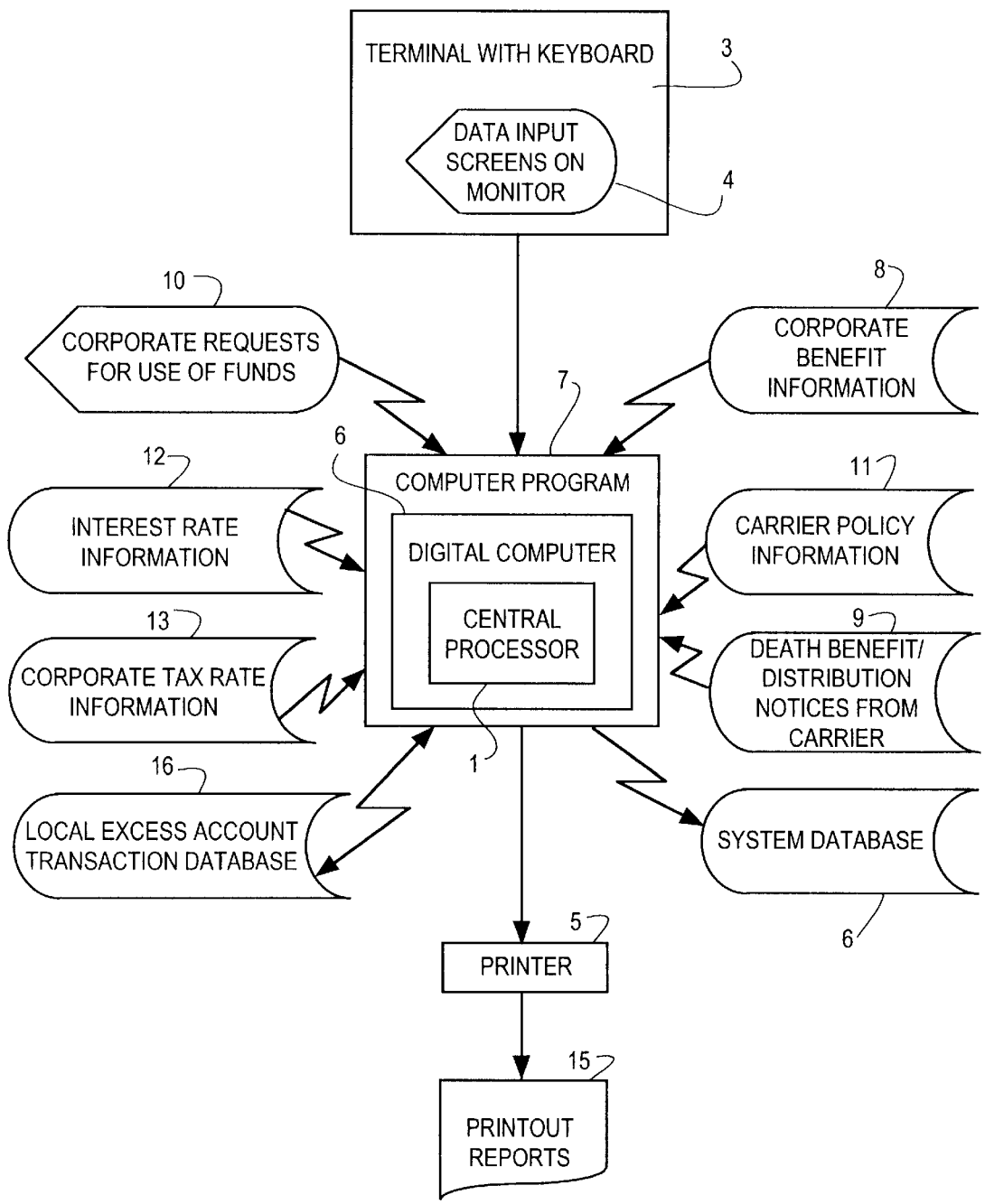
FIG. 2 shows a flow chart representing the overall elements of the invention.

Referring to FIG. 1a, there is illustrated in block diagram form a representative embodiment of the system of the present invention. A controller 800, such as, for example, a microprocessor or microcomputer, is coupled to an administration system 802. The administration system 802 may be located, for example, at a remote location or near the controller 800. The controller 800 receives indenture plan information electronically transmitted by the administration system 802, via, for example, LAN, WAN, Ethernet, modem, or some other means of transmission. Coupled to the controller 800 is a user workstation 804, which may be, for example, a simple I/O device, personal computer or a microcomputer. The user workstation 804 receives expense information, via, for example, keyboard entry, input from a peripheral device, expert system, applications program or outside source, and electronically transmits the expense information to the controller 800. This expense information may include, for example, employee or retiree health benefit payments.

Upon receipt of the expense information, the controller 800 determines allocation information for the indenture plan. Allocation process performed by the controller 800 may include, for example, shifting funds toward benefit reimbursement or premium reinvestment, or increasing indenture plan asset balances. Thus, the allocation process produces allocation information for the indenture plan and which can be transmitted to the administration system 802 and/or user workstation 804.

The controller 800 also determines management information as a function of the indenture plan information received from the administration system. Management information may include, for example, values for indenture plan transaction data such as death benefit receipts or premium reinvestment, interest earned on indenture plan assets and tax liability, reinvested distributions amounts, policy exchange or surrender values, restructured or updated asset balances and unreimbursed benefit expense balances in response to accounting events, earned interest allocations, tax expense allocations and retained indenture plan distributions. The controller 800 has capabilities to prevent overdraft and limit payment of indenture plan distributions.

The controller 800 electronically transmits the allocation information and the management information to the administration system 802, for example, so as to update the carrier as to the status of the indenture plan and any changes thereto. The controller 800 also electronically transmits the allocation information and the management information to the user workstation 804.

The controller 800 may also generate a report, for example, daily, weekly or monthly, and may electronically transmit the report, for example, to the user workstation 804, the administration system 802, or some other peripheral device or location.

Referring now to FIG. 1b, there is illustrated as a flow chart the operation of a representative embodiment of the present invention. In step 820, indenture plan information is electronically transmitted from the administration system to the controller. In step 822, expense information is received at a user workstation. In step 824, the expense information, such as, for example, employee or retiree health benefit payments, is electronically transmitted from the user workstation to the controller. In step 826, upon receipt of the expense information, the allocation process can shift fund balances towards benefit reimbursement or premium reinvestment, and increase indenture plan asset balances. Additionally, management information, such as, for example, indenture plan transaction data, policy exchange or surrender amounts, restructured or updated asset balances and unreimbursed benefit expense balances in response to accounting events, and tax expense allocations, can be determined as a function of the indenture plan information. In step 828, the allocation information and the management information are electronically transmitted to the administration system and/or the user workstation.

The operations performed in FIG. 1b are continuously performed. For example, the process of FIG 1b can take place on a real time basis, or a batch basis, e.g., hourly, daily, weekly etc as required.

The following is a description of a representative embodiment of the present invention. The implementation as described is not intended to limit the broad principles of the present invention.

It is noted that the controller 800, the administration system and/or the user workstation 804 of the representative embodiment of the present invention can be implemented utilizing a logic circuit or a computer memory comprising encoded computer-readable instructions, such as, for example, a computer program. The functionality of the logic circuit or computer memory is described in detail herein.

Referring now to FIG. 2, there is illustrated in block diagram form a representative embodiment of the system according to the present invention. A Digital Computer 2, such as an IBM-compatible personal computer with a Central Processor 1 has a Terminal with Keyboard 3, Data Input Screens on Monitor 4, Printer 5 (such as a dot-matrix or laser printer), and a System Database 6. Input data is acceptable to the invention by electronic transfer or by a Terminal with Keyboard 3. Digital Computer 2 is controlled by a Computer Program 7. A sample of a Computer Program 7, in LOTUS 1-2-3 (Release 3.1) for controlling Digital Computer 2, is provided in Appendix B hereto, and expressly incorporated herein. It is to be explicitly understood that other implementations of the present invention prototype, such as those using a different kind of digital computer or a different program language, are entirely acceptable and are contemplated hereunder. The computer program 7 is executed by a digital computer to perform the operations described herein, and can be stored in a memory. The logic circuit of the digital computer performs the series of specifically identified operations dictated by the computer program 7.

Digital Computer 2 uses seven distinct sets of input data. The first input is Corporate Benefit Information 8, which includes, but is not limited to, corporate benefit expense records, e.g., OPEB expense records. This information is obtained from the Employer-Participant and reflects the ongoing cash expenses that the company incurs as it pays its benefit obligations.

The next input item type is Death Benefit/Distribution Notices from Carrier 9. The Death Benefit Amount is simply the periodic cash payment from a life insurance contract, while the Distribution represents the dividend payments and/or (partial) cash surrendered from the insurance contracts. This information is obtained periodically from the Carrier.

The next input item type is requests for premium reinvestment which is one item included in Corporate Requests for Use of Funds 10. This entry of information may also be provided through Terminal with Keyboard 3. It records requests by the Employer-Participant to invest plan assets in additional premiums on existing Indenture Plan insurance contracts. The entry is prompted by either management decision of the Corporation or by scheduled transaction, pre-arranged between the Carrier and the Employer-Participant.

The next input item is the Carrier Policy Information 11, particularly the Indenture Plan Excess Account balance. This information reflects the balance computed by the carrier's system that maintains the Excess Account and may be obtained from a balance query of that system. Typically, the Excess Account will be maintained by the Carrier, and the information may be obtained by electronic means in response to an internal request at the Carrier organization. Electronic means includes downloading via diskette, modem or some other data transfer technology.

In the remainder of this application, we will refer to the institution by which the Excess Account is maintained as "the Carrier." We note, however, that in cases which refer to "the Carrier"—in the context of the maintenance of the Excess Account or of the maintenance of the system's databases—we refer to any institution which seeks to maintain the integrity of an indenture plan through the use of the invention.

Further input data includes Interest Rate Information 12. The interest rate refers to the rate at which Excess Account balances earn interest. By agreement between the Corporation and the Carrier, the rate may be either fixed or floating. Typically, it will be a floating rate, tied to a "prime" rate, and will be updated on a yearly basis.

Another set of data includes Corporate Tax Rate Information 13. The tax rate refers to the rate used to calculate the tax accrued on interest earned on Excess Account assets and is a combined federal/state/local rate, as it applies to the account. This rate typically changes yearly, with changes in the tax laws, and is supplied by the Corporation.

A last set of data is requests for expense reimbursements, which is included in Corporate Requests for Use of Funds 10. These are requests made by the Employer-Participant to the Carrier to release amounts on deposit in the Excess Account as repayment for previously unreimbursed pay-as-you-go benefit costs incurred. The reimbursements may be requested by the Corporation on an ad hoc basis, or they may be pre-arranged by the Carrier and the Corporation. This data may be input manually through Terminal with Keyboard 3.

These seven sets of data are accessible to Central Processor 1 via Digital Computer 2 (as described below). The data is then processed to generate printed reports. Samples of such reports are shown in Appendix A, attached hereto and expressly incorporated herein, as Specimens 1 through 15. The reports include such output as denoted in FIG. 2 by Printout Reports 15. Once these outputs are produced, they may be reviewed by a computer system user. If the results of the analysis are not satisfactory, the input items may be reviewed and altered, and the database can be modified to include any revision(s).

Once data is entered into the system and verified, it can be maintained in a Local Excess Account Transaction Database 16, for example, on diskette, hard drive, tape or any other magnetic, electronic or optical storage media. At a later date, this database may be retrieved by the Digital Computer 2 so that an operator may enter and verify additional data and print additional reports.

The core of the embodiment of the present invention as depicted in FIG. 2 is a set of four databases, which the Digital Computer 2 manipulates to realize the objectives of the invention. When an Employer-Participant and a Carrier enter into an Indenture Plan of the kind made possible by this invention, the Carrier initializes these four databases. Whenever an event which has an effect on the benefit/policy comparisons occurs, an employee of the Carrier, who we will refer to as "the user," enters relevant data into the system, and the Digital Computer 2 updates the databases accordingly.

The first three of these databases—the Record Table, the Interest Rate Table, and the Tax Rate Table—simply store this user-supplied data. The Record Table, an example of which appears at the left side of Specimen 1, is a journal of all accounting events which have an effect on the Indenture Plan Excess Account. There are four categories of these events. These are corporate benefit expense records, which are included in Corporate Benefit Information 8, Death Benefit/Distribution Notices from Carrier 9, and requests for premium reinvestments and requests for expense reimbursements, which are both included in Corporate Requests for Use of Funds 10.

The Record Table shown in Specimen 1 has one example of each of these types of events. The first event in the example is a record of a $1,000.00 corporate benefit expense. (As defined below, the term OPEB is used to denote a benefit expense and includes, but is not limited to, an OPEB expense.) The record was transmitted to the Carrier on Feb. 28, 1993. The second event in the example is a record of notice of a $10,000.00 death benefit payment. The death benefit payment calculation occurred on Feb. 23, 1993, and the proceeds from the death benefit were deposited into the Corporation's Indenture Plan Excess Account on Mar. 15, 1993. The third event is a request by the Corporation for reimbursement of previously paid benefit expenses. The request, for $500.00, was made on Mar. 16, 1993. The last event, also on Mar. 16, 1993, is a request by the Corporation to reinvest $500.00 of the cash in the Excess Account in additional premiums for its Indenture Plan insurance contracts.

The Interest Rate Table, shown at the center of Specimen 1, records the rates at which assets in the Excess Account earn interest. The Tax Rate Table, shown at the right side of Specimen 1, records the rates at which the interest earnings are taxed. These interest and tax rates are defined in the description of Blocks 12 and 13, respectively, in FIG. 2. When the databases are initialized, the applicable interest rate and tax rate as of the initialization date are entered, and each time an interest rate or tax rate changes, the rates are updated by adding the new rate and its effective date to the appropriate table.

The Interest Rate Table and Tax Rate Table shown in the Specimen 1 example each have only one rate, entered on the system's Feb. 15, 1993 initialization date. The interest rate to be applied to the Excess Account in this example is 3%, and the tax rate to be applied to interest earnings is 49%.

The fourth database, the Transaction Table, is created by the Computer Program 7 from the data in the Record, Interest Rate, and Tax Rate Tables. The Computer Program 7 generates the Transaction Table so that it can make the accounting comparisons that are fundamental to the objects of the invention. An example of the Transaction Table is shown in Specimen 2.

Each line of the Transaction Table shows the status of the Indenture Plan Excess Account as of a particular date. The first line of the table, shown inside the box, shows the account's status on the date it is opened, and subsequent lines show the status of the Excess Account on later dates. In most cases, each line in the Transaction Table shows the status of the Excess Account after some accounting event.

Specimen 2, for example, shows the history of the same account, opened on Feb. 15, 1993, that was shown in Specimen 1. On the initialization date, the Cash Balance —the cash in the Excess Account—was $0.00. As a convention, we designate the line which shows the initialization date to be line zero of the Transaction Table, since no transactions have yet occurred when the Excess Account is opened.

The first line of the Transaction Table shows the $1,000.00 Corporate benefit expense transmitted to the Carrier Feb. 28, 1993, which was recorded as the first entry of the Record Table. In the line dated "02/28/93" in Specimen 2, we find "Corporate OPEB Expense" of $1,000.00, which reflects the expense listed in the Record Table. The "Cumultv OPEB Expenses" column for that date, which tracks the total of all corporate benefit expenses transmitted between the initialization date and Feb. 28, 1993, also is $1,000.00, since there is exactly one expense transmitted as of Feb. 28, 1993. It is again noted that the term OPEB is used to denote a benefit and includes, but is not limited to, an OPEB. Throughout the remainder of this document, the term "OPEB" will be used to represent a benefit, which may or may not specifically be an OPEB.

The second line of the Transaction Table shown in Specimen 2, dated "03/15/93," reflects the deposit of the proceeds of the death benefit listed in line 2 of the Record Table. Here, the $10,000.00 of the death benefit payment is shown under "Receive DB or Distribut'n."

We note that the interest earned on the death benefit between the date of the death benefit calculation and the date of deposit into the Excess Account is shown under "Interest Accrued" in the Transaction Table. This $16.20 was calculated as daily interest earned on the $10,000.00 between the date of the death benefit calculation, given as "02/23/93" in the Record Table, and the date of deposit, "03/15/93." The annual interest rate used to calculate the interest was the 3% shown in the Interest Rate Table of Specimen 1. For each day that it calculates interest, the Computer Program 7 looks up the appropriate rate in the Interest Rate Table. In this example, the 3%, in effect since "02/15/93," is always the appropriate rate. Similarly, the taxes accrued on the interest earned, $8.00, are shown in Specimen 2 under "Tax Expense." Tax on interest is also calculated on a daily basis, and the Computer Program 7 finds the appropriate tax rates in the Tax Rate Table. In this example, 49% is appropriate on all days. More detailed definitions of how the Computer Program 7 calculates interest and taxes can be found in the descriptions of FIG. 30 in this application.

The "cumulative" columns of the Transaction Table entry of "03/15/93" in Specimen 2 now reflect the death benefit, as well as the OPEB expense dated "02/28/93." Specifically, "Cumultv Interest" and "Cumultv Taxes" equal $16.20 and $8.00, respectively, reflecting the interest and taxes accrued on the death benefit proceeds. "Cumultv OPEB Expenses" remains at $1,000.00, marking the "02/28/93" claim, and "Cumultv DBs/Dists" is $10,000.00, reflecting the added death benefit payment.

Finally, "Cash Balance," the cash balance in the Excess Account, is $10,016.20, reflecting the total proceeds from the death benefit, the $10,000.00 plus the $16.20 interest earned. Taxes accrued on interest earned are a non-cash expense and, as such, do not offset the interest earned on the account.

The final line of the Transaction Table shown in Specimen 2 reflects the status of the Excess Account on "03/16/93." On this date, two entries from the Record Table shown in Specimen 1, a $500.00 expense reimbursement and a $500.00 reinvestment in premium, are included in the Transaction Table entries "Reimburse Expense" and "Reinvest in Premium," respectively. In general, the Computer Program 7 always consolidates all Record Table entries with the same date into one line of the Transaction Table.

The final line of Specimen 2 also shows "Interest Accrued" of $0.81 and "Tax Expense" of $0.40. The first Figure represents the interest accrued on the cash balance in the Excess Account, $10,016.20, between the date of the previous Transaction Table entry, "03/15/93," and the date of the current transaction, "03/16/93." Again, the effective annual interest rate for Mar. 16, 1993, found in the Interest Rate Table, is 3%. Similarly, the $0.40 amount represents the tax expense accrued on the $0.81 interest, the 49% tax rate on Mar. 16, 1993 being found in the Tax Rate Table.

Cumulative Interest and Tax entries of $17.01 and $8.40, respectively, on the final line represent the total of all interest income ($16.20+$0.81) and tax expense ($8.00+$0.40) since the "02/15/93" initialization date. The other cumulative columns reflect a $1,000.00 OPEB expense, $10,000.00 death benefit, $500.00 expense reimbursement and $500.00 reinvestment in premium that occurred since the initialization date.

The "Cash Balance" column of "03/16/93" in Specimen 2 shows an Excess Account cash balance of $9,017.01. This Figure reflects the $10,000.00 death benefit plus $17.01 cumulative interest added to the account, less the $500.00 expense reimbursement and the $500.00 withdrawal made for premium reinvestment.

Thus, the Transaction Table calculates all of the accounting statistics which the Carrier must track to help the Company comply with the terms of the Indenture Agreement. Each line of the table shows, as of some date, the cumulative pay-as-you-go OPEB and tax expenses associated with the Indenture Plan, as well as the cumulative totals of the death proceeds, reimbursements, and reinvestment in additional premium.

Specimen 3 shows an example of the calculations for net unreimbursed expenses and the Excess Account balance as of the date of the last entry in Specimen 2. Here, the Current Cash Balance equals $9,017.01 and Current Net Unreimbursed Expenses equals $500.40. Specimen 3 also shows the date for which these two statistics have been calculated, "03/16/93," as well as the rates and effective dates of the latest interest and tax rates in the Interest Rate and Tax Rate Tables of Specimen 1.

The data presented in Specimen 3 allow the Computer Program 7 to ensure that the terms of the Indenture Agreement are not broken. Consider the example presented in Specimens 1 through 3. If the Corporation requests on Mar. 16, 1993 to be reimbursed for an additional $508.41 of expenses, Specimen 3 would show that fulfillment of the request would drive "net unreimbursed expenses" below zero, a violation of the first accounting relationship. Similarly, if the corporation requests on March 16 that an additional $9,017.02 be reinvested in the existing Indenture Plan insurance contracts, Specimen 3 would show that fulfillment of the request would drive the cash balance of the Excess Account below zero, violating the second relationship.

The entries in the Transaction Table also allow the Computer Program 7 to generate one-month and twelve-month summaries of Excess Account activity and to compare the Excess Account balance calculated by the Computer Program 7 to the account balance of the Carrier's mainframe cash management system.

Specimen 4 is a Transaction Table, generated using the data from Specimen 1, which includes account balances for two additional dates: Mar. 31, 1993 and Feb. 28, 1994. We note that lines zero through three of Specimen 4 are identical to those of Specimen 2. Lines four and five of Specimen 4 show the status of the Excess Account on two later dates, at which points interest and taxes have accrued on the Excess Account balance.

Specimen 5 is an example of a one-month report, its results generated from the data shown in Specimen 4. The month on which Specimen 5 reports is March 1993, and we note that its data can be calculated directly from two lines of the Transaction Table shown in Specimen 4: "02/28/93" and "03/31/93." In Specimen 5, the "Starting Balance" is "–" ($0.00), the "02/28/93 Cash Balance" in Specimen 4, and the "Ending Balance" is $9,027.96, the "03/31/93 Cash Balance" in Specimen 4.

Each of the "Period's" columns in Specimen 5 is simply the difference between the amounts listed in the associated "Cumulative" columns of the two lines in Specimen 4. For example, "Period's Interest" equals $27.96 ($27.96−$0.00). Of course, the period's interest is simply the interest earned during the period, which must equal the cumulative interest earned at the end of the period minus the cumulative interest earned at the start. We note that the "Period" columns—in particular, interest, taxes, and OPEB expenses—and the "Balance" columns of Specimen 5 provide the Corporation with all of the relevant accounting data required for its compliance with Statement 106 and associated GAAP.

The two final columns of the report allow the Carrier to check the integrity of the system's data. "System Balance" refers to the data provided in Carrier Policy Information 11 of FIG. 2. "Variance from System" refers to the difference between the system's "Ending Balance" and the mainframe's Excess Account balance for the "Ending Date." In Specimen 5, the mainframe balance is $9,027.73, and the variance is $0.23 ($9,027.96–$9,027.73). Upon viewing the report shown in Specimen 5, the user would note the $0.23 discrepancy between the two system balances and seek to locate and correct its source.

Specimen 6 is a twelve-month report that covers the period from Feb. 28, 1993 through Feb. 28, 1994. Its data is also generated from Specimen 1, and its balances and "period" calculations can be derived from Specimen 4 as well. While the format of the twelve-month report is the same as that for the one-month report, the former's one year time span makes it a more convenient source of data for annual reporting purposes.

The Computer Program 7 is a menu-driven system which maintains the integrity of the system's databases at the same time that it allows a user to input new data, make queries, and print reports. Because it is menu-driven, there is some flexibility with which one may use the program. Nevertheless, there is a core group of eight sets of activities that any user must perform to create, maintain, and generate reports using the system of this invention.

Figure 3B:
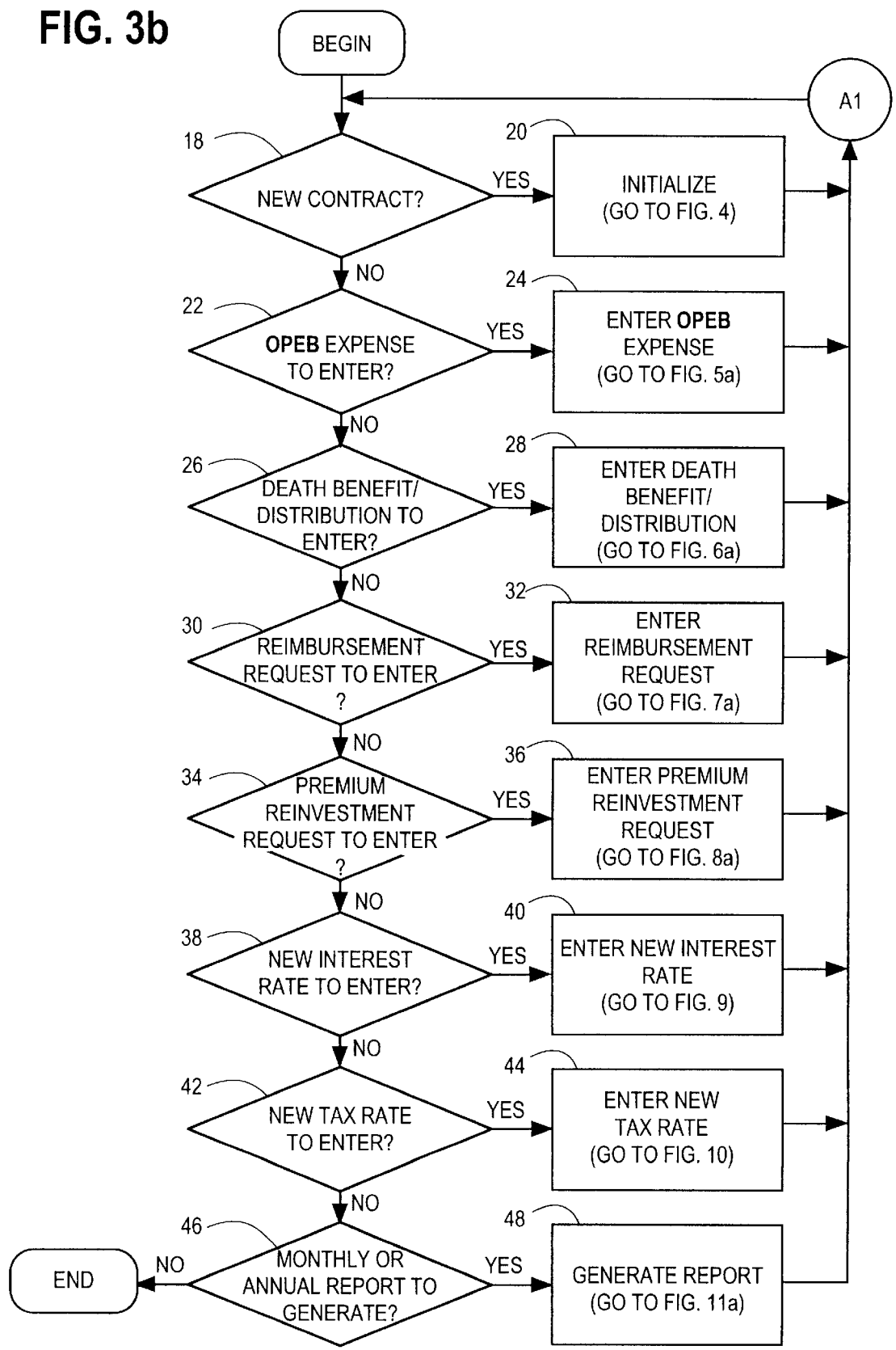
FIG. 3b is a flow chart illustrating how an operator uses the invention to attain the objectives of the invention.

This section describes those eight sets of activities and the associated menu options that a user must select to perform them. FIG. 3a describes the flow chart symbols, and FIG. 3b gives an overview of the eight activities and it makes references to FIGS. 4 through 11a and 11b, which diagram the specific sequences of menu selections that a user must make to perform each of the eight actions. We note that FIG. 3b does not itself list menu selections—only the type of task to be performed. It is only FIGS. 4 through 11a and 11b that show the sequences of menu selections.

While FIGS. 4 through 11a and 11b refer to sequences of menu selections in the Computer Program 7, they do not explicitly describe all of the user inputs or computer program logic executed once a sequence of menu choices has been made. To understand the underlying inputs, programming logic, and outputs, the reader must refer, in turn, to other sections of this document.

Figure 12A:
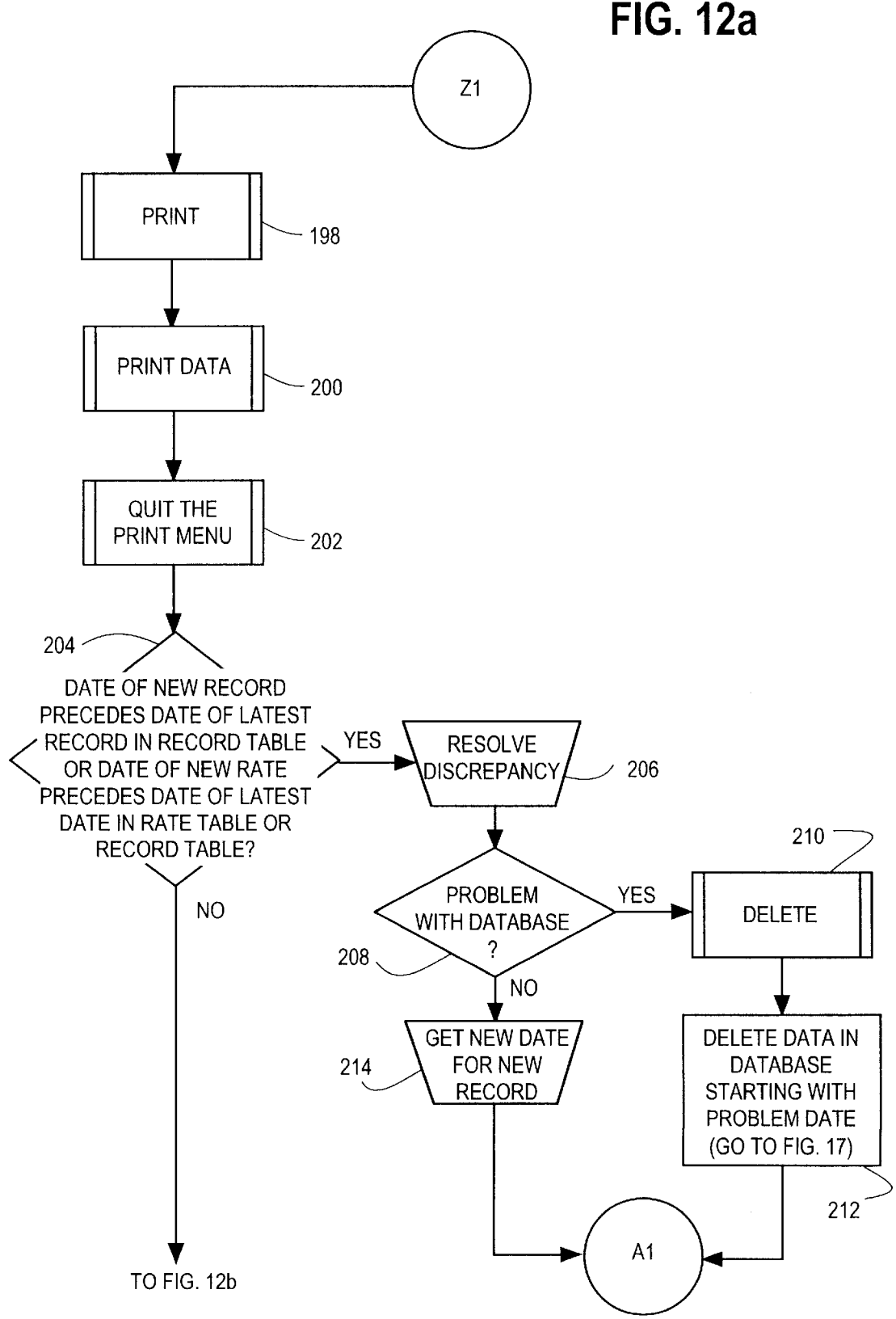
FIG. 12a is a flow chart illustrating how an operator uses the invention to attain the objectives of the invention.
Figure 12B:
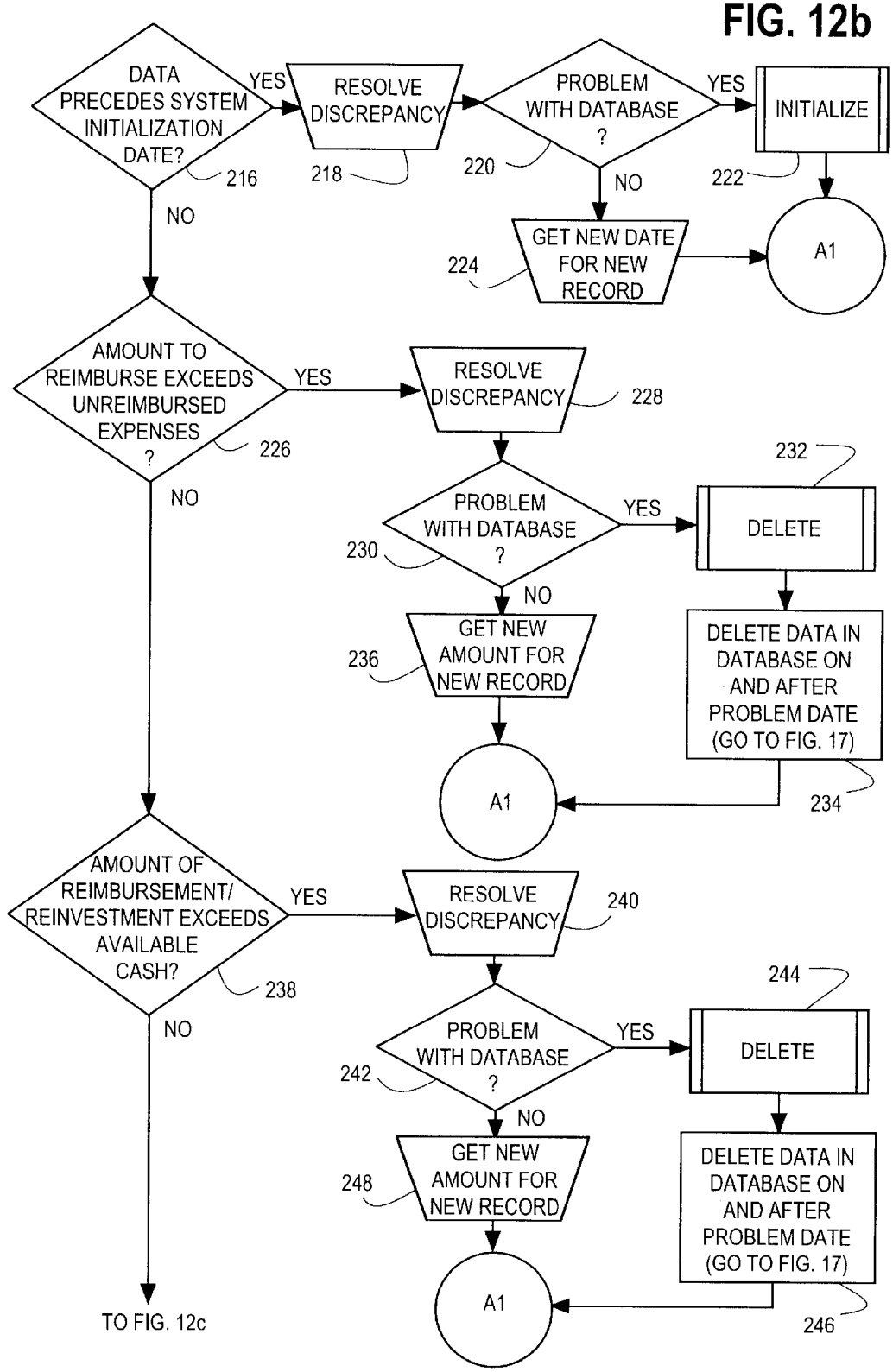
FIG. 12b is a flow chart illustrating how an operator uses the invention to attain the objectives of the invention.
Figure 12C:
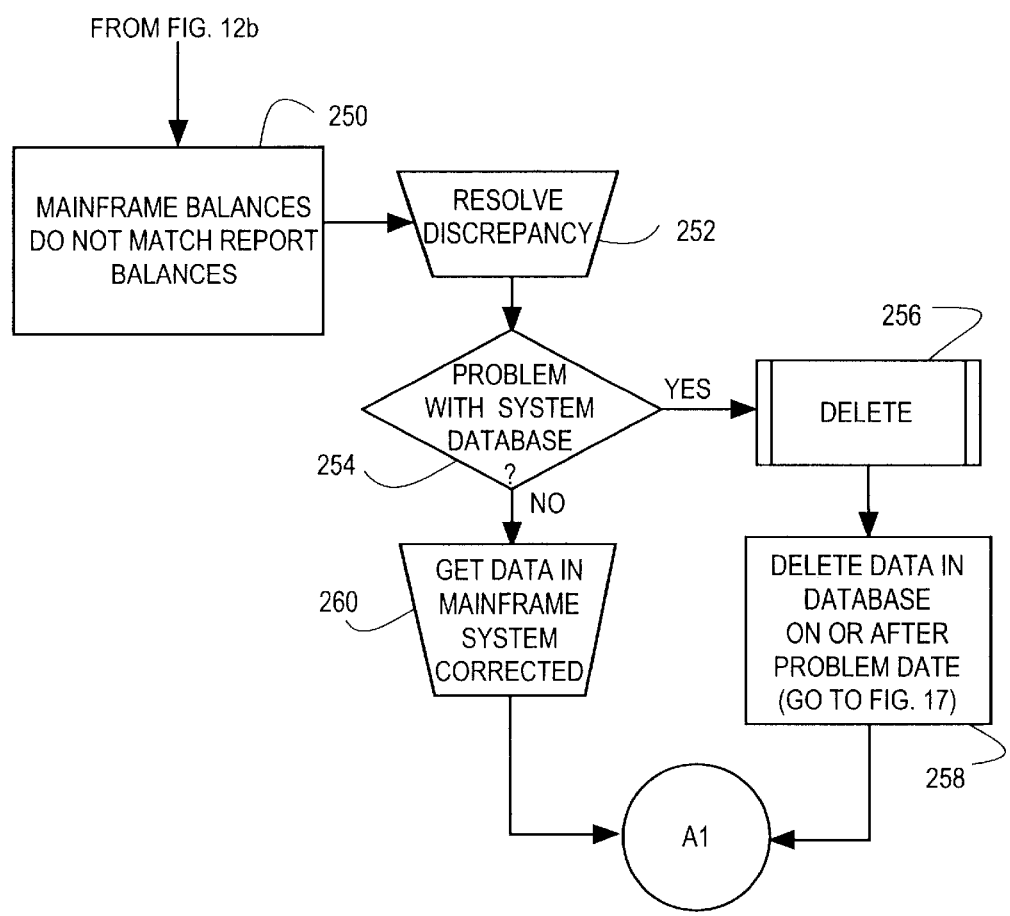
FIG. 12c is a flow chart illustrating how an operator uses the invention to attain the objectives of the invention.

In the event that the user encounters an error during the execution of any of the eight activities, he or she follows the actions outlined in FIGS. 12a, 12b, and 12c. FIG. 12 illustrates the functions of diagnosing and correcting errors. Its logic may, in turn, follow back to FIG. 3b.

FIG. 3b starts with Begin, in which the user starts the process of using the system of this invention. Here the user turns on the Digital Computer 2, monitor, and Printer 5. Having allowed these devices to become initialized, the user then starts the execution of the Computer Program 7. Often this start-up is a two-step process in which the user first invokes the execution of the host programming language—Lotus 1-2-3 Release 3.1 in the example included in Appendix B. Having started the execution of the host language, the user then starts the execution of the Computer Program 7 by retrieving into the Digital Computer 2's memory a LOTUS 1-2-3 file that includes the program.

Upon its retrieval into the Digital Computer 2's memory, the Computer Program 7 automatically begins execution and displays for the user a series of menu choices. We call this the Computer Program 7's "Main Menu."

At Branch 18, New Contract?, the user may elect to re-initialize the system to begin the accounting for a new Indenture Plan. If the user chooses "Yes" at Branch 18, the logic follows to Initialize 20, which is described more fully in FIG. 4.

Having executed Block 20 and initialized the system, the logic proceeds to A1, at which the user may choose to perform another task using the Computer Program 7 or to terminate program execution. As will become apparent in the remaining description of FIG. 3b, the logic following A1 allows the user to perform any number of tasks before choosing to terminate program execution.

If the user chooses "No" at Branch 18, then he or she encounters Branch 22, OPEB Expense to Enter?. At this branch, the user may record a pay-as-you-go OPEB expense that the Corporation has incurred. If the user chooses "Yes" at Branch 22, then he or she executes Enter OPEB Expense 24, which is described more fully in FIGS. 5a, and 5b. Having successfully entered the OPEB expense, the user then follows the logic, again, to A1.

If the choice at Branch 22 is "No," the user encounters Branch 26, Death Benefit/Distribution to Enter?. At this branch, the user may record the deposit by the Carrier of a death benefit or distribution into the Excess Account. If the user chooses "Yes" at Branch 26, then he or she executes Enter Death Benefit/Distribution 28, which is described more thoroughly in FIGS. 6a and 6b. Once the deposit is recorded and processed by the Computer Program 7, the user follows the logic, again, to A1. If the user chooses "No" at Branch 26, then he or she encounters Branch 30, Reimbursement Request to Enter?. At this branch, the user may decide to record the reimbursement of OPEB expenses. If the user chooses "Yes" at Branch 30, then he or she executes Enter Reimbursement Request 32, which is described more thoroughly in FIG. 7a and 7b. Having entered the reimbursement data, the user follows the logic, again, to A1.

If at Branch 30 the user chooses "No," then he or she encounters Branch 34, Premium Reinvestment Request to Enter?. At this branch, the user may record the reinvestment of cash in the Excess Account in additional insurance premiums. If the user decides "Yes" at Branch 34, then he or she executes Enter Premium Reinvestment Request 36, which is described more thoroughly in FIGS. 8a and 8b. Having entered the reinvestment data, the user follows the logic, again, to A1.

If the choice at Branch 34 is "No," the user encounters Branch 38, New Interest Rate to Enter?. At this branch, the user may decide to record a new interest rate. If the user chooses "Yes" at Branch 38, then he or she executes Enter New Interest Rate 40, which is described more thoroughly in FIG. 9. Having entered the new interest rate, the user, again, follows the logic to A1.

If at Branch 38 the user chooses "No," then he or she encounters Branch 42, New Tax Rate to Enter?. At this branch, the user may proceed with the recording of a new tax rate. If the response is "Yes" at Branch 42, the user executes Enter New Tax Rate 44, which is described more thoroughly in FIG. 10. Having entered the new tax rate, the user follows the logic, again, to A1.

If the response at Branch 42 is no, the user encounters Branch 46, Monthly or Annual Report to Generate?. At this branch, the user may direct the system to generate either a monthly or an annual report. If at Branch 46 the user chooses "Yes," then he or she executes Generate Report 48, which is described in more detail in FIGS. 11a and 11b. Having generated a report, the logic follows, again, to A1.

Finally, if the response at Branch 46 is "No," then the user does not desire to perform any of the basic system functions.

The logic proceeds to End at which point he or she finishes interacting with the Computer Program 7. The user chooses the Computer Program 7's Main Menu Option "Quit" which causes the Computer Program 7, as well as the underlying programming language (in our example LOTUS 1-2-3 Release 3.1), to stop execution. The user may then turn off the Digital Computer 2, monitor, and Printer 5 if he or she so desires. FIG. 4 describes the sequence of menu choices required to initialize the system to begin the accounting for a new Indenture Plan contract. The logic of FIG. 4 follows from Block 20 of FIG. 3b and proceeds from Enter to Manual Step 50, Retrieve Interest Rate and Tax Rate, in which the user finds the interest rate and tax rate that are applicable to the Excess Account as of the initialization date. The user then selects the Menu Option Initialize the System 52, at which point he or she enters these rates along with the initialization date. Having initialized the system's databases, the user then selects Menu Option Save the File 54, at which point the newly initialized database will be saved to the current file. After the file is saved, the logic returns to Block 20 of FIG. 3b, via Return.

FIGS. 5a and 5b describes the sequence of menu choices required to record an OPEB expense. The logic of FIGS. 5a and 5b follows from Block 24 of FIG. 3b and proceeds from Enter to Manual Step 56, Retrieve OPEB Expense Data. In Manual Step 56, the user retrieves the dollar amount of the pay-as-you-go expense to be logged for the Corporation. The user then selects Menu Options Add 58, Add a Record 60, and Add an OPEB Expense Record 62, at which point he or she enters the amount of the OPEB expense, as well as the date on which the amount is logged, into the system.

At Branch 64, Date of Expense Data Before Date of Last Record in Database or Before the Initialization Date?, the Computer Program 7 checks to see that the date of the newly entered OPEB expense is appropriate. The program expects that the user enters records in chronological order.

If the user enters a date which precedes the dates of any of the data in the Record Table or the initialization date, then the logic proceeds, via "Yes," to Error 66, at which point the Computer Program 7 informs the user of the problem. The user then returns to the Computer Program 7's Main Menu through Menu Options Quit the Add Record Menu 68 and Quit the Add Menu 70. Then, following Z1, the logic proceeds to FIGS. 12a, 12b, and 12c which shows the logic used to rectify the error.

If the entry was acceptable, then the logic proceeds from Branch 64, via "No." The user then chooses Menu Options Quit the Add Record Menu 72 and Quit the Add Menu 74 to return to the Computer Program 7's Main Menu. The user then selects Menu Option Save the File 76 and saves the updated system databases. With the new data saved, the logic returns, via Return, to Block 24 of FIG. 3b.

Figure 6A:
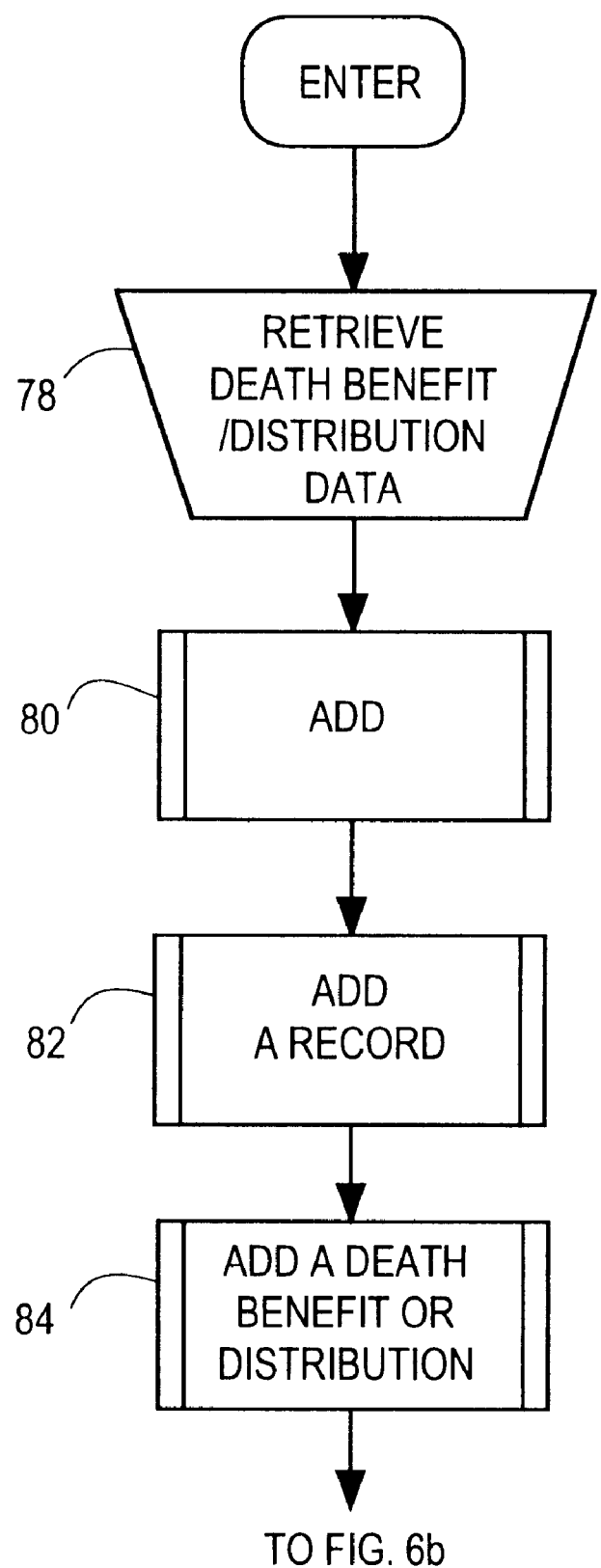
FIG. 6a is a flow chart illustrating how an operator uses the invention to attain the objectives of the invention.

FIGS. 6a and 6b describes the sequence of actions required to record the receipt of a Death Benefit/Distribution into the system. The logic of FIGS. 6a and 6b follows from Block 28 in FIG. 3b and proceeds from Enter to Manual Step 78. At Manual Step 78, the user retrieves data required to be entered. The user then selects the sequence of Menu Options Add 80, Add a Record 82 and Add a Death Benefit or Distribution 84, and he or she then enters the required dates and amount.

At Branches 86 and 88, the system checks to see if the dates entered in the system are appropriate. If the date on which the death benefit/distribution is to be credited to the Excess Account is chronologically before the date of the last data in the Record Table, then the logic proceeds out of Branch 86, via "Yes," to Error 90. Similarly, if the date on which the death benefit/distribution occurred precedes the databases' initialization date, then logic also proceeds to Error 90 from Branch 88.

At Error 90, the Computer Program 7 informs the user of the problem. After the error message, the user then returns to the Computer Program 7's Main Menu by choosing Menu Options Quit the Add Record Menu 92 and Quit the Add Menu 94. At this point, the logic proceeds, via Z1, to FIGS. 12a, 12b and 12c. FIGS. 12a, 12b and 12c shows the logic used to rectify the error.

If the dates entered are acceptable, then the logic proceeds from Branch 88, via "No," to the logic which allows the user to finalize the entry. The user first chooses Menu Options Quit the Add Record Menu 96 and Quit the Add Menu 98 to return to the Computer Program 7's Main Menu. He or she then chooses Menu Option Save the File 100, and saves the updated databases to the current file. At this point the logic returns, via Return, to Block 28 in FIG. 3b.

Figure 7B:
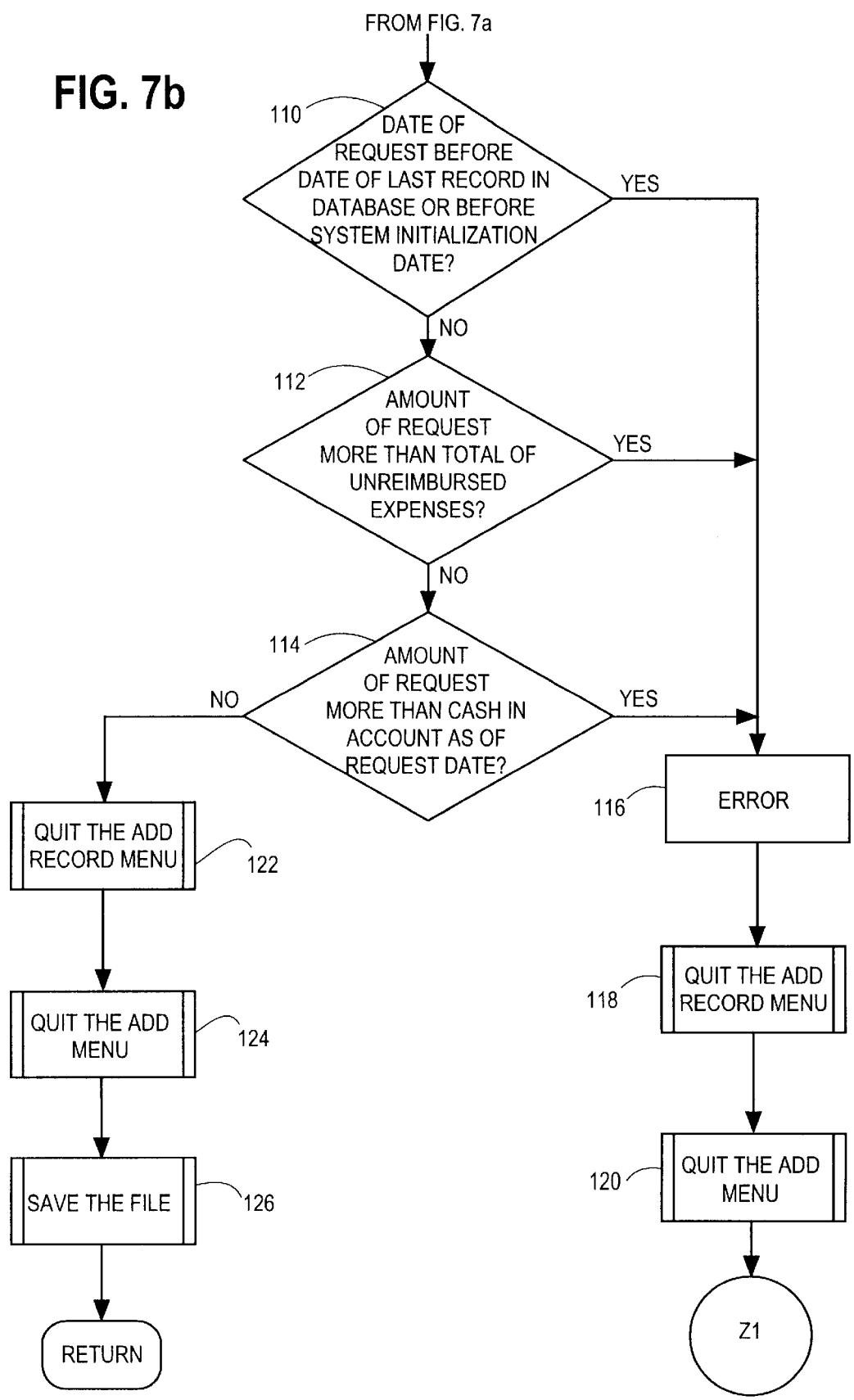
FIG. 7b is a flow chart illustrating how an operator uses the invention to attain the objectives of the invention.

FIGS. 7a and 7b shows the sequence of actions required for a user to record an OPEB Expense Reimbursement in the system. The logic of FIGS. 7a and 7b follows from Block 32 of FIG. 3b and proceeds from Enter to Manual Step 102. At Manual Step 102, the user retrieves the relevant data concerning the Corporation's request for an expense reimbursement. By selecting Menu Options Add 104, Add a Record 106, and Add a Reimbursement Request 108, the user accesses the Computer Program 7's utility which allows him or her to enter the request.

At Branch 110, the Computer Program 7 checks to see that the reimbursement date entered in the system is appropriate. If the date entered by the user precedes the date of the latest data in the Record Table or is on or before the database's initialization date, then Branch 110 will reject the entry, and the logic follows, via "Yes," to Error 116.

Similarly, Branches 112 and 114 test whether the amount of the reimbursement request exceeds either the amount of net unreimbursed expenses or the cash in the Excess Account as of the date of the request. In either case, the Computer Program 7 will reject the entry and send the user to Block Error 116. We note the tests performed in Branches 110 through 114 ensure that any reimbursement request that is successfully entered into the system's databases complies with the terms of the Indenture Agreement.

If the user is brought to Block 116, then he or she returns to the Computer Program 7's Main Menu by choosing Menu Options Quit the Add Record Menu 118 and Quit the Add Menu 120. At this point, the action proceeds through Z1, to FIGS. 12a, 12b, and 12c which describes the steps required for the user to rectify the error and update the system.

If the request is acceptable, then the logic proceeds through Branches 110, 112, and 114, and the Computer Program 7 stores the request as an new entry in the Record Table. The user then returns to the Main Menu by choosing Menu Options Quit the Add Record Menu 122 and Quit the Add Menu 124. By choosing Menu Option Save the File 126, he or she then saves the updated version of the Record Table, and the logic returns, via Return, to Block 32 of FIG. 3b.

Figure 8B:
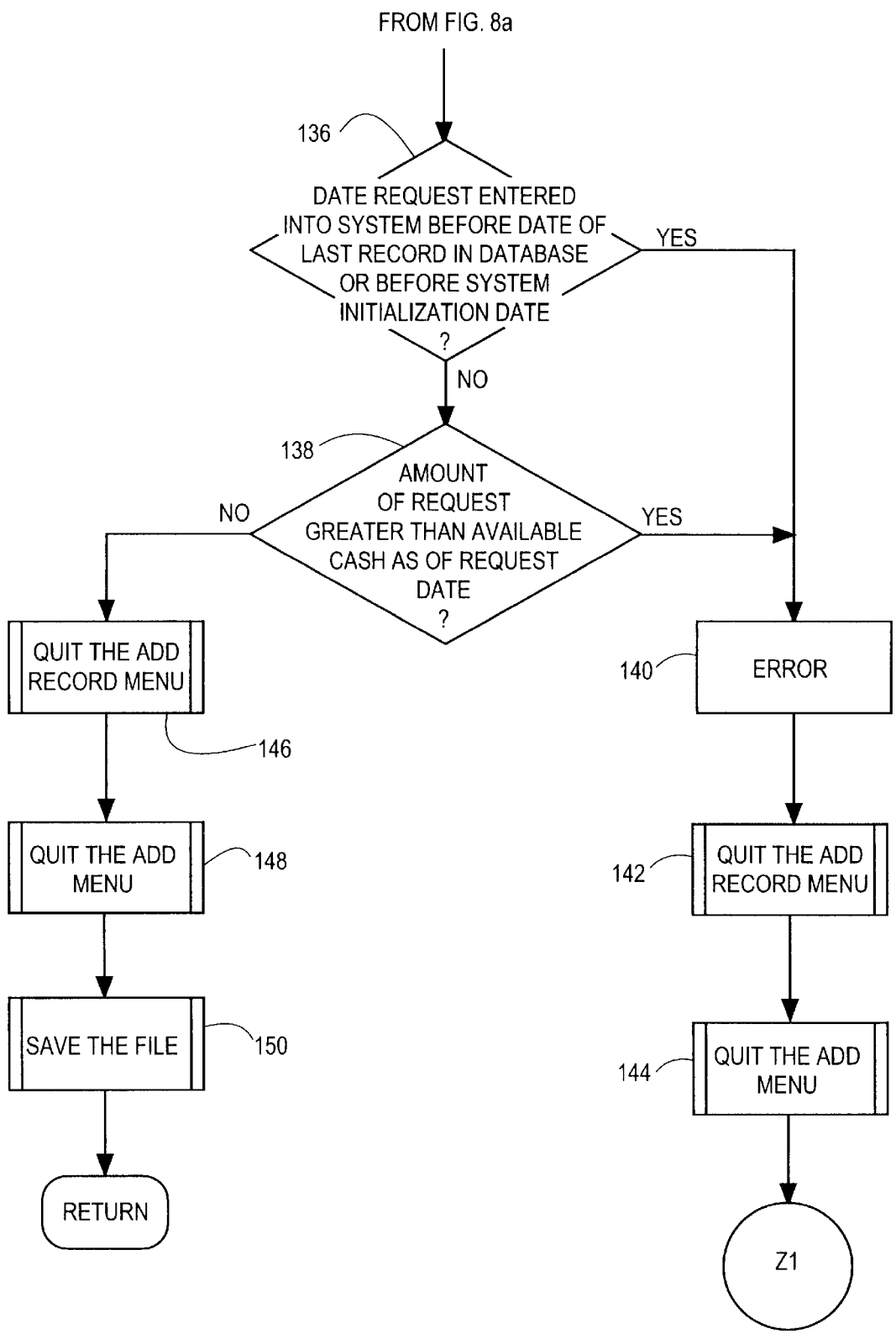
FIG. 8b is a flow chart illustrating how an operator uses the invention to attain the objectives of the invention.

FIGS. 8a, and 8b shows the sequence of actions required for a user to record a withdrawal from the Excess Account for reinvestment in additional premiums. The logic of FIGS. 8a and 8b follows from Block 36 of FIG. 3b and proceeds from Enter to Manual Step 128. At Manual Step 128, the user retrieves the relevant data concerning the Corporation's request for premium reinvestment (see Input Block 10, FIG.

2). By selecting Menu Options Add 130, Add a Record 132, and Add a Premium Reinvestment Request 134, the user accesses the Computer Program 7's utility which allows him or her to enter the request.

At Branch 136, the Computer Program 7 checks to see that the reimbursement date entered in the system is appropriate. If the date entered by the user precedes the date of the latest data in the Record Table or is on or before the database's initialization date, then Branch 136 will reject the entry, and the logic follows, via "Yes," to Error 140.

Similarly, Branch 138 tests whether the amount of the premium reinvestment request exceeds the amount of cash in the Excess Account as of the date of the request. If it does, then the Computer Program 7 will reject the entry and send the user to the Block Error 140. Again, the tests performed in Branches 136 and 138 ensure that any premium reinvestment request that is successfully entered into the system's databases complies with the terms of the Indenture Agreement.

If the user is brought to Block 140, then he or she returns to the Computer Program 7's Main Menu by choosing Menu Options Quit the Add Record Menu 142 and Quit the Add Menu 144. At this point the action proceeds through Z1 to FIG. 12a, 12b and 12c which describes the steps required for the user to rectify the error and update the system.

If the request is acceptable, then the logic proceeds and the Computer Program 7 stores the request as a new entry in the Record Table. The user then returns to the Main Menu by choosing Menu Options Quit the Add Record Menu 146 and Quit the Add Menu 148. By choosing Menu Option Save the File 150, he or she then saves the updated version of the Record Table, and the logic returns, via Return, to Block 36 of FIG. 3b.

Figure 9:
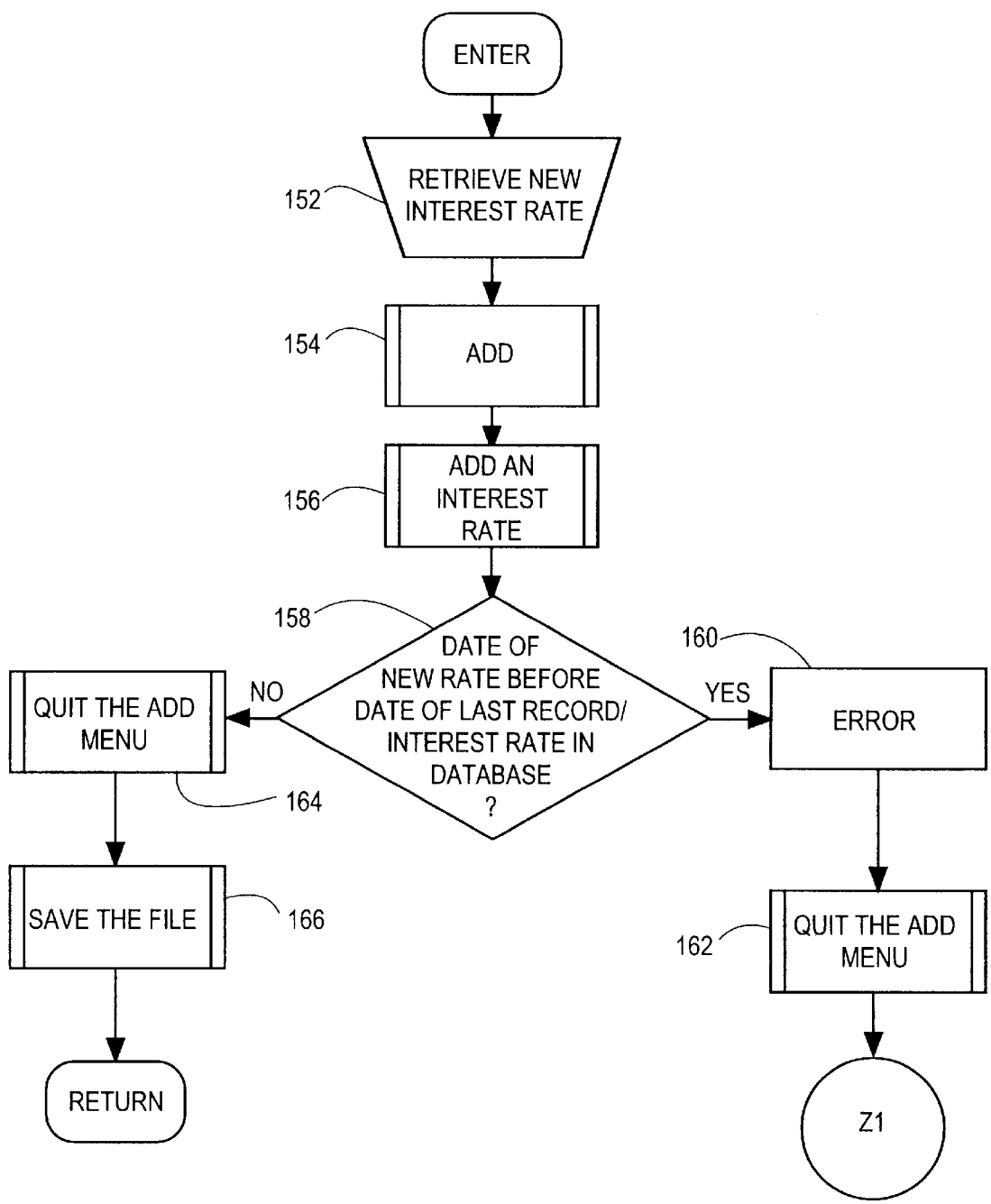
FIG. 9 is a flow chart illustrating how an operator uses the invention to attain the objectives of the invention.

FIG. 9 shows the sequence of actions required for the user to record a new interest rate in the Interest Rate Table. The logic follows from Block 40 of FIG. 3b and proceeds from Enter to Manual Step 152, Retrieve New Interest Rate, in which the user retrieves the interest rate to be entered into the Computer Program 7's database. By selecting Menu Options Add 154 and Add an Interest Rate 156, the user accesses the utility which allows him or her to enter the new rate into the Interest Rate Table.

At Branch 158, Date of New Rate Before Date of Last Record/Interest Rate in Database?, the Computer Program 7 checks to see that the date of the new interest rate is appropriate. If the date entered comes before the date of the latest data in either the Record or Interest Rate Tables, then the Computer Program 7 will reject the entry and bring the user to Block Error 160. From Block 160, the user returns to the Main Menu by selecting Menu Option Quit the Add Menu 162. At this point the action proceeds through Z1, to FIGS. 12a, 12b and 12c which describes the steps required for the user to rectify the error and update the system.

If the entry was acceptable, then the Computer Program 7 enters the new rate and date into the Interest Rate Table, and the user returns to the Main Menu by choosing Menu Option Quit the Add Menu 164. The user then saves the updated Interest Rate Table, by selecting Menu Option Save the File 166. At this point the logic returns to Block 40 in FIG. 3b via Return.

Figure 10:
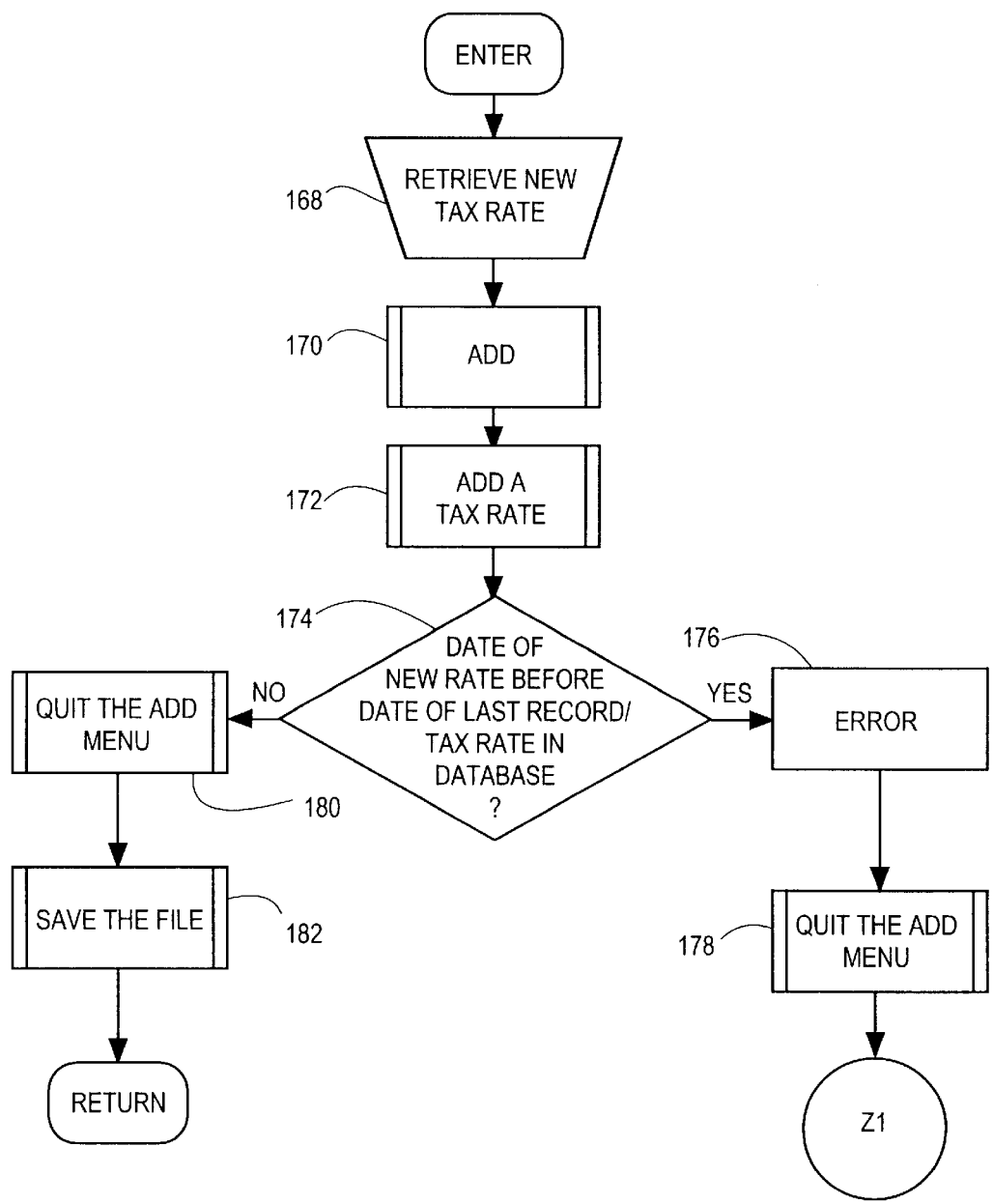
FIG. 10 is a flow chart illustrating how an operator uses the invention to attain the objectives of the invention.

FIG. 10 shows the sequence of actions required for the user to record a new tax rate in the Tax Rate Table. The logic follows from Block 44 of FIG. 3b and proceeds from Enter to Manual Step 168, Retrieve New Tax Rate, in which the user retrieves the tax rate to be entered into the Computer Program 7's database. By selecting Menu Options Add 170 and Add a Tax Rate 172, the user accesses the utility which allows him or her to enter the new rate into the Tax Rate Table.

At Branch 174, Date of New Rate Before Date of Last Record/Tax Rate in Database?, the Computer Program 7 checks to see that the date of the new tax rate is appropriate. If the date entered comes before the date of the latest data in either the Record or Tax Rate Tables, then the Computer Program 7 will reject the entry and bring the user to Block Error 176. From Block 176, the user returns to the Main Menu by selecting Menu Option Quit the Add Menu 178. At this point the action proceeds through Z1, to FIGS. 12a, 12b and 12c, which describes the steps required for the user to rectify the error and update the system.

If the entry was acceptable, then the user returns to the Main Menu by choosing Menu Option Quit the Add Menu 180. The user then saves the updated Tax Rate Table, which includes the new tax rate, by selecting Menu Option Save the File 182. At this point, the logic returns to Block 44 in FIG. 3b via Return.

Figure 11A:
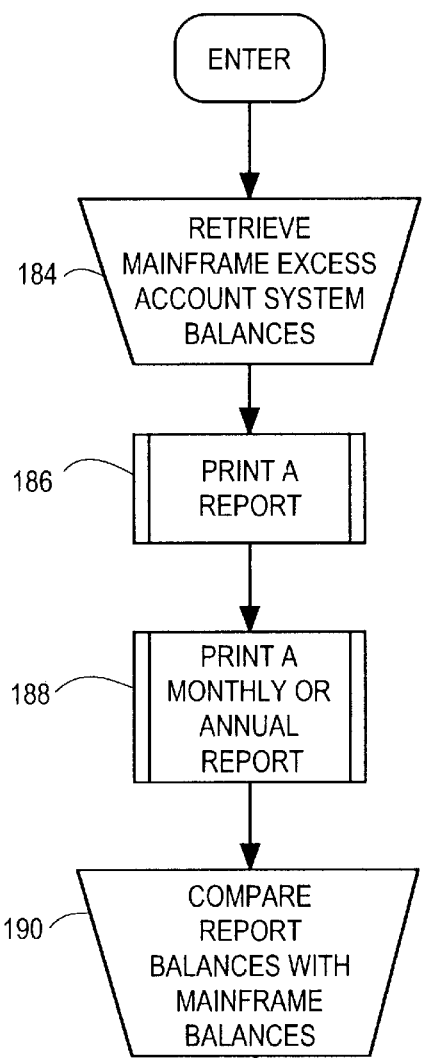
FIG. 11a is a flow chart illustrating how an operator uses the invention to attain the objectives of the invention.
Figure 11B:
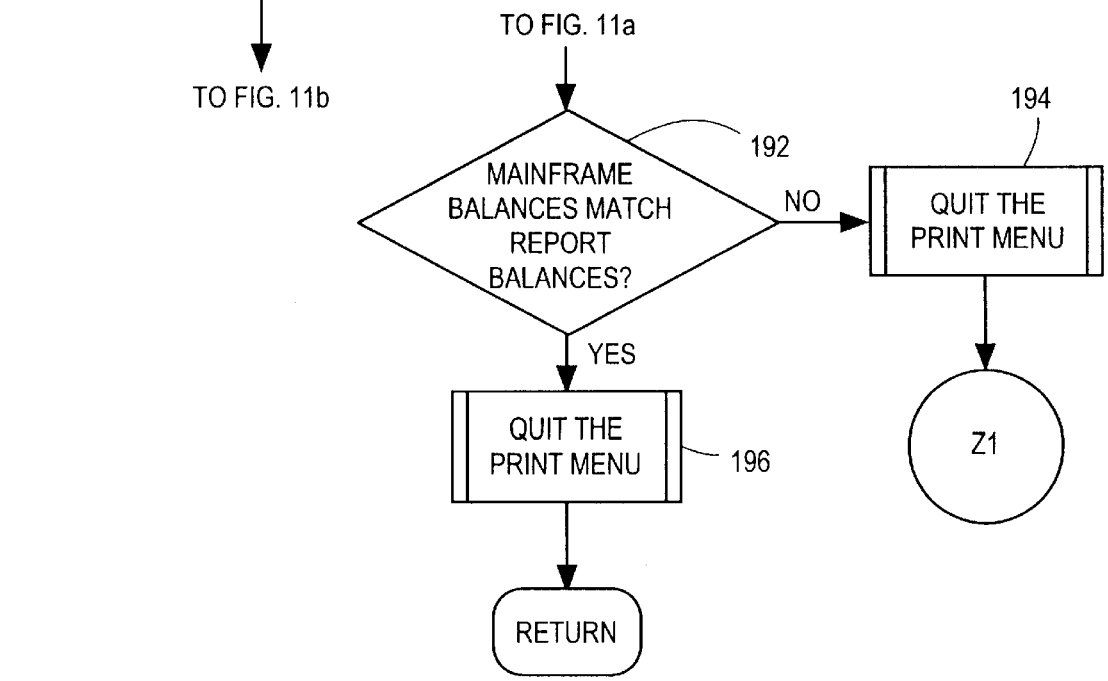
FIG. 11b is a flow chart illustrating how an operator uses the invention to attain the objectives of the invention.

FIGS. 11a, and 11b shows the sequence of actions required for the user to generate one-month and twelve-month accounting reports. The reports include a calculation which compares the Excess Account balances calculated by the system of this invention with equivalent Excess Account balances listed by the Carrier's mainframe system.

The logic of FIGS. 11a and 11b follows from Block 48 of FIG. 3b and proceeds from Enter to Manual Step 184 in which the user retrieves the Excess Account balance data from the Carrier's mainframe system. By selecting Menu Options Print a Report 186 and Print a Monthly or Annual Report 188, the user accesses the Computer Program 7's utility which generates the desired period report, and the Computer Program 7 prints the report via Printer 5.

With the report in hand at Manual Step 190, the user compares the balance Figures from the system of this invention against the Excess Account balance data from the Carrier's mainframe system. Branch 192 shows that if the user finds that the two balance numbers do not match, then he or she returns to the Main Menu via Quit the Print Menu 194 and proceeds to Z1. The action then proceeds through Z1, to FIGS. 12a, 12b, and 12c, which describes the steps required for the user to rectify the error and update the system.

If at Branch 192 the balances match, then the user returns to the Main Menu by selecting Menu Option Quit the Print Menu 196. At this point the logic returns to Block 48 of FIG. 3b via Return.

FIGS. 12a, 12b and 12c describes the logic required for the user to resolve discrepancies and errors in the data he or she enters into the Computer Program 7's databases. The logic of FIGS. 12a, 12b, and 12c follows from FIGS. 5 though 11a and 11b, via Z1. Whenever the logic of the user's interaction with the Computer Program 7 passes through Z1, an error has occurred.

The logic proceeds from Z1 through Menu Options Print 198 and Print Data 200, in which the user directs the Computer Program 7 to print out the latest version of the Record, Interest Rate, and Tax Rate Tables (for an example, see Specimen 1). Having printed out these tables, the user returns to the Computer Program 7's Main Menu by selecting Menu Option Quit the Print Menu 202.

Branches 204, 216, 226, and 238, show the main decision process used by the user to determine the source of the error. If the error was that the date of a new record being added to the Record Table came before the latest data in the Record Table, then the user proceeds through Branch 204, via "Yes," to Manual Step 206, Resolve Discrepancy.

At Manual Step 206 the user reviews the printout of the system's databases, as well as other documents having to do with the Excess Account, in order to identify the origin of the problem. Examples of sources of problems include typographical errors in existing system database entries, inconsistencies in the new request, or previously unrecognized inconsistencies in existing system database entries.

If the source of the problem is the historical database(s) and not a flawed new entry, then the logic follows Branch 208, Problem with Database?, through "Yes," to Menu Option Delete 210. Here, the user chooses Main Menu Option "Delete." At Block 212 the Computer Program 7 deletes all entries in the Record Table, Interest Rate Table, and Tax Rate Table with date(s) on or after the date on which the problem record occurs. (For a more detailed description of how the Delete utility works, see the description of FIG. 17 below.) Having made the deletion(s), the user is ready to correctly re-enter all of the data, including the new record, and the logic returns to the top of FIG. 3b via A1.

If the user finds that the source of the problem is the data from the new entry, then the logic proceeds from Branch 208, through "No," to Manual Step 214, in which the user obtains the correct date for the new record. The logic then proceeds through A1 to the top of FIG. 3b, at which point the user is ready to enter the correct data.

If at Branch 204, the error is not due to the date of a new entry in the Record Table preceding the latest data in the Record Table or the date of a new entry in a Rate Table preceding the latest data in that Rate Table or the Record Table, then the logic proceeds to Branch 216. If the error was that the date entered preceded the databases' initialization date, then the user proceeds through Branch 216, via "Yes," to Manual Step 218, Resolve Discrepancy.

At Manual Step 218 the user reviews the printout of the system's databases, paying particular attention to the system initialization date, which appears as the effective date of the first interest rate and tax rate in the Interest Rate Table and Tax Rate Table, respectively. (For a more detailed description of system initialization, see the description of FIGS. 16a, 16b and 16c in part VIII of this application.)

If the source of the problem is the initialization date of the database and not a flawed record entry, then the logic follows Branch 220, Problem with Database?, through "Yes" to Menu Option 222. Here, the user chooses Main Menu Option "Initialize" and reinitializes the system's databases. Having reinitialized the databases, the user is ready to correctly re-enter all of the data, including the new record, and the logic returns to the top of FIG. 3b via A1.

If the user finds that the source of the problem is the date from the new entry, then the logic proceeds from Branch 220, through "No," to Manual Step 224 in which the user obtains the correct date. The logic then proceeds through A1 to the top of FIG. 3b, at which point the user is ready to enter the correct data.

If at Branch 216, the error is not due to a date preceding the system initialization date, then the logic proceeds to Branch 226. If the error was that the amount of expense to be reimbursed to the Corporation exceeds the total net unreimbursed expenses, then the user proceeds through Branch 226, via "Yes," to Manual Step 228, Resolve Discrepancy.

At Manual Step 228 the user reviews the printout of the system's databases, as well as other documents having to do with the Excess Account, in order to identify the origin of the problem. Examples of sources of problems include typographical errors in existing system database entries, inconsistencies in the new request, or previously unrecognized inconsistencies in existing system database entries.

If the source of the problem is the historical database(s) and not a flawed new entry, then the logic follows Branch 230, Problem with Database?, through "Yes" to Menu Option 232. Here, the user chooses Main Menu Option "Delete" and at Block 234 the Computer Program 7 deletes all entries in the Record Table, Interest Rate Table, and Tax Rate Table with date(s) on or after the date on which the problem record occurs. Having made the deletion(s), the user is ready to correctly re-enter all of the data, including the new record, and the logic returns to the top of FIG. 3b via A1.

If the user finds that the source of the problem is the amount of the new entry, then the logic proceeds from Branch 230, through "No," to Manual Step 236 in which the user obtains the correct data. The logic then proceeds through A1 to the top of FIG. 3b, at which point the user is ready to enter the correct data.

If at Branch 226, the error is not due to a reimbursement request exceeding the amount of net unreimbursed expenses, then the logic proceeds to Branch 238. If the error was that the amount of an expense to be reimbursed to the Corporation or the amount of cash to be reinvested in new premium exceeds the Excess Account balance, then the user proceeds from Branch 238, via "Yes," to Manual Step 240, Resolve Discrepancy.

At Manual Step 240 the user reviews the printout of the system's databases, as well as other documents having to do with the Excess Account, in order to identify the origin of the problem. Examples of sources of problems include typographical errors in existing system database entries, inconsistencies in the new request, or previously unrecognized inconsistencies in existing system database entries.

If the source of the problem is the historical database and not a flawed new entry, then the logic follows Branch 242, Problem with Database?, through "Yes," to Menu Option 244. Here, the user chooses Main Menu Option "Delete," and at Block 246 the Computer Program 7 deletes all entries in the Record Table, Interest Rate Table, and Tax Rate Table with date(s) on or after the date on which the problem record occurs. Having made the deletion(s), the user is ready to correctly re-enter all of the data, including the new record, and the logic returns to the top of FIG. 3b via A1.

If the user finds that the source of the problem is the data from the new entry, then the logic proceeds from Branch 242, through "No," to Manual Step 248 in which the user obtains the correct amount. The logic then proceeds through A1 to the top of FIG. 3b, at which point the user is ready to enter the correct data.

If at Branch 238, the error is not due to an attempted "overdraft" from the Excess Account, then the logic proceeds to Block 250. Here the error is that the ending Excess Account balance listed in a one-month or twelve-month report did not match the corresponding balance from the Carrier's mainframe system, and the user proceeds through Block 250 to Manual Step 252, Resolve Discrepancy.

At Manual Step 252 the user reviews the printout of the system's databases and the Carrier's mainframe system databases, as well as other documents having to do with the Excess Account, in order to identify the origin of the problem. Examples of sources of problems include inconsistencies or typographical errors in existing system or mainframe system database entries.

If the source of the problem is the system, then the logic follows Branch 254, Problem with System Database?, through "Yes" to Menu Option 256. Here, the user chooses Main Menu Option "Delete," and at Block 258 the Computer Program 7 deletes all entries in the Record Table, Interest Rate Table, and Tax Rate Table with date(s) on or after the date on which the problem record occurs. Having made the deletion(s), the user is ready to correctly re-enter all of the deleted data into the system database, and the logic returns to the top of FIG. 3b via A1.

If the user finds that the source of the problem is the data from the mainframe system's database, then the logic proceeds from Branch 254, through "No," to Manual Step 260 in which the user arranges with those responsible for the maintenance of the mainframe system to have its database corrected. At this point the logic proceeds through A1 to the top of FIG. 3b.

The Computer Program 7 is organized about a series of menus which allows the user to enter and delete Excess Account data, as well as to display the account's status and print summary reports. The purpose of this section is to describe in detail the logic which allows the Computer Program 7 to process the data and interact with a user.

Each time data are entered into or calculations are performed by the system, the Computer Program 7 manipulates internal variables. There are three classes of variables: [1] variables whose values are assigned directly from user input; [2] arrays of variables which represent the Record, Interest Rate, Tax Rate, and Transaction Tables; and [3] other variables whose values are defined from calculations performed during the execution of the program. In this document, variable names follow some simple conventions which are intended to allow each name to remind the reader of the type of variable it represents:

- all variable names appear in CAPITALIZED, BOLD FACE LETTERS;
- all variables whose values are supplied from user input have names that are preceded by an asterisk superscript, *;
- all arrays are two-dimensional, having rows and columns. The row of an array is referred to by a subscripted number just after the name of the array, and the column is indexed by a name in parentheses after the array name. (e.g., $TEST_2(date)$ refers to the "date" column of the second row of the array, TEST).
- internal variables which are not part of arrays do not have asterisks preceding them or subscripts and parentheses following them.

We set out below descriptions of the four main arrays used by the Computer Program 7, as well as descriptions of the user-supplied variables and selected internal variables. Other variables will be defined as they are introduced through the remainder of the section.

We commence by defining the four arrays (examples of which appear in Specimens 1 and 2), the first of which is RT=Record Table.

RT is the array that stores the Record Table data. The number of rows of RT varies with the number of records in the record table. The uppermost row is 1, and the numbers increase as one moves down through the table. RT has four columns. For a given row, I, we define the four columns below.

The second column is $RT_I(type)$=type of record in row I.

For any particular row, the type column may take on one of four values: [1] OPEB, which defines the row as recording the payment of a benefit expense by the corporation; [2] DB, which defines the row as recording a death benefit (or policy distribution)—throughout the remainder of this document we refer to both by using the term "death benefit"—paid into the account; [3] reimb, which defines the row as recording an expense reimbursement from the Excess Account to the corporation; and [4] prem, which defines the row as recording a withdrawal from the account for reinvestment in additional insurance premiums.

The first column is $RT_I(date)$=date transaction in row I was made.

For records of type DB, reimb, and prem, the date is the day the money referred to in row I actually entered or left the Excess Account. For type OPEB, the date is the date the system's operator enters the expense. Unless otherwise stated, all dates include day, month, and year.

The third column of any entry is $RT_I(amount)$=dollar amount of record.

The amount is always a positive dollar (and cents) quantity. The type of the record determines what the quantity represents: OPEB expense amount, DB amount, withdrawal amount for expense reimbursement, or withdrawal amount for reinvestment in additional insurance premiums.

The fourth column of any row is defined as $RT_I(dbdate)$=date of death benefit calculation.

This column is used only for records of type DB. If the record registers that a death benefit has been deposited into the Excess Account, dbdate, along with amount, is used by the Computer Program 7 to calculate the interest accrued on a death benefit between the date the benefit is calculated to be paid and the date the money is finally deposited into the Excess Account. That is, when the money is deposited on date, the total sum deposited equals amount plus the interest accrued on amount between dbdate and date. Note that for the three other types of records, this column is left blank.

Next we define

IRT=Interest Rate Table.

The Interest Rate Table stores all of the interest rates used by the Computer Program 7 to make interest calculations. The number of rows in IRT varies with the number of rates entered by the system user. The top row is numbered 1, and the numbers increase as one moves down rows in the table. Each row has two columns. For a given row, I, $IRT_I(date)$=date on which interest rate becomes effective; and $IRT_I(rate)$=annual interest rate effective on $IRT_I(date)$.

Note that each rate is effective from its effective date until the effective date of the interest rate on the line below it in the table. The last (bottom) rate in the table is considered by the Computer Program 7 to be effective from its effective date, onward.

Tax rates and their effective dates are similarly defined:

TRT=Tax Rate Table;

$TRT_I(date)$=date tax rate becomes effective; and $TRT_I(rate)$=annual tax rate effective on $TRT_I(date)$.

Specimen 1 shows an example of each of these three tables. On the left of Specimen 1, we find a Record Table with four rows. For example, $RT_3(type)$=reimb, and $RT_2(dbdate)$=02/23/93. In the center of Specimen 1, we find an Interest Rate Table with one row, and on the right, a Tax Rate Table with one row. In this example, $TRT_1(date)$=02/15/93.

Note that RT, IRT, and TRT all store user-supplied records of Excess Account transactions and effective interest and tax rates. The last, and most complex, array TT=Transaction Table, however, is generated by the Computer Program 7 from the data stored in the first three arrays. The system uses the Transaction Table to generate Excess Account balances and cumulative statistics, much as a bank's computer system generates balance and year-to-date interest information for each of its customer's accounts.

Each row, I, of the Transaction Table includes fourteen columns of data, which represent all of the account statistics relevant to the Excess Account as of a specified date. In particular:

| | |
|---|---|
| $TT_i(date)$ = | date for which the account statistics have been generated; |
| $TT_i(bal)$ = | balance in the Excess Account as of $TT_i(date)$; |
| $TT_i(int)$ = | interest earned since date of previous entry in Transaction Table, $TT_{i-1}(date)$, on previous balance, $TT_{i-1}(bal)$ plus interest credited for death benefits deposited on $TT_i(date)$; |
| $TT_i(tax)$ = | tax accrued on interest earned, $TT_i(int)$; |
| $TT_i(OPEB)$ = | total OPEB expenses entered on $TT_i(date)$; |
| $TT_i(DB)$ = | total death benefits deposited in the account on $TT_i(date)$; |
| $TT_i(reimb)$ = | total account withdrawals on $TT_i(date)$ which were made to reimburse the corporation for its OPEB and tax expenses; |
| $TT_i(prem)$ = | total account withdrawals on $TT_i(date)$ which were made to provide cash for additional insurance premium payments; |
| $TT_i(cum\_int)$ = | cumulative interest earned from the opening date of the Excess Account through $TT_i(date)$; |
| $TT_i(cum\_tax)$ = | cumulative taxes accrued on earned interest from the opening date of the Excess Account through $TT_i(date)$; |
| $TT_i(cum\_OPEB)$ = | cumulative OPEB expenses paid by the corporation from the start of the Indenture Plan through $TT_i(date)$; |
| $TT_i(cum\_DB)$ = | cumulative death benefits deposited into the Excess Account from its opening date through $TT_i(date)$; |
| $TT_i(cum\_reimb)$ = | cumulative withdrawals made from the Excess Account, from its opening date through $TT_i(date)$, to reimburse the corporation for out-of-pocket payments for OPEB and tax expenses; and |
| $TT_i(cum\_prem)$ = | cumulative withdrawals made from the Excess Account, from its opening date through $TT_i(date)$, which provided cash used for additional insurance premium payments. |

The top row of the Transaction table is numbered 0 and contains information regarding the status of the account the day it is opened. Thus, $TT_0(date)$=day the Excess Account is opened; and $TT_0(bal)$=initial balance in the Excess Account.

While the initial balance is usually zero, it may be initialized at some other value, should the need arise. Aside from $TT_0(date)$ and $TT_0(bal)$, all other columns in row 0 of the Transaction Table have values of zero. As with the three other data tables, row numbers increase as one moves down through the Transaction Table.

Specimen 2 shows an example of a Transaction Table. This Transaction Table has four rows, zero through three. In this example $TT_1(OPEB)$=$1,000.00, and $TT_3(cum\_prem)$=$500.00.

Associated with each of the four arrays is a variable which, at any time during the execution of the Computer Program 7, records the current number of the last row in the array:

RTC=Record Table Counter,
the number of the last row in the Record Table;

IRTC=Interest Rate Table Counter,
the number of the last row in the Interest Rate Table;

TRTC=Tax Rate Table Counter,
the number of the last row in the Tax Rate Table; and TTC=Transaction Table Counter,
the number of the last row in the Transaction Table.

As an example, we note that the counters associated with tables shown in Specimens 1 and 2 have the values: RTC=4, IRTC=1, TRTC=1, and TTC=3.

Because much of the interactivity of the system is controlled through menus, other than entering menu choices, a user enters only a few types of data into the Computer Program 7: dates, amounts, rates, and "Yes/No" type answers. For the first three types of user input, we define five user-supplied variables that are used over and over again by the Computer Program 7:

*DATE=a user-supplied date,
which usually includes day, month, and year;

*I_RATE=a user-supplied interest rate,
which the user enters into the system in a decimal format (e.g., 15% would be entered as 0.15);

*T_RATE=a user-supplied tax rate,
which the user enters into the system in a decimal format (e,g., 35% would be entered as 0.35);

*AMOUNT=a user-supplied dollar amount,
which is always a non-negative number; and

*TEMP=a user-supplied input that is stored temporarily.

The specific definitions of the contents of these "generic" variables depends, of course, on the context in which the Computer Program 7 requests the information during the course of its execution. Therefore, in describing the program logic we will often designate context-specific definitions of *DATE, *I_RATE, *T_RATE, *AMOUNT, and *TEMP at the point that the user enters data that is captured by one of these variables.

In addition to making menu choices and supplying dates, rates, and amounts, the system user does make "Yes/No" type answers to Computer Program 7 questions. These "Yes/No" type answers always guide the Computer Program 7's logic through flow chart "branches." In these cases, we refer only to the user's choice and resulting program action—e.g., "if the user chooses "Yes," then the logic proceeds to . . . "—and omit any reference to variable names.

In the formulae that follow, we adopt some standard conventions regarding mathematical notation. First, the symbol:=denotes the process of assigning a value to a variable. For example,

X:=5, means that the value 5 has been assigned to the variable named X. When data is erased from variables, we say that the variable has been assigned the value blank. Thus, to denote the elimination of the value 5 stored in X we would write X:=blank.

Second, when comparing two variables that contain dates, DATE1 and DATE2, we say that

DATE1<DATE2 if the date stored in DATE1 chronologically precedes that in DATE2. Similarly,

DATE1≦DATE2 if the date stored in DATE1 is the same as or precedes that stored in DATE2, and

DATE1=DATE2 if the dates stored in the two variables are the same.

Third, we define .NE. to be the logical binary operator "not equal to." For example, it is true that 1 .NE. 2,
but it is false that (1+4) .NE. (8−3).

Fourth, we define the arithmetic function ROUND (x,i), which rounds a decimal number to some integral number of digits, I, to the right of the decimal place. Some examples of how ROUND operates include:

ROUND (12.445,3)=12.445
ROUND (12.445,2)=12.45
ROUND (12.445,1)=12.4
ROUND (12.445,0)=12
ROUND (12.445,−1)=10
ROUND (12.445,−2)=0

The execution of the Computer Program 7 begins when the user sits down at a computer and invokes the system of this invention. This action is denoted in Manual Step 262 of FIG. 13, Start Program, and leads directly to Main Menu 264.

At the Main Menu, the user can select from one of six menu options. When one of the options is selected, the Computer Program 7 will either call on another menu or directly perform the function. At Main Menu 264, the user may select from Menu Options Add 266, Print 270, Save 274, Initialize 278, Delete 282 and Quit 286.

If the user selects Add 266, the Computer Program 7 follows to Add New Data 268, whose logic is illustrated in detail in FIG. 14. If the user selects Print 270, the Computer Program 7 goes to Print Data or a Report 272, whose logic is diagramed in detail FIG. 15.

If the user selects Save 274, the logic proceeds to Save Current Version of File 276. At Block 276 the Computer Program 7 saves all of the relevant system data currently stored in the memory of the Digital Computer 2 in the Local Excess Account Transaction Database 16.

If the user selects Initialize 278, the Computer Program 7 advances to Initialize the System 280, whose logic is described in detail in FIGS. 16a 16b and 16c. If the user selects Delete 282, the Computer Program 7 goes to Delete Previously Entered Data 284, which is illustrated in detail in FIG. 17.

Finally, if the user selects Quit 286, the Computer Program 7 goes to the Branch 288, Really Quit?, where it asks the user to reconfirm his or her intention to terminate program execution. If the user responds "Yes," then Computer Program 7 advances to Exit the Program 290, at which point it stops execution, and the user's session with the system terminates.

If, at Branch 288, the user responds "No," then the Computer Program 7 will return to Main Menu 264 and await the user's next menu selection. Note that after the execution of Blocks 268, 272, 276, 280, and 284, the Computer Program 7 also returns to Main Menu 264 to await the user's next menu selection.

We turn now to FIG. 14, whose logic follows Add New Data 268 in FIG. 13. In FIG. 14, the Computer Program 7 proceeds from Enter to Add Menu 292. The Add Menu allows a user to choose the type of data he or she would like to add to the system's database(s). The user can select Menu Options Record 294, Interest 298, Tax 302, or Quit 306.

Figure 18:
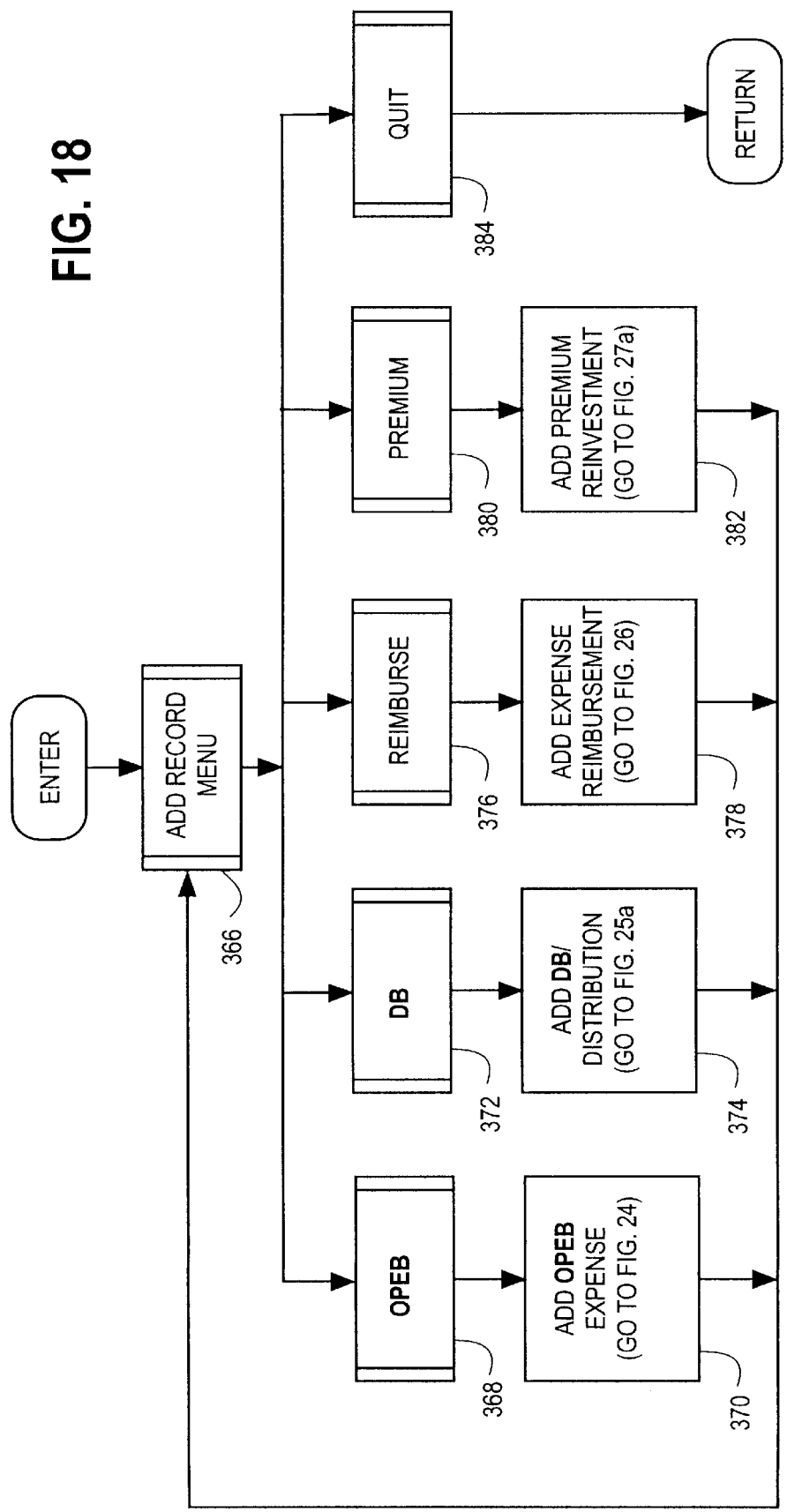
FIG. 18 is a flow chart diagramming the structure and operation of the invention's computer program.

If the user selects Record 294, the Computer Program 7 goes to Add a Record 296, whose logic is illustrated in detail in FIG. 18. Add a Record 296 produces another menu with options that allow the user to enter data into the Record Table.

Figure 19:
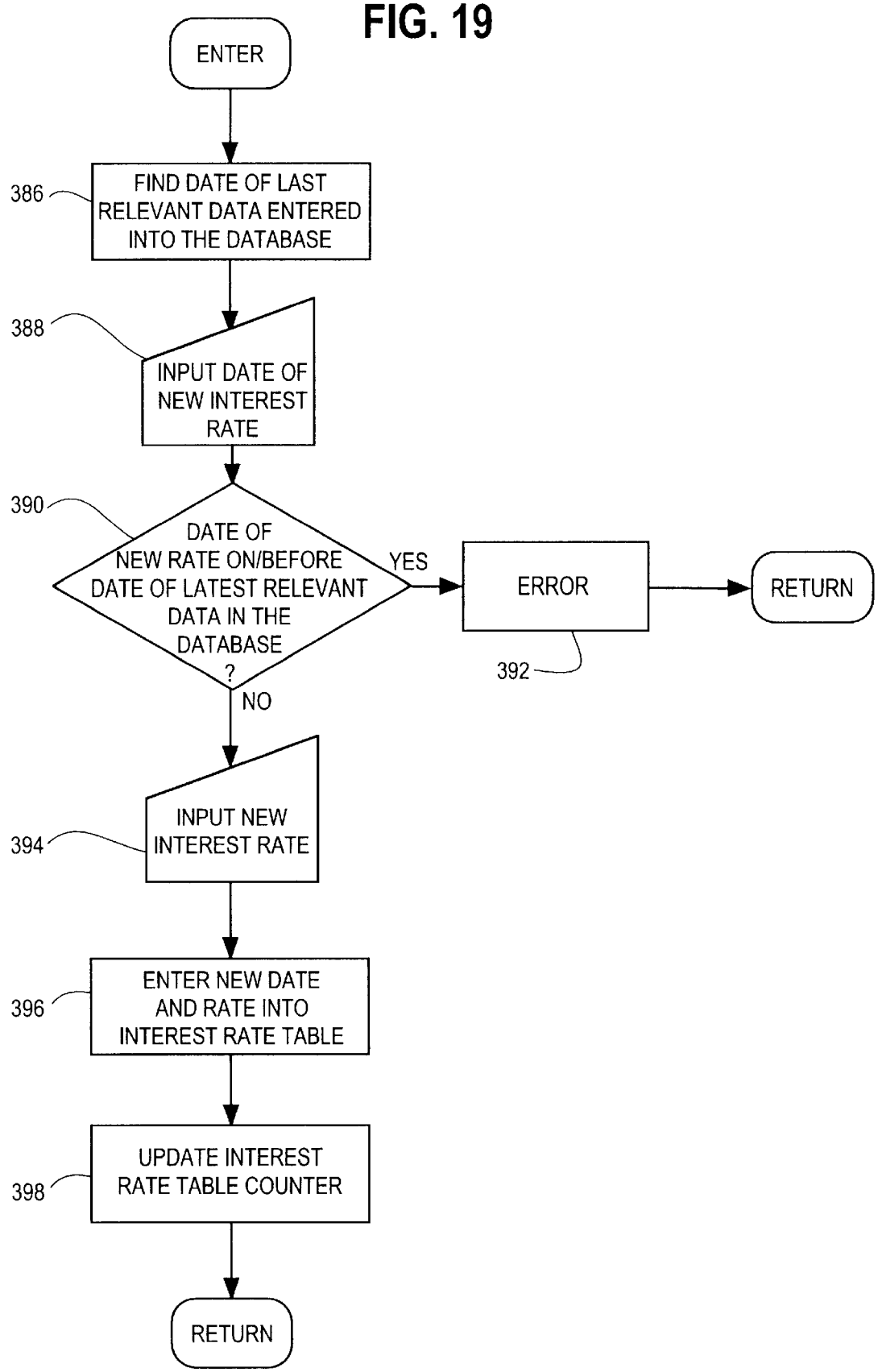
FIG. 19 is a flow chart diagramming the structure and operation of the invention's computer program.

If the user selects Interest 298, the Computer Program 7 goes to Add an Interest Rate 300, whose logic is further illustrated in FIG. 19. Similarly, if the user selects Tax 302, the Computer Program 7 goes to Add a Tax Rate 304, whose logic is further illustrated in FIG. 20. In Blocks 300 and 304, the Computer Program 7 provides a means for the user to enter interest rates into the Interest Rate Table and tax rates into the Tax Rate Table, respectively.

Finally, if the user Selects Quit 306, the logic follows to Return, at which point the Computer Program 7 returns to Main Menu 264 in FIG. 13. Note that once the tasks involved in the execution of Blocks 296, 300, or 304 are complete, control is returned to Add Menu 292 (rather than to Main Menu 264), at which point the user may decide to enter additional data into the system.

Figure 15:
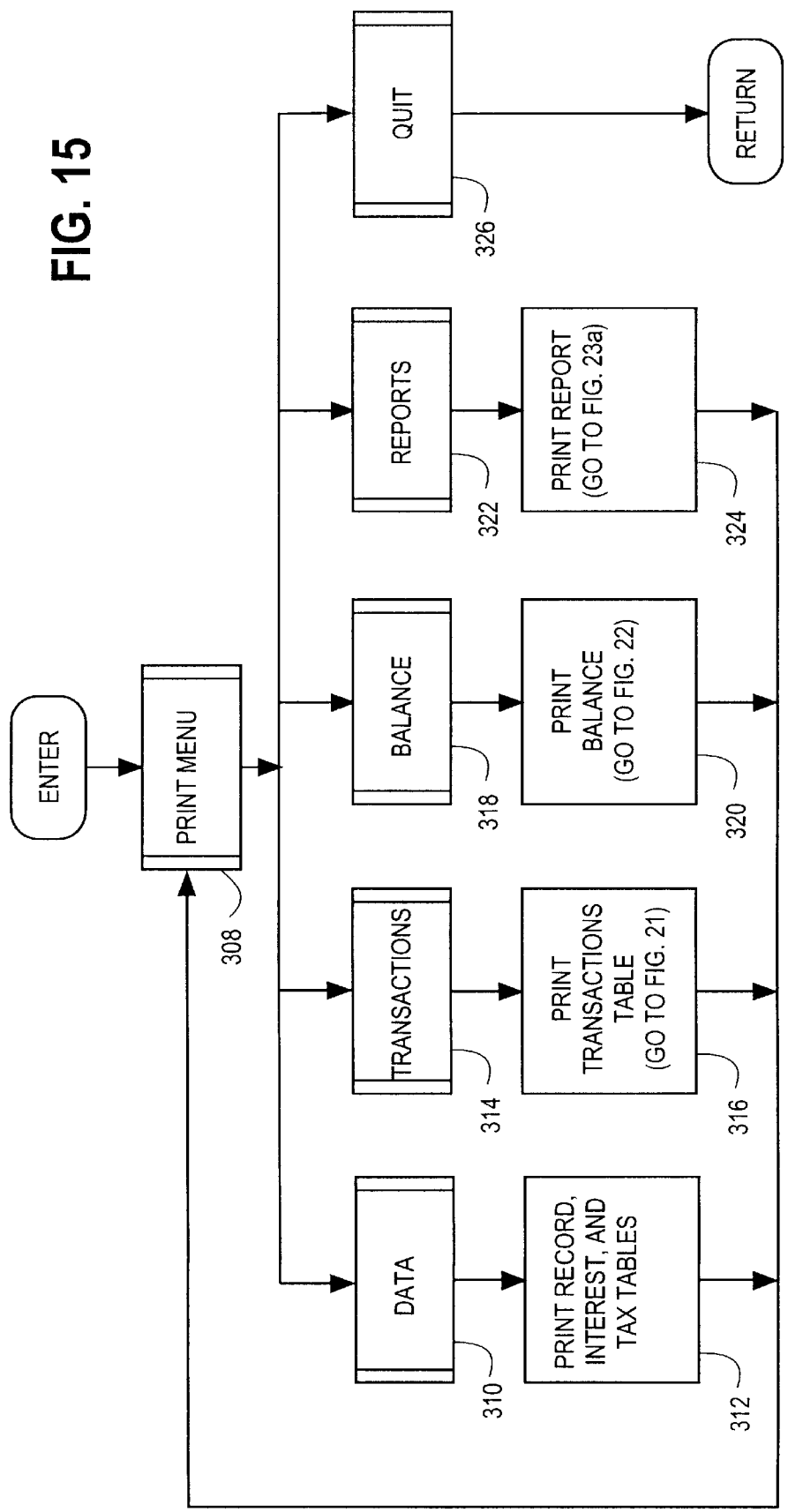
FIG. 15 is a flow chart diagramming the structure and operation of the invention's computer program.

Turning now to FIG. 15, where the logic follows from Print Data or a Report 272 in FIG. 13, the Computer Program 7 proceeds from Enter to Print Menu 308. The Print Menu allows the user to print one of four types of reports. From Print Menu 308, the user may select from Menu Options Data 310, Transactions 314, Balance 318, Reports 322 and Quit 326.

If the user Selects Data 310, the logic follows to Block 312, Print Record, Interest, and Tax Tables, where the Computer Program 7 transmits the three tables to print on Printer 5. For an example of the printout, see Specimen 1.

Figure 21:
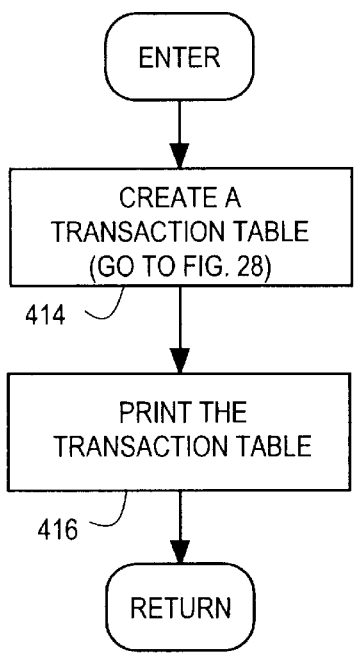
FIG. 21 is a flow chart diagramming the structure and operation of the invention's computer program.

If the user selects Transactions 314, the Computer Program 7 advances to Print Transaction Table 316, whose logic is further illustrated in FIG. 21. In Block 316, the Computer Program 7 generates a Transaction Table and transmits it to print on Printer 5. For an example of a printout of the Transaction Table, see Specimen 2.

Figure 22:
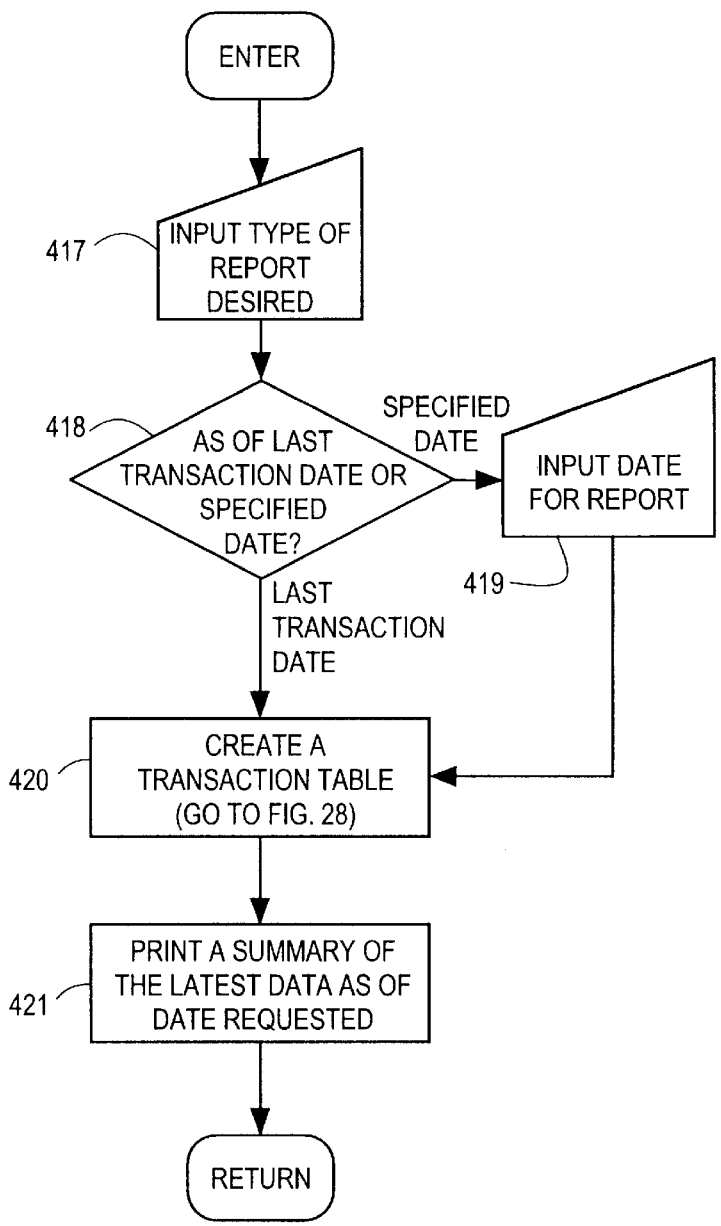
FIG. 22 is a flow chart diagramming the structure and operation of the invention's computer program.

If the user selects Balance 318, the Computer Program 7 goes to Print Balance 320, whose logic is further illustrated in FIG. 22. In Block 320, the Computer Program 7 again generates a Transaction Table. In this case, however, the report it produces summarizes only the final line of the Transaction Table. For an example of a printout of the balance, see Specimen 3. Note that the data shown in Specimen 3, matches the data in the last line of the Transaction Table shown in Specimen 2; these two specimens were, in fact, created from the same transaction table.

Figure 23A:
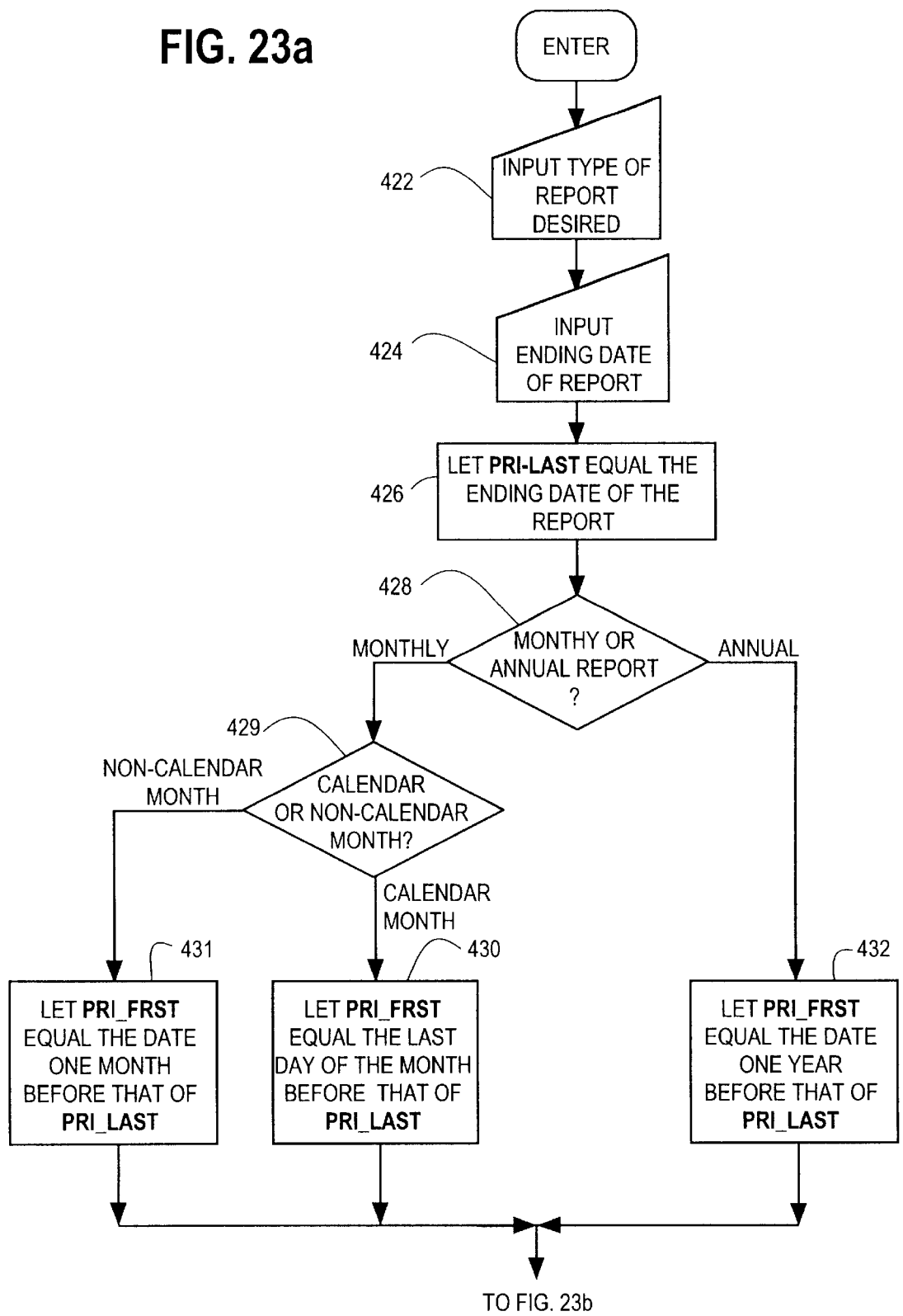
FIG. 23a is a flow chart diagramming the structure and operation of the invention's computer program.
Figure 23B:
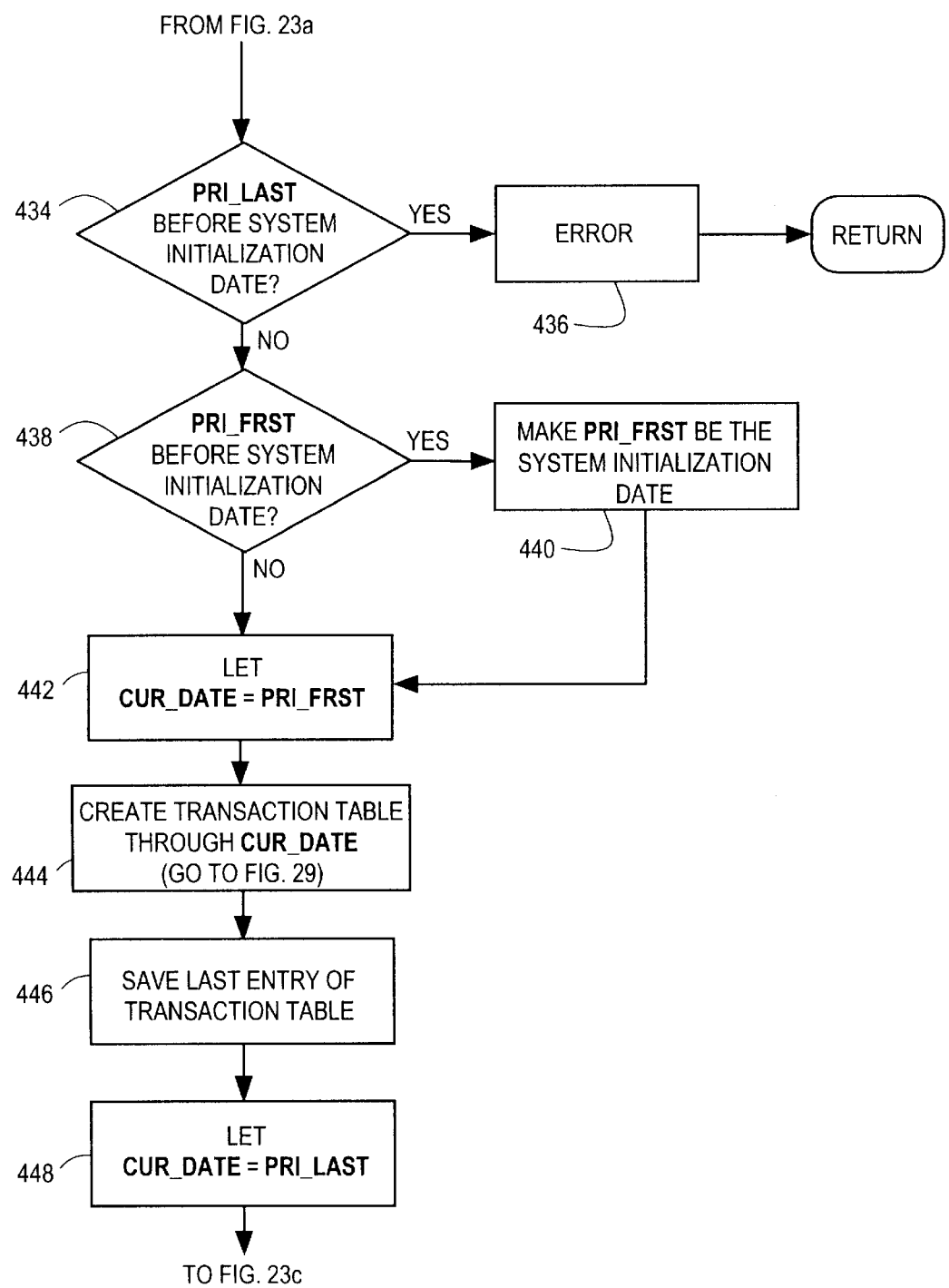
FIG. 23b is a flow chart diagramming the structure and operation of the invention's computer program.
Figure 23C:
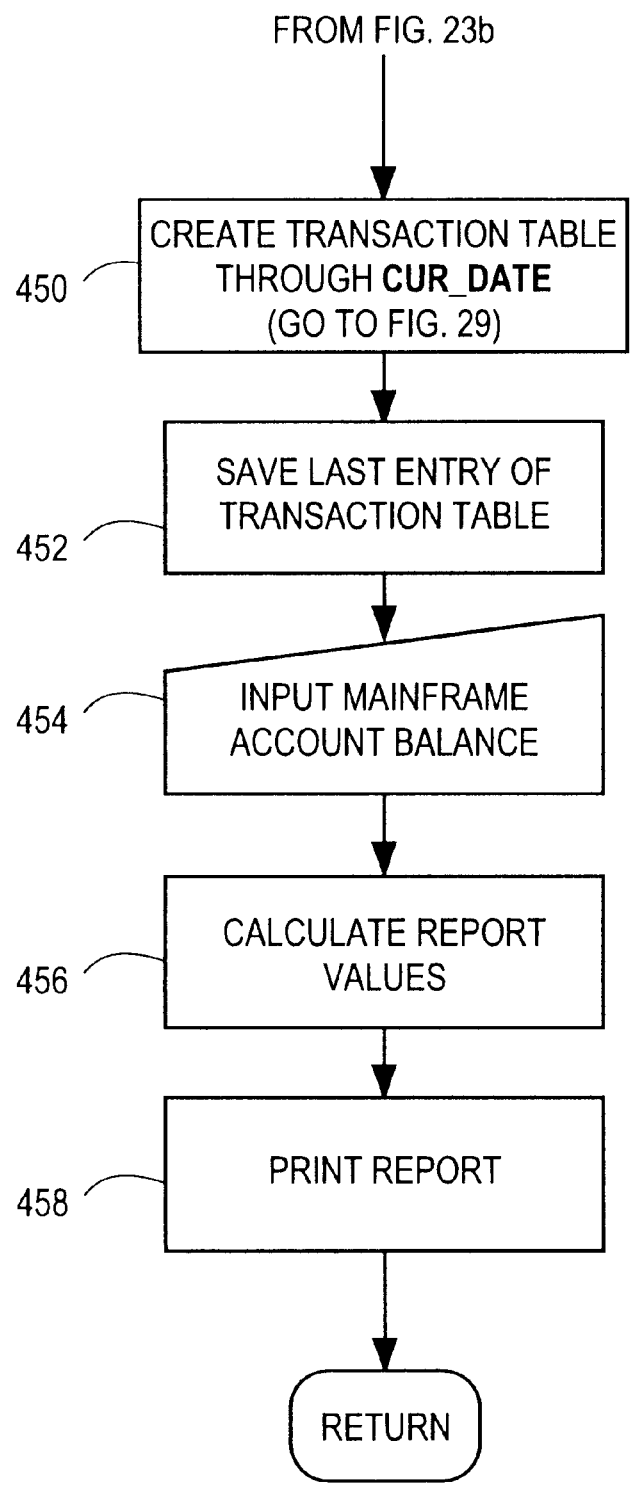
FIG. 23c is a flow chart diagramming the structure and operation of the invention's computer program.

If the user selects Reports 322, the Computer Program 7 goes to Print Report 324, whose logic is further illustrated in FIGS. 23a, 23b, and 23c. The Report may be either a one-month (either calendar month or non-calendar month) or twelve-month summary of the changes in the cumulative statistics of the Excess Account. For examples of the one-month and twelve-month reports, see Specimens 5 and 6, respectively.

Finally, if the user Selects Quit 326, the Computer Program 7 exits the Print Menu and returns to Main Menu 264, via Return. After the execution of Blocks 312, 316, 320, or 324, however, the logic returns to Print Menu 308, at which point the user is free to generate another printout, if he or she desires to do so.

We turn now to FIGS. 16a, 16b, and 16c which depicts the logic of the initialization process. The Computer Program 7 enters FIGS. 16a, 16b, and 16c from Block 280, Initialize the System, in FIG. 13. In FIGS. 16a, 16b, and 16c the logic advances from Enter through a sequence of actions required to initialize the system's four tables.

In Block 328, Erase Data in Record Table, the Computer Program 7 eliminates the data in all of the rows of the Record Table. That is, for each row, I, from the first row, 1, through the last row, RTC, the Computer Program 7 sets $RT_I(date):=$blank;
$RT_I(type):=$blank;
$RT_I(amount):=$blank; and
$RT_I(dbdate):=$blank.

In Block 330, the same initialization process continues for the Interest Rate Table. For each row, I, from 1 through IRTC, the Computer Program 7 sets $IRT_I$(date):=blank; and $IRT_I$(rate):=blank.

In Block 332, the initialization process continues for the Tax Rate Table. For each row, I, from 1 through TRTC, the Computer Program 7 sets $TRT_I$(date):=blank; and $TRT_I$(rate):=blank.

Finally, in Block 334, the Computer Program 7 erases any data currently stored in the Transaction Table. For any row, I, from 0 through TTC, the Computer Program 7 sets $TT_I$(date):=blank;

$TT_I$(int):=blank;

$TT_I$(tax):=blank;

$TT_I$(OPEB):=blank;

$TT_I$(DB):=blank;

$TT_I$(reimb):=blank;

$TT_I$(prem):=blank;

$TT_I$(cum_int):=blank;

$TT_I$(cum_tax):=blank;

$TT_I$(cum_OPEB):=blank;

$TT_I$(cum_DB):=blank;

$TT_I$(cum_reimb):=blank;

$TT_I$(cum_prem):=blank; and $TT_I$(bal):=blank.

In Input Block 336, Input Initialization Date, the user enters into the Computer Program 7 via the Terminal with Keyboard 3 the date on which Excess Account record keeping begins:

*DATE=date to begin Excess Account

*DATE:=user-supplied date.

In Block Input 338, Input Initial Interest Rate, the user enters into the Computer Program 7 via the Terminal with Keyboard 3 the rate at which Excess Account deposits earn interest as of the initialization date, *DATE:

*I_RATE=interest rate in effect on *DATE

*I_RATE:=user-supplied rate.

Similarly, in Input Block 340, Input Initial Tax Rate, the user enters into the Computer Program 7 via the Terminal with Keyboard 3 the corporation's effective tax rate as of date, *DATE:

*T_RATE=tax rate in effect on *DATE

*T_RATE:=user-supplied rate.

Finally, in Input Block 342, Input Initial Balance, the user enters into the Computer Program 7 via the Terminal with Keyboard 3 the initial Excess Account balance:

*AMOUNT=Excess Account balance as of *DATE

*AMOUNT:=user-supplied dollar value.

Typically, this balance will be zero.

With the execution of Input Blocks 336 through 342, the user enters all of the data required to initialize the system. In Blocks 344 through 350, the Computer Program 7 then uses this data to set initial values for the four tables.

In Initialize Interest Rate Table 344, the Computer Program 7 sets

IRTC:=1;

$IRT_{IRTC}$(date):=*DATE; and $IRT_{IRTC}$(rate):=*I_RATE.

In Block 346, Initialize Tax Rate Table, the Computer Program 7 sets

TRTC:=1;

$TRT_{TRTC}$(date):=*DATE; and $TRT_{TRTC}$(rate):=*TRATE.

Thus, the Computer Program 7 initializes the two tables each to have one row which stores the initial date and rate supplied by the user.

In Initialize Transaction Table 348, the Computer Program 7 initializes row 0 of the Transaction Table with the initialization date and balance:

TTC:=0;

$TT_{TTC}$(date):=*DATE;

$TT_{TTC}$(int):=0;

$TT_{TTC}$(tax):=0;

$TT_{TTC}$(OPEB):=0;

$TT_{TTC}$(DB):=0;

$TT_{TTC}$(reimb):=0;

$TT_{TTC}$(prem):=0;

$TT_{TTC}$(cum_int):=0;

$TT_{TTC}$(cum_tax):=0;

$TT_{TTC}$(cum_OPEB):=0;

$TT_{TTC}$(cum_DB):=0;

$TT_{TTC}$(cum_reimb):=0;

$TT_{TTC}$(cum_prem) 0; and $TT_{TTC}$(bal):=*AMOUNT.

Finally in Block 350, Initialize Record Table Counter, the Computer Program 7 sets

RTC:=0.

Note that, unlike the Interest Rate Table or Tax Rate Table, the Record Table contains no records at the end of its initialization. With the initialization process complete, the Computer Program 7 returns the user, via Return, to Main Menu 264 in FIG. 13.

Specimens 7 and 8 show examples of the Record Table, Interest Rate Table, Tax Rate Table, and Transaction Table just after these databases have been initialized. We note that in this example, the initialization date is Jan. 1, 1993, and the initial Excess Account Balance is $0.00. The applicable interest rate and tax rate as of Jan. 1, 1993 are listed as 5% and 50%, respectively.

We turn now to FIG. 17, which illustrates in detail the logic of Block 284 of FIG. 13, Delete Previously Entered Data. The Delete utility is available as a means for correcting errors in the Computer Program 7's databases. Specifically, the option allows the user to input the date on which a flawed record occurred. The Computer Program 7 will then erase all rows in the Record, Interest Rate, and Tax Rate Tables with dates on or after the delete-date and reset RTC, IRTC, and TRTC appropriately.

We note that the Delete utility does not erase rows from the Transaction Table. This task is unnecessary, because the Transaction Table is generated from the other three databases. Thus, changes to the Record, Interest Rate, and/or Tax Rate Table via the Delete function will be automatically reflected in the Transaction Table.

At the start of FIG. 17, the Computer Program 7 proceeds from Enter to Input Date to Delete Data Back Through 352. At Input Block 352, the user enters the delete-date:

*DATE=date back through which data is to be deleted

*DATE:=user-supplied date.

At Branch 354, Really Want to Delete?, the Computer Program 7 prompts the user to reconfirm his or her intention to delete data. If the user's response is "No," the Computer Program 7 returns to Main Menu 264 in FIG. 13, via Return, without making any changes to the tables. With a response of "Yes," however, the logic proceeds to Branch 356, Delete-Date On Or Before System Initialization Date?, in which the Computer Program 7 will confirm that the user does not intend to delete all system data, back through the system's initialization date. (If the user does intend to delete all the data, he or she should use the Initialization utility of the Computer Program 7.) If

*DATE$\leq$TT$_0$(date), then the logic continues to Error 358 in which the Computer Program 7 signals to the user that an error has occurred (i.e., that the date entered precedes the database's history and is thus unacceptable). The logic then returns, via Return, to Main Menu 264 in FIG. 13 at which point the user is free to make another attempt at deleting data or initializing the system, if he or she so desires.

If, however,

*DATE>TT$_0$(date)

then the logic continues to Block 360, Delete Records in Record Table. Here the Computer Program 7 finds the last row in the Record Table to be retained after the deletion:

LAST=row in Record Table below which all rows are erased

LAST:=max{i: RT$_i$(date)<*DATE}.

Having determined the last row of the Record Table to be saved, the Computer Program 7 then proceeds to erase all of the subsequent rows, by assigning RT$_I$(date):=blank;

RT$_I$(type):=blank;

RT$_I$(amount):=blank; and

RT$_I$(dbdate):=blank, for each row, I, from LAST+1 through RTC, in the Record Table. (Note that if LAST+1>RTC, then nothing is erased.) Finally, the Computer Program 7 resets RTC to reflect any deletions that have occurred in the Record Table:

RTC:=LAST.

At Block 362, Delete Rates in Interest Rate Table, the Computer Program 7 goes through the same deletion steps as it performed for the Record Table. First, the Computer Program 7 finds the last row in the Interest Rate Table to be retained after the deletion:

LAST=row in Interest Rate Table below which all rows are erased

LAST:=max{i: IRT$_i$(date)<*DATE}.

Having determined the last row of the Interest Rate Table to be saved, the Computer Program 7 then proceeds to erase all of the subsequent rows, by assigning IRT$_I$(date):=blank; and IRT$_I$(rate):=blank, for each row, I, from LAST+1 through IRTC, in the Interest Rate Table. (Note that if LAST+1>IRTC, then nothing is erased.) Finally, the Computer Program 7 resets IRTC to reflect any deletions that have occurred in the Interest Rate Table:

IRTC:=LAST.

At Block 364, Delete Rates in Tax Rate Table, the Computer Program 7 goes through exactly the same deletion steps as it had for the Interest Rate Table. First, the Computer Program 7 finds the last row in the Tax Rate Table to be retained after the deletion:

LAST=row in Tax Rate Table below which all rows are erased

LAST:=max{i: TRT$_i$(date)<*DATE}.

Having determined the last row of the Tax Rate Table to be saved, the Computer Program 7 then proceeds to erase all of the subsequent rows, by assigning TRT$_I$(date):=blank; and TRT$_I$(rate):=blank, for each row, I, from LAST+1 through TRTC, in the Tax Rate Table. (Note that if LAST+1>TRTC, then nothing is erased.) The Computer Program 7 then resets TRTC to reflect any deletions that have occurred in the Tax Rate Table:

TRTC:=LAST.

Once these steps are complete, the Computer Program 7 returns to Main Menu 264 in FIG. 13 via Return, at which point the user may request another menu selection if he or she desires.

Specimen 9 shows an example in which Record Table, Interest Rate Table, and Tax Rate Table began with the data presented in Specimen 1. In this case, the data shown in Specimen 1 was deleted back through Mar. 15, 1993. Thus, Specimen 9 includes only data with dates that precede Mar. 15, 1993. We note that after the deletion, RTC=1, IRTC=1, and TRTC=1.

Turning now to FIG. 18, where the logic follows from Add a Record 296 in FIG. 14, the Computer Program 7 proceeds from Enter to Add Record Menu 366. The Add Record Menu provides the user with a means for choosing the type of Excess Account transaction that he or she would like to log in the system's Record Table. At Add Record Menu 366, the user may select from Menu Options OPEB 368, DB 372, Reimburse 376, Premium 380, and Quit 384.

If the user selects OPEB 368, the Computer Program 7 will guide him or her through the process of entering the data necessary to record the corporation's out-of-pocket payment of OPEB expenses. In this case, the Computer Program 7 continues to Add OPEB Expense 370, whose logic is described in more detail in FIG. 24. Having completed this function, the Computer Program 7 then returns to Add Record Menu 366.

If the user selects DB 372, the Computer Program 7 goes to Add DB/Distribution 374, which is described in more detail in FIGS. 25*a* and 25*b*. Here the Computer Program 7 guides the user through the process of entering data concerning the deposit of proceeds from a death benefit into the Excess Account. Having completed this function, the Computer Program 7 returns to Add Record Menu 366.

If the user selects Reimburse 376, the Computer Program 7 goes to Add Expense Reimbursement 378. In this instance, the Computer Program 7 guides the user through the process of entering the data associated with the withdrawal of funds from the Excess Account when those funds are used to reimburse the Corporation for out-of-pocket OPEB-related expenses. After executing Block 378, which is illustrated in more detail in FIGS. 26*a* and 26*b*, Computer Program 7 then returns to Add Record Menu 366.

Figure 27B:
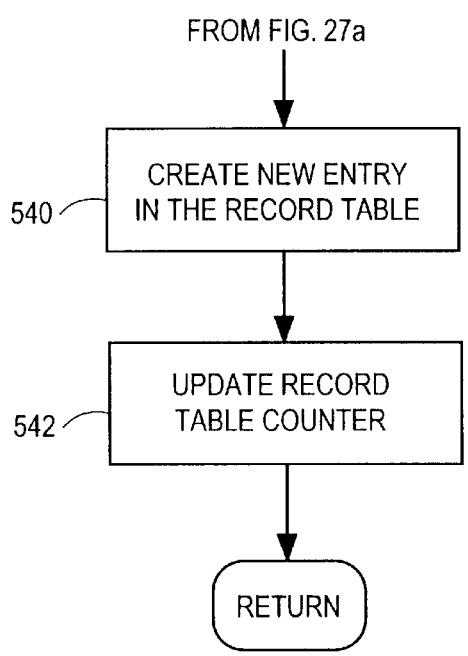
FIG. 27b is a flow chart diagramming the structure and operation of the invention's computer program.

If the user selects Premium 380, the Computer Program 7 goes to Add Premium Reinvestment 382, whose logic is described in more detail in FIG. 27*a* and 27*b*. Here the Computer Program 7 guides the user through the process of entering data required to log the withdrawal of cash from the Excess Account for the purpose of paying additional insurance premiums. Having completed this function, the Computer Program 7 then returns to Add Record Menu 366.

Finally, if the user selects Quit 384, the Computer Program 7 leaves the Add Record Menu 366 and returns to Add Menu 292 in FIG. 14, via Return.

We turn now to FIG. 19, which depicts the steps involved in entering a new interest rate into the Interest Rate Table. The logic of FIG. 19 follows from Add an Interest Rate 300 in FIG. 14 and proceeds from Enter to Block 386, in which it finds the date of the latest relevant data entered into one of the system's databases:

LAST_DATE=date of latest relevant data in the system's databases

LAST_DATE:=max{$RT_{RTC}$(date), $IRT_{IRTC}$(date)}.

At Input Block 388, the user enters the effective date for the new rate to be entered into the Interest Rate Table:

*DATE=date new interest rate becomes effective

*DATE:=user-supplied date.

Having accepted the user-supplied date, the Computer Program 7 proceeds to Branch 390, Date of New Rate On/Before Date of Latest Relevant Data in the Database?, in which it compares the two dates. If

*DATE≦LAST_DATE, then the logic proceeds to Error 392, where the Computer Program 7 notifies the user that a new interest rate cannot be effective on or before the relevant events already stored in the system's databases have occurred. The Computer Program 7 then returns, via Return, to Add Menu 292 in FIG. 14, at which point the user is free to make another attempt at adding a new interest rate, if he or she so desires.

If, however,

*DATE>LAST_DATE, then the logic proceeds to Input Block 394, Input New Interest Rate. At Block 394 the user enters

*I_RATE=annual rate to add to the Interest Rate Table

*I_RATE:=user-supplied rate.

Then at Block 396, Enter New Date and Rate into Interest Rate Table, the Computer Program 7 makes the following assignments:

$IRT_{IRTC+1}$(date):=*DATE; and $IRT_{IRTC+1}$(rate):=*I_RATE.

Having successfully added a new row to the Interest Rate Table, the Computer Program 7 proceeds to Update Interest Rate Table Counter 398, where it increments the counter to reflect the addition of a new row:

IRTC:=IRTC+1.

The Computer Program 7 then returns to Add Menu 292 in FIG. 14, via Return, at which point the user is free to add another record or rate to one of the system's databases if he or she desires.

Specimen 10 is an example in which an additional interest rate has been added to the data shown in Specimen 1. The new interest rate is 5% and is effective as of Apr. 1, 1993. We note that IRTC=2 after the update.

Figure 20:
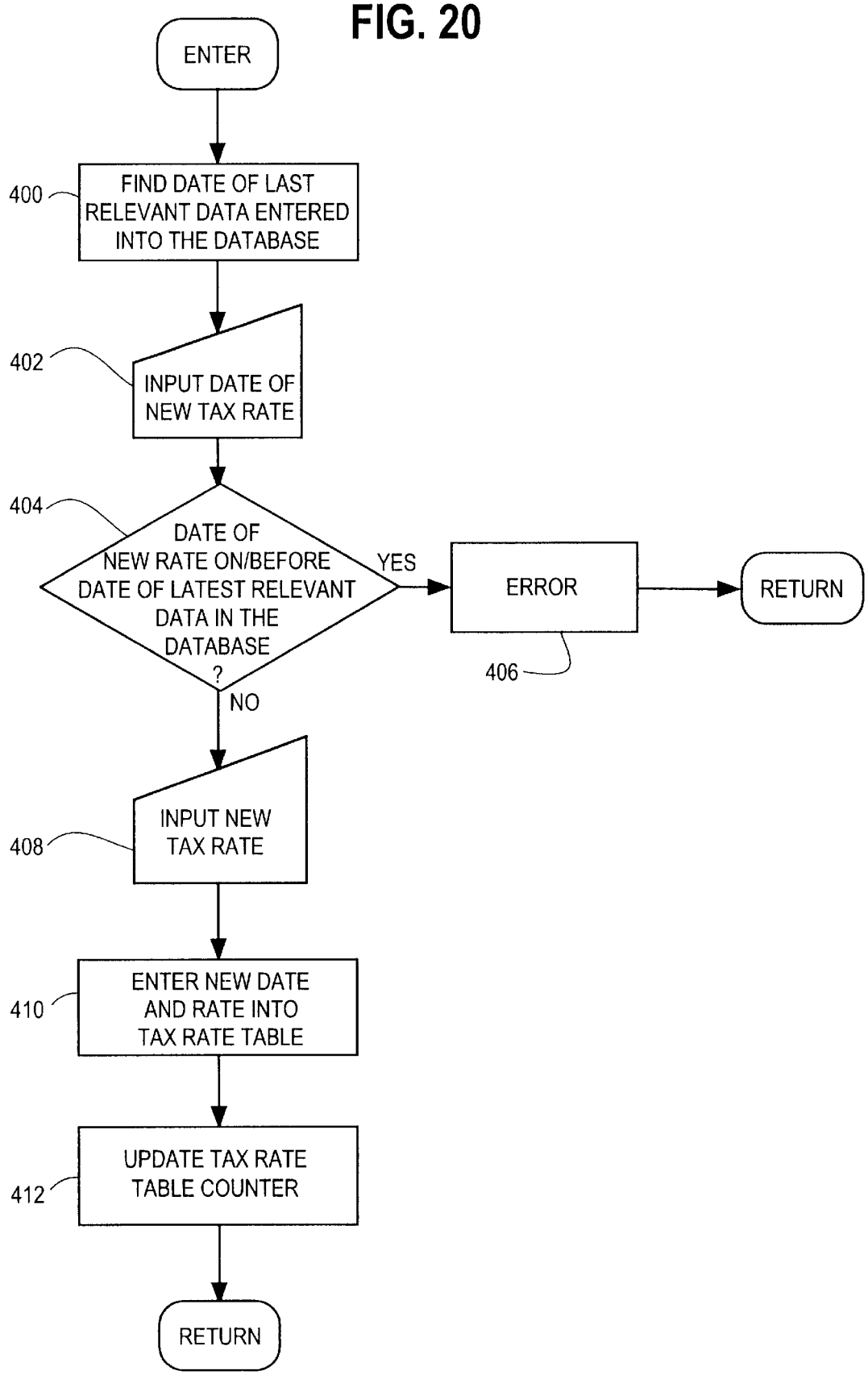
FIG. 20 is a flow chart diagramming the structure and operation of the invention's computer program.

We turn now to FIG. 20, which depicts the steps involved in entering a new tax rate into the Tax Rate Table. The logic of FIG. 20 follows from Add a Tax Rate 304 in FIG. 14, and parallels that of FIG. 19. The Computer Program 7 proceeds from Enter to Block 400, in which it finds the date of the latest relevant data entered into one of the system's databases:

LAST_DATE=date of latest relevant data in the system's databases

LAST_DATE:=max{$RT_{RTC}$(date), $TRT_{TRTC}$(date)}.

At Input Block 402, the user enters the effective date for the new rate to be entered into the Tax Rate Table:

*DATE=date new tax rate becomes effective

*DATE:=user-supplied date.

Having accepted the user-supplied date, the Computer Program 7 proceeds to Branch 404, Date of New Rate On/Before Date of Latest Relevant Data in the Database?, in which it compares the two dates. If

*DATE≦LAST_DATE then the logic proceeds to Error 406, where the Computer Program 7 notifies the user that a new tax rate cannot be effective on or before the relevant events already stored in the system's databases have occurred. The Computer Program 7 then returns, via Return, to Add Menu 292 in FIG. 14, at which point the user is free to make another attempt at adding a new tax rate, if he or she so desires.

If, however,

*DATE>LAST_DATE, then the logic proceeds to Input Block 408, Input New Tax Rate. At Block 408, the user enters

*T_RATE=rate to add to the Tax Rate Table

*T_RATE:=user-supplied rate.

Then at Block 410, Enter New Date and Rate into Tax Rate Table, the Computer Program 7 makes the following assignments:

$TRT_{TRTC+1}$(date):=*DATE; and $TRT_{TRTC+1}$(rate):=*T_RATE.

Having successfully added a new row to the Tax Rate Table, the Computer Program 7 proceeds to Update Tax Rate Table Counter 412, where it increments the counter to reflect the addition of a new row:

TRTC:=TRTC+1.

The Computer Program 7 then returns to Add Menu 292 in FIG. 14, via Return, at which point the user is free to add another record or rate to one of the system's databases if he or she desires.

Specimen 11 is an example in which an additional tax rate has been added to the data shown in Specimen 10. The new tax rate is 40% and is effective as of Apr. 15, 1993. We note that TRTC=2 after the update.

We turn now to FIG. 21, which depicts the tasks required to print the Transaction Table. The logic of FIG. 21 follows from Print Transaction Table 316 in FIG. 15 and proceeds from Enter to Create a Transaction Table 414. In Block 414, whose logic is illustrated in more detail in FIG. 28, the Computer Program 7 systematically constructs the Transaction Table using the user-supplied data provided in the Record, Interest Rate, and Tax Rate Tables.

Once the construction process in Block 414 is complete, the logic proceeds to Block 416, where the Computer Program 7 transmits the Transaction Table to print on Printer 5. Having transmitted the table, the Computer Program 7 returns, via Return, to Print Menu 308 in FIG. 15, at which point the user can choose another menu selection.

Turning now to FIG. 22, which describes the tasks required to generate an Excess Account Balance Statement, the logic follows from Print Balance 320 in FIG. 15. The Excess Account Balance Statement is a summary of the account's status as of a particular date, either the date of the last transaction in the Transaction Table or as of a specified date (for an example, see Specimen 3).

The logic proceeds from Enter to Input Block 417, Input Type of Report Desired, at which point the user enters the type of report desired:

*TEMP=type of report desired ("last transaction date" or "specified date")

*TEMP:=user-defined input.

The logic then proceeds to Branch 418, As of Last Transaction Date or Specified Date?. If it is as of a specified date, the logic proceeds to Input Block 419, where the user enters the date for the report:

*DATE=date for which cumulative balances are requested

*DATE:=user-supplied date.

For both outcomes of Branch 418, the logic continues at Block 420, Create a Transaction Table. Create a Transaction Table involves exactly the same logic as that in FIG. 21.

Figure 28:
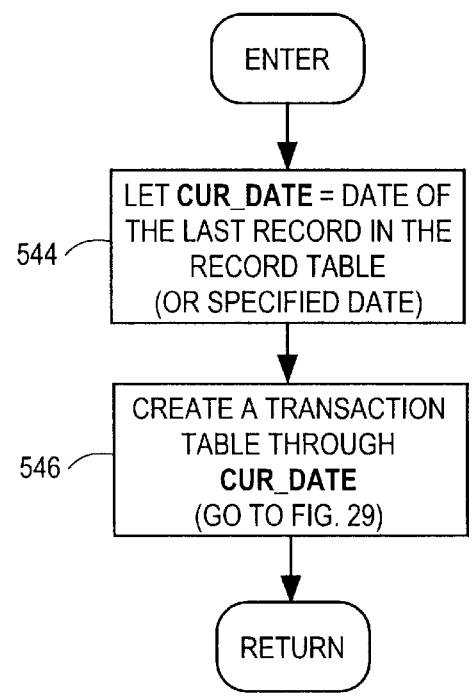
FIG. 28 is a flow chart diagramming the structure and operation of the invention's computer program.

Again, the logic of Block 420 is illustrated in more detail in FIG. 28. At Block 421, Print a Summary of the Latest Data as of Date Requested, the Computer Program 7 locates the latest data in its databases as of the date requested and calculates one additional statistic—the balance of out-of-pocket expenses paid by the corporation that has not yet been reimbursed using cash from the Excess Account:

NET_EXP=net unreimbursed expenses as of date, $TT_{TTC}$ (date)

NET_EXP:=$TT_{TTC}$(cum_OPEB)+$TT_{TTC}$(cum_tax)—$TT_{TTC}$(cum_reimb).

Specimen 3, which is generated from the data shown in the last line of the Transaction Table shown in Specimen 2, displays an example of the statistic ($508.40).

Having transmitted the Excess Account balance to be printed, the Computer Program 7 returns, via Return, to Print Menu 308 in FIG. 15.

FIGS. 23a, 23b and 23c describes the logic involved in generating one-month and twelve-month reports. These reports provide information on the change in the cumulative statistics over the course of the reporting period. The reports also allow the user to enter into the system the Excess Account balance provided by the Carrier's mainframe system. The system will then automatically provide a variance of the difference between the final account balance it has calculated and the balance provided from the mainframe system (examples are shown in Specimens 5 and 6).

The logic of FIGS. 23a, 23b, and 23c follows from Print Report 324 in FIG. 15 and proceeds from Enter to Input Type of Report Desired 422, at which point the user enters the type of report desired:

*TEMP=type of report desired ("month" or "year")

*TEMP:=user-defined input.

If a monthly report is selected, the user then enters the type of monthly report desired:

*TEMP=type of report desired ("calendar month" or "non-calendar month")

*TEMP:=user-defined input.

Then, at Input Block 424, the Computer Program 7 prompts the user to enter the Ending Date for the Report:

*DATE=ending date of report

*DATE:=user supplied date.

Note that in the case of a calendar month report, the user provides only a month and year.

The logic continues to Block 426, in which the Computer Program 7 uses *DATE to determine the last day of the reporting period. For a calendar month report, this is the last day of the month the user has selected:

PRI_LAST=ending date of report

PRI_LAST:=date on last day of month of *DATE.

For non-calendar month or yearly reports, this is the date selected:

PRI_LAST:=*DATE.

Then, at Branch 428, Monthly or Annual Report?, the logic follows one of two paths depending on what type of report the user has requested in Block 422. If

*TEMP="calendar month" or "non-calendar month,"

the Computer Program 7 proceeds to Branch 429. If it is a calendar month report, the logic proceeds to Block 430, where it sets the start of the reporting period to be the end of the last day of the month before the month in which PRI_LAST falls:

PRI_FRST=starting date of report

PRI_FRST:=last day of month prior to month of PRI_LAST.

If it is a non-calendar month report, the logic proceeds to Block 431, where Computer Program 7 sets the start of the reporting period to be one month before PRI_LAST:

PRI_FRST:=date one month prior to PRI_LAST.

(If the day in PRI_LAST does not exist in the month one month prior, PRI_FRST will be the last day in that prior month. For example, if PRI_LAST=Mar. 30, 1993, PRI_FRST will be Feb. 28, 1993.)

If, however,

*TEMP="year"

then the Computer Program 7 proceeds to Block 432, where it makes the first date of the reporting period to be one year before PRI_LAST:

PRI_FRST:=date one year before PRI_LAST.

After blocks 430, 431 and 432, the logic then proceeds to Branch 434, where the Computer Program 7 checks that PRI_LAST does not precede the initialization date of the system's databases, $TT_0$(date). (For a definition of $TT_0$(date), see below.) We note that a report whose ending date precedes the starting date of the system data contains no information. Specifically, if PRI_LAST<$TT_0$(date), then the logic continues at Block 436, Error, in which the Computer Program 7 informs the user of his or her mistake, and returns to Print Menu 308 in FIG. 15, via Return, at which point the user is free to make another attempt at printing the desired report.

If, however,

PRI_LAST≧$TT_0$(date), then the logic proceeds to Branch 438, where the Computer Program 7 checks whether the initial date of the report falls before the system's initialization date. If PRI_FRST<$TT_0$(date), then the logic continues at Block 440 in which the Computer Program 7 changes the starting date of the report to match the initialization date, PRI_FRST:=$TT_0$(date).

Once Block 440 is executed, the program logic proceeds to Block 442. If, however PRI_FRST≧$TT_0$(date), the logic proceeds directly to Block 442 without passing through Block 440.

At Block 442 the Computer Program 7 makes the following assignment:

CUR_DATE=date through which Transaction Table is to be generated

CUR_DATE:=PRI_FRST, and at Block 444, Create Transaction Table through CUR_DATE, the Computer Program 7 generates a Transaction Table through CUR_DATE (which equals PRI_FRST). The logic by which the Transaction Table is generated is described in further detail in FIG. 29.

At block 446, the Computer Program 7 copies to an internal variable, START, all of the account statistics for the last entry (i.e., row) in the newly generated Transaction Table. This last entry in the Transaction Table contains, of course, the cumulative statistics for the Excess Account at the beginning date of the reporting period. The variable START is an array with one row (we omit the row subscript in this case) and fourteen columns which conform to the fourteen columns of the Transaction Table:

START(date):=$TT_{TTC}$(date);

START(int):=$TT_{TTC}$(int);

START(tax):=$TT_{TTC}$(tax);

START(OPEB):=$TT_{TTC}$(OPEB);

START(DB):=$TT_{TTC}$(DB);
START(reimb):=$TT_{TTC}$(reimb);
START(prem):=$TT_{TTC}$(prem);
START(cum_int):=$TT_{TTC}$(cum_int);
START(cum_tax):=$TT_{TTC}$(cum_tax);
START(cum_OPEB):=$TT_{TTC}$(cum_OPEB);
START(cum_DB):=TTC(cum_DB);
START(cum_reimb):=TTC(cum_reimb);
START(cum_prem):=$TT_{TTC}$(cum_prem); and
START(bal):=$TT_{TTC}$(bal).

In Blocks 448 through 452, the Computer Program 7 goes through the same process as in Blocks 442 through 446 to generate and store the Transaction Table entry through the last date of the Report, PRI_LAST. In this case, the internal variable to which the last row in the Transaction Table is assigned is named END. In Block 448, the Computer Program 7 makes the assignment:

CUR_DATE:=PRI_LAST, and in Block 450 the Computer Program 7 constructs a Transaction Table through CUR_DATE. Again, FIG. 29 contains a detailed description of the logic required to execute Block 450. At Block 452, the Computer Program 7 assigns the values of the last row of the Transaction Table to END:

END(date):=$TT_{TTC}$(date);
END(int):=$TT_{TTC}$ (int);
END(tax):=$TT_{TTC}$ (tax);
END(OPEB):=$TT_{TTC}$ (OPEB);
END(DB):=$TT_{TTC}$ (DB);
END(reimb):=$TT_{TTC}$(reimb);
END(prem):=$TT_{TTC}$(prem);
END(cum_int):=$TT_{TTC}$ (cum_int);
END(cum_tax):=$TT_{TTC}$(cum_tax);
END(cum_OPEB):=$TT_{TTC}$(cum_OPEB);
END(cum_DB):=$TT_{TTC}$ (cum_DB);
END(cum_reimb):=$TT_{TTC}$(cum_reimb);
END(cum_prem):=$TT_{TTC}$(cum_prem); and
END(bal):=$TT_{TTC}$(bal).

In Input Block 454, Input Mainframe Account Balance, the Computer Program 7 prompts the user to input the balance that the Carrier's mainframe computer reports for the Excess Account as of the ending date of the report, PRI_LAST:

*AMOUNT=account balance listed on mainframe
*AMOUNT:=user-supplied dollar amount.

Then, from the system's opening and closing balance data and the final mainframe balance, the Computer Program 7 is able to determine the total period change and to perform a variance calculation between the system and mainframe balances. In Block 456, Calculate Report Values, the Computer Program 7 computes these statistics:

DELTA_int=interest earned during the report period
DELTA_int:=END(cum_int)—START(cum_int);
DELTA_tax=taxes accrued on interest earned during the report period
DELTA_tax END(cum_tax)—START(cum_tax);
DELTA_OPEB=OPEB expenses recorded during the report period
DELTA_OPEB:=END(cum_OPEB)—START(cum_OPEB);
DELTA_DB=death benefits deposited during the report period
DELTA_DB:=END(cum_DB)—START(cum_DB);
DELTA_REIMB=withdrawals in period made to reimburse expenses
DELTA_REIIMB:=END(cum_reimb)—START(cum_reimb);
DELTA_PREM=withdrawals in period to pay additional premiums
DELTA_PREM:=END(cum_prem)—START(cum_prem); and
VARIANCE=difference between system and mainframe balances
VARIANCE:=END(bal)—*AMOUNT.

Once these values are determined, the Computer Program 7 executes Block 458, Print Report, in which it prints a report that includes the starting and ending date and balances listed in the system—START(date), START(bal), END (date), END(bal)-as well as all of the statistics calculated in Block 456. The logic then returns to Print Menu 308 in FIG. 15, via Return, at which point the user is free to make another selection from the Print Menu.

Specimens 5 and 6 are examples of a one-month and a twelve-month report, respectively, that have been generated by the Computer Program 7. Specimen 4 shows a Transaction Table with data from which Specimens 5 and 6 were calculated. For a more detailed description of all three, please see above.

Figure 24:
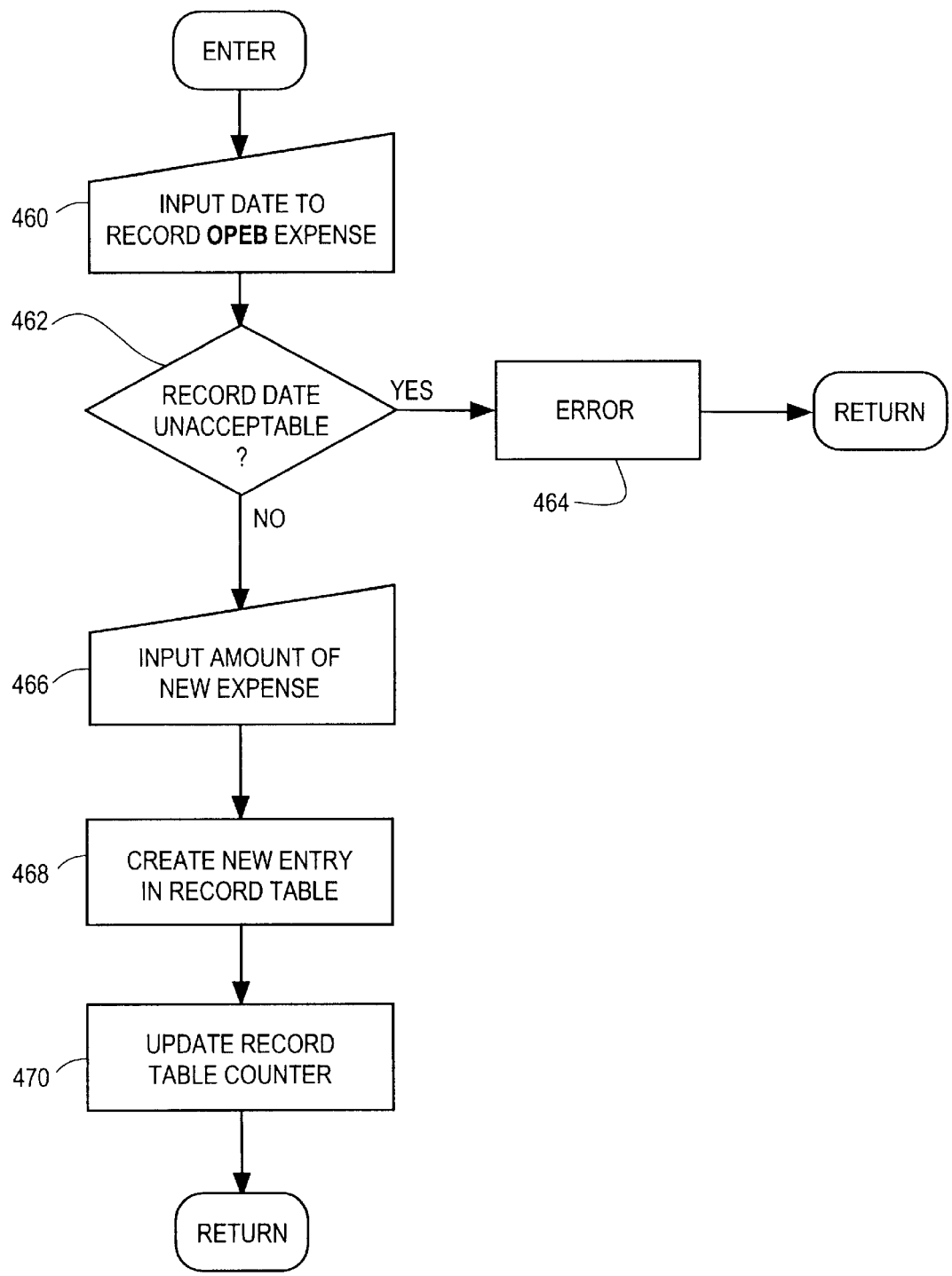
FIG. 24 is a flow chart diagramming the structure and operation of the invention's computer program.

FIG. 24 illustrates the logic which allows a user to enter an OPEB expense into the Computer Program 7's Record Table. The logic follows from Add OPEB Expense 370 in FIG. 18 and proceeds from Enter to Input Block 460, Input Date to Record OPEB Expense. At Block 460, the Computer Program 7 prompts the user to enter the date for the OPEB Expense record:

*DATE=date OPEB expense recorded
*DATE:=user-supplied date.

At Branch 462, the Computer Program 7 compares the entered date with the date of the latest data in the Record Table, as well as the initialization date of the database. If

*DATE<$RT_{RTC}$(date)

or

*DATE $\leq TT_0$(date), then the logic proceeds to Error 464, where the Computer Program 7 notifies the user that he or she cannot make a new entry into the Record Table if the date of the entry precedes the date of other entries which have already occurred. In this case, the Computer Program 7 returns immediately to Add Record Menu 366 in FIG. 18, at which point the user is free to try again or to make another menu selection.

If, however,

*DATE$\geq RT_{RTC}$(date)

and

*DATE>$TT_0$(date), then the logic continues at Input Block 466, Input Amount of New Expense, at which point the user enters the dollar amount of the OPEB expense:

*AMOUNT=amount of OPEB expense to be added
*AMOUNT:=user-supplied dollar amount.

Next, at Block 468, the Computer Program 7 creates a new entry in the Record Table to store the user-supplied data:

$RT_{RTC+1}$(date):=*DATE;
$RT_{RTC+1}$(type):=OPEB;
$RT_{RTC+1}$(amount):=*AMOUNT; and
$RT_{RTC+1}$(dbdate):=blank.

With the new entry added to the Record Table, the Computer Program 7 proceeds in Block 470 to update the variable that keeps track of the number of rows in the Record Table:

RTC:=RTC+1.

The logic then returns to Add Record Menu 366 in FIG. 18, via Return, at which point the user can make another menu selection.

Specimen 12 is an example in which a $1,000.00 OPEB expense has been added to the data shown in Specimen 11. The date for which the new entry to the Record Table is credited is May 1, 1993, and RTC=5 after the update.

We turn now to FIGS. 25a and 25b, which illustrates the logic which allows a user to enter the deposit of a death benefit into the Computer Program 7's Record Table. The logic follows from Add DB/Distribution 374 in FIG. 18 and proceeds from Enter to Input Block 472, Input Date Death Benefit was Paid. At Block 472, the Computer Program 7 prompts the user to enter the date on which the death benefit was deposited into the Excess Account:

*DATE=date death benefited deposited into Excess Account
   *DATE:=user-supplied date.

At Branch 474, the Computer Program 7 compares the entered date with the date of the latest data in the Record Table and with the initialization date of the database. If DATE<$RT_{RTC}$(date)

or

*DATE≦$TT_0$(date), then the logic proceeds to Error 476, where the Computer Program 7 notifies the user that he or she cannot make an entry into the Record Table if the date of the entry precedes the date of other entries which have already occurred. In this case, the Computer Program 7 returns immediately to Add Record Menu 366 in FIG. 18, at which point the user is free to try again or to make another menu selection.

If, however,

*DATE≧$RT_{RTC}$(date)

and

*DATE>$TT_0$(date), then the logic continues at Input Block 478, Input Date DB/Dist Occurred, at which point the user inputs the date on which the death benefit calculation occurred:

*TEMP=date on which death benefit calculation occurred
   *TEMP:=user-supplied date.

The logic then proceeds to Branch 480, in which Computer Program 7 tests if the date on which the death benefit was paid precedes the system initialization date. Specifically, if

*TEMP<$TT_0$(date), then the Computer Program 7 executes Error 482 in which it informs the user that a death benefit could not have been paid before the Indenture Plan had begun. In this case, the logic then returns to Add Record Menu 366 in FIG. 18, at which point the user may try again or make another menu selection.

If, however,

*TEMP≧$TT_0$(date), then the logic continues at Input Block 484, Input Amount of New DB, at which point the user enters the dollar amount of the death benefit payment calculation on the date, *TEMP:

*AMOUNT=amount of death benefit payment calculation
   *AMOUNT:=user-supplied dollar amount.

Next, at Block 486, the Computer Program 7 creates a new entry in the Record Table to store the user-supplied data:

$RT_{RTC+1}$(date):=*DATE;
   $RT_{RTC+1}$(type):=DB;
   $RT_{RTC+1}$(amount):=*AMOUNT; and
   $RT_{RTC+1}$(dbdate):=*TEMP.

The Computer Program 7 then proceeds in Block 488 to update the variable that keeps track of the number of rows in the Record Table:

RTC:=RTC+1.

With these tasks complete, the logic returns to Add Record Menu 366 in FIG. 18, via Return, at which point the user can make another menu selection.

Specimen 13 is an example in which a $50,000.00 death benefit has been added to the data shown in Specimen 12. The date for which the new entry to the Record Table is credited is May 15, 1993, and the date on which the death benefit payment calculation occurred was Mar. 27, 1993. RTC=6 after the update.

Figure 26A:
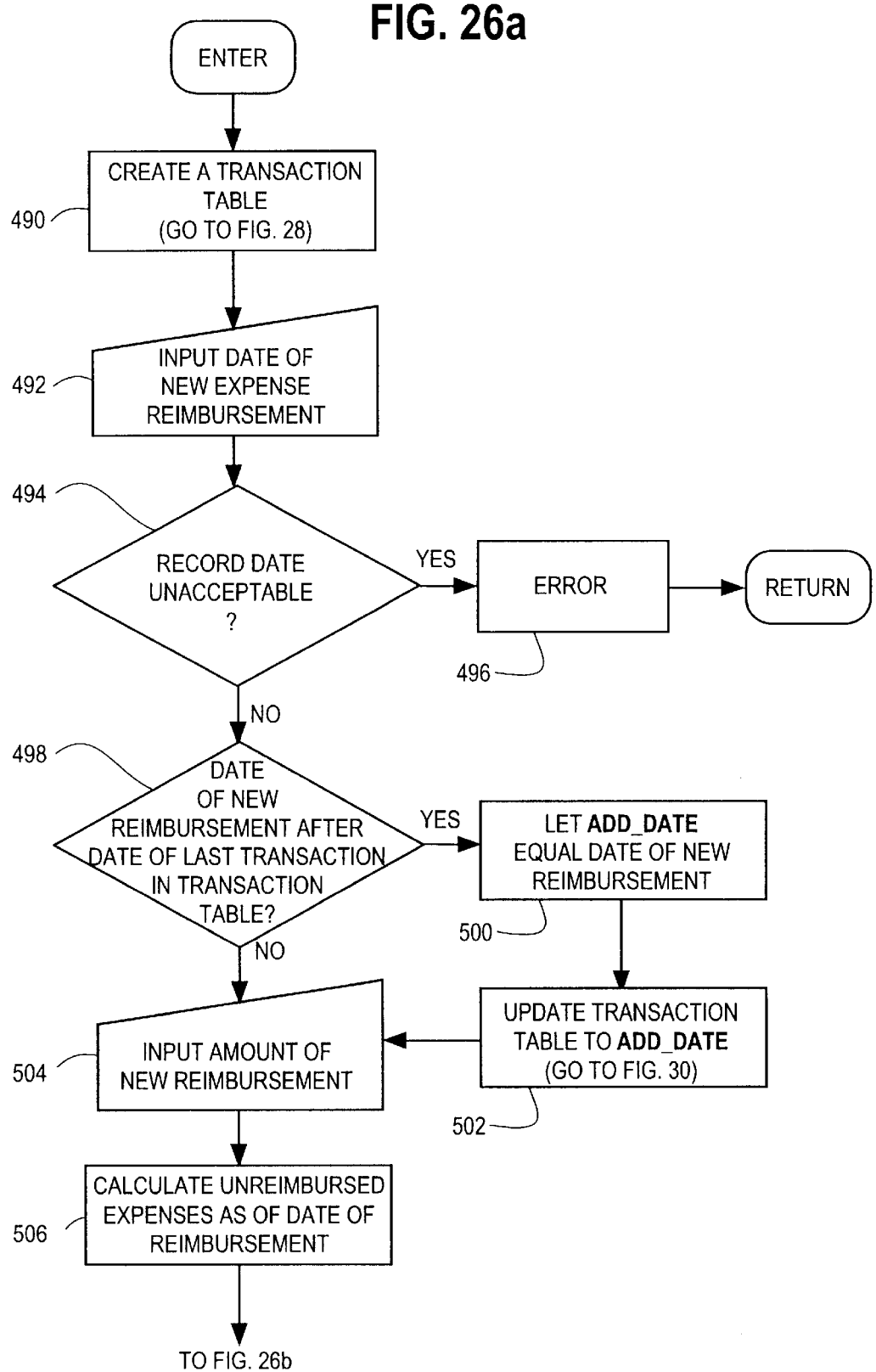
FIG. 26a is a flow chart diagramming the structure and operation of the invention's computer program.

FIGS. 26a and 26b illustrates the logic which allows a user to log in the Record Table the withdrawal of cash from the Excess Account for the reimbursement of out-of-pocket OPEB-related expenses. The logic follows from Add Expense Reimbursement 378 in FIG. 18 and proceeds from Enter to Block 490, Create a Transaction Table.

At Block 490, the Computer Program 7 generates a new Transaction Table from the current data in the Record, Interest Rate, and Tax Rate Tables. The Computer Program 7 will use the cumulative statistics in the last row of the new Transaction Table at a later point in the logic described in FIGS. 26a and 26b. We note that FIG. 28 describes in detail the logic required to create a Transaction Table.

Next, in Input Block Input Date of New Expense Reimbursement 492, the Computer Program 7 prompts the user to enter the date on which the withdrawal to reimburse expenses occurs:

*DATE=withdrawal date from Excess Account
   *DATE:=user-supplied date.

At Branch 494, the Computer Program 7 compares the entered date with both the date of the latest data in the Record Table and the initialization date of the database. If

*DATE<$RT_{RTC}$(date)

or

*DATE≦$TT_0$(date), then the logic proceeds to Error 496, where the Computer Program 7 notifies the user that he or she cannot make an entry into the Record Table if the date of the entry precedes the date of prior Record Table entries. In this case, the Computer Program 7 returns immediately to Add Record Menu 366 in FIG. 18, at which point the user is free to try again or to make another menu selection.

If, however,

*DATE ≧$RT_{RTC}$(date)

and

*DATE>$TT_0$(date), then the logic continues at Branch 498, at which the Computer Program 7 tests whether *DATE falls strictly after the date of the last entry in the Transaction Table.

If

*DATE≦$TT_{TTC}$(date)

then the logic proceeds directly to Block 504. If, however,

*DATE>$TT_{TTC}$(date)

then the logic continues at Block 500, where the Computer Program 7 makes the assignment:

ADD_DATE=date of row to add to Transaction Table
   ADD_DATE:=*DATE.

At Block 502, Update Transaction Table to ADD_DATE, the Computer Program 7 adds a new line to the transaction table with date ADD_DATE and updates the variable TTC to account for the additional row. This new line includes all interest earned and tax accrued since the date of the previous entry in the Transaction Table, and the added interest is included in the account balance for the new line. For a detailed description of the logic required to execute Block 502, see FIG. 30.

For both outcomes of Branch 498, the logic continues at Input Block 504, Input Amount of New Reimbursement, at which point the user inputs the required dollar amount:

*AMOUNT=amount of expense(s) to be reimbursed
*AMOUNT:=user-supplied dollar amount.

At Block 506, the Computer Program 7 calculates the amount of unreimbursed expenses as of the date of the reimbursement request:

NET_EXP=net amount of unreimbursed expenses
NET_EXP:=$TT_{TTC}$(cum_OPEB)+$TT_{TTC}$(cum_tax) $TT_{TTC}$(cum_reimb).

We note that to properly calculate the net amount of unreimbursed expenses as of the reimbursement request date, *DATE, the Computer Program 7 is required to calculate the accrued taxes through the request date as well. This is why in Blocks 490 and 502 the Computer Program 7 generates the Transaction Table up through *DATE.

Next, at Branch 508, the Computer Program 7 tests whether the user's request exceeds the net amount of unreimbursed expenses recorded in the system. If

*AMOUNT>NET_EXP, then the logic proceeds to Error 510 at which point the Computer Program 7 notifies the user that no withdrawal intended to reimburse out-of-pocket costs can exceed the amount of unreimbursed expenses calculated by the system. At this point, the Computer Program 7 returns to Add Record Menu 366 in FIG. 18, via Return, where the user may try again or select another menu option.

If, however,

*AMOUNT≦NET_EXP, then the logic continues at Branch 512, where Computer Program 7 tests whether the withdrawal request exceeds the available cash in the Excess Account. If

*AMOUNT>$TT_{TTC}$(bal), then the Computer Program 7 executes Error 514 in which it notifies the user that he or she cannot withdraw more than the cash balance that exists in the Excess Account.

The logic then returns to Add Record Menu 366 in FIG. 18, via Return, at which point the user may try again or make another menu selection.

If, however,

*AMOUNT≦$TT_{TTC}$(bal), then the logic continues at Block 516 in which the Computer Program 7 creates a new entry in the Record Table to store the user-supplied data:

$RT_{RTC+1}$(date):=*DATE;
$RT_{RTC+1}$(type):=reimb;
$RT_{RTC+1}$(amount):=*AMOUNT; and
$RT_{RTC+1}$(dbdate):=blank.

Again, we comment that the Transaction Table needed to be updated through *DATE, as achieved through the execution of Blocks 490 and 502, in order for the comparison in Branch 512 to be properly made.

The Computer Program 7 then proceeds in Block 518 to update the variable that keeps track of the number of rows in the Record Table:

RTC:=RTC+1.

With these tasks complete, the logic returns to Add Record Menu 366 in FIG. 18, via Return, at which point the user can make another menu selection.

Specimen 14 is an example in which a $1,500.00 expense reimbursement has been added to the data shown in Specimen 13. The date for which the new entry to the Record Table is recorded is Jun. 1, 1993, and RTC=7 after the update.

FIG. 27a and 27b illustrates the logic which allows a user to log in the Record Table the withdrawal of cash from the Excess Account for use in paying additional insurance premiums. The logic follows from Add Premium Reinvestment 382 in FIG. 18 and proceeds from Enter to Block 520, Create a Transaction Table.

At Block 520 the Computer Program 7 generates a new Transaction Table from the current data in the Record, Interest Rate, and Tax Rate Tables. As in FIG. 26a and 26b, the Computer Program 7 will use the cumulative statistics in the last row of the new Transaction Table at a later point. Again, FIG. 28 describes in detail the logic required to generate the Transaction Table.

Next, in Input Block Input Date of New Premium Reinvestment 522, the Computer Program 7 prompts the user to enter the date on which the withdrawal occurs:

*DATE=withdrawal date from Excess Account
*DATE:=user-supplied date.

At Branch 524, the Computer Program 7 compares the entered date with both the date of the latest data in the Record Table and the initialization date of the database. If

*DATE<$RT_{RTC}$(date)

or

*DATE≦$TT_0$(date), then the logic proceeds to Error 526, where the Computer Program 7 notifies the user that he or she cannot make an entry into the Record Table if the date of the entry precedes the date of other entries which have already occurred. In this case, the Computer Program 7 returns immediately to Add Record Menu 366 in FIG. 18, via Return, at which point the user is free to try again or make another menu selection.

If, however,

*DATE≧$RT_{RTC}$(date)

and

*DATE>$TT_0$(date), then the logic continues at Branch 528, in which the Computer Program 7 tests whether *DATE falls strictly after the date of the last entry in the Transaction Table.

If

*DATE≦$TT_{TTC}$(date), then the logic proceeds directly to Block 534. If, however,

*DATE>$TT_{TTC}$(date), then the logic continues at Block 530, where the Computer Program 7 makes the assignment:

ADD_DATE=date of new row to add to Transaction Table
ADD_DATE:=*DATE.

At Block 532, Update Transaction Table To ADD_DATE, the Computer Program 7 adds a new line to the transaction table with date ADD_DATE and updates the variable TTC to account for the additional row. For a detailed description of the logic required to executed Block 532, see FIG. 30.

At Block 534, Input Amount to Reinvest, the user inputs the required dollar amount:

*AMOUNT=amount to reinvest in additional premium
*AMOUNT:=user-supplied dollar amount.

At Branch 536, the Computer Program 7 tests whether the withdrawal request exceeds the available cash in the Excess Account. If

*AMOUNT>$TT_{TTC}$(bal), then the Computer Program 7 executes Error 538 in which it notifies the user that he or she cannot withdraw more than the cash balance that exists in the Excess Account. The logic then returns to Add Record Menu 366 in FIG. 18, via Return, at which point the user may try again or make another menu selection.

If, however,

*AMOUNT≦$TT_{TTC}$(bal), then the logic continues at Block 540 in which the Computer Program 7 creates a new entry in the Record Table to store the user-supplied data:

$RT_{RTC+1}$(date):=*DATE;

$RT_{RTC+1}$(type):=prem;

$RT_{RTC+1}$(amount):=*AMOUNT; and $RT_{RTC+1}$(dbdate):=blank.

The Computer Program 7 then proceeds in Block 542 to update the variable that keeps track of the number of rows in the Record Table:

RTC:=RTC+1.

With these tasks complete, the logic returns to Add Record Menu 366 in FIG. 18, via Return, at which point the user can make another menu selection.

Again, we comment that the Transaction Table needed to be updated through *DATE, as achieved through the execution of Blocks 520 and 532, in order for the comparison in Branch 536 to be properly made.

Specimen 15 is an example in which a $30,000.00 premium reinvestment has been added to the data shown in Specimen 14. The date for which the new entry to the Record Table is recorded is Jun. 15, 1993, and RTC=8 after the update.

We turn now to FIG. 28, whose logic follows from Block Create a Transaction Table, in FIGS. 21, 22, 26a, and 26b, and 27a, and 27b. The Computer Program 7 proceeds from Enter to Block 544, where it makes the assignment CUR_DATE=date of last record in the Record Table (or specified date)

CUR_DATE:=$RT_{RTC}$(date).

The logic then proceeds to Block 546, Create a Transaction Table through CUR_DATE, in which the Computer Program 7 uses the entries in the Record, Interest Rate, and Tax Rate Tables with dates that occur on or before CUR_DATE to generate a new Transaction Table. We note that by setting CUR_DATE equal to the date of the last record in the Record Table (or the specified date) before executing Block 546, the Computer Program 7 generates a Transaction Table through the date of the last entry in the Record Table (or through the specified date). The logic required to execute Block 546 is described in more detail in FIG. 29.

Having generated the Transaction Table in Block 546, the logic returns, via Return, to the block from which the logic in FIG. 28 had originally followed. For example, if the logic described in FIG. 28. executes as a part of the logic of Block 414 in FIG. 21, then at the end of execution of the logic in FIG. 28 the Computer Program 7 returns to the block following Block 414 in FIG. 21 (Block 416) and continues its execution there.

The final three Figures, FIG. 29, FIG. 30, and FIGS. 31a, and 31b describe the logic that guides the Computer Program 7's construction of the Transaction Table. Before we continue with a detailed description of these Figures, however, we first describe in general terms the method by which the Computer Program 7 generates the Transaction Table.

We recall that the Transaction Table is a table of cumulative account statistics. With the exception of the first and last rows, the Computer Program 7 generates these account statistics only at times where there is account activity—that is, only on dates for which there are entries in the Record Table.

The Computer Program 7 begins with an empty Transaction Table (which has only row 0) and updates the Transaction Table once for each entry in the Record Table. The method of update depends on the date of the entry that is to be added to the Record Table.

If the entry in the Record Table has a date which strictly follows the date of the latest entry in the Transaction Table, then the process of updating involves three steps. First, the Computer Program 7 adds a new line to the Transaction Table, whose date reflects the date of the entry in the Record Table. Second, the Computer Program 7 calculates the interest earned on the previous account balance for the days between the date of the previous entry and the date of the new entry in the Transaction Table. The Computer Program 7 also calculates the taxes accrued on that earned interest and updates the cumulative interest, cumulative tax, and balance columns of the new Transaction Table entry to reflect these calculations. Third, the Computer Program 7 updates the OPEB, DB, reimb, and prem columns of the new entry to account for the data being added from the Record Table. Again, the Computer Program 7 also updates the cumulative statistics—in the cum_OPEB, cum_DB, cum_reimb, cum_prem, and bal columns—to reflect the additional data included from the Record Table.

If the date of the entry to be added from the Record Table is the same as the date of the last entry in the Transaction Table, then the Computer Program 7 proceeds directly to the third step. In this case, the first two steps are unnecessary, since there is already an entry in the Transaction Table, complete with the proper interest and tax accruals, for that date.

Finally, we note that for records of type DB, the int, tax, cum_int, cum_tax, and bal columns are updated an extra time in the third step. This update is required to account for the interest earned (and taxes on accrued interest earnings) on the death benefit for the days between the date on which the death benefit is calculated, dbdate, and the date on which the cash is deposited into the Excess Account, date.

Figure 29:
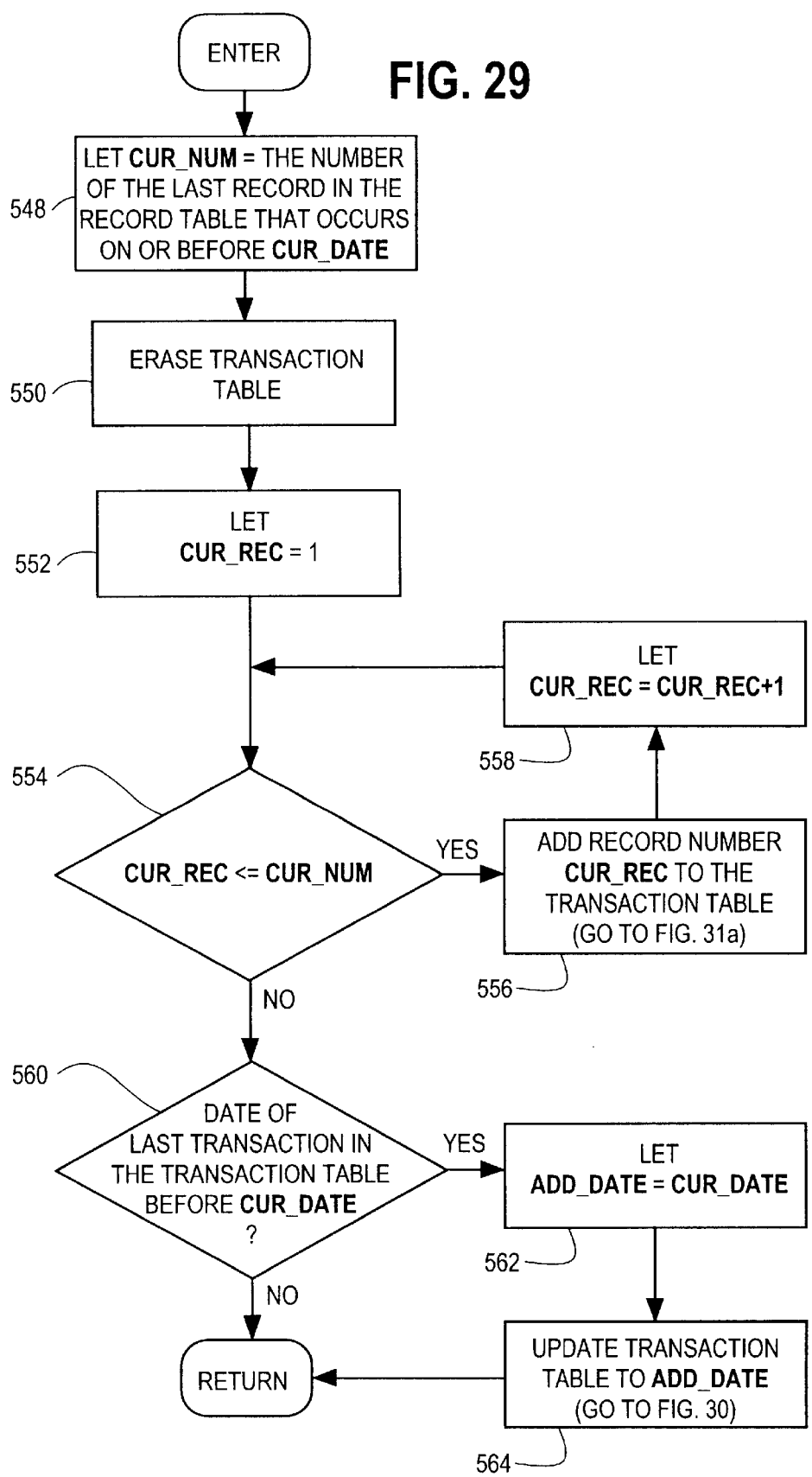
FIG. 29 is a flow chart diagramming the structure and operation of the invention's computer program.

We turn now to FIG. 29, whose logic details the addition of Record Table entries to the Transaction Table. The logic in FIG. 29 itself follows from Blocks 444 and 450 in FIG. 23a 23b and 23c and from Block 546 in FIG. 28, where the Computer Program 7 has already assigned the internal variable CUR_DATE, a date that falls on or after the system initialization date, $TT_0$(date).

The logic illustrated in FIG. 29 proceeds from Enter to Block 548 in which the Computer Program 7 finds the number of the latest entry in the Record Table whose date occurs on or before CUR_DATE. Specifically, CUR_NUM=number of last row in Record Table with date on/before CUR_DATE CUR_NUM:=max{i:$RT_i$(date)≦CUR_DATE}.

At Block 550, the Computer Program erases all of the current data in the Transaction Table before it reconstructs a new Transaction Table that will account for Record Table entries through CUR_NUM. Specifically, for any row I, I between 0 and TTC, the Computer Program 7 sets $TT_I$(date):=blank;

$TT_I$(int):=blank;

$TT_1$(tax):=blank;

$TT_I$(OPEB):=blank;

$TT_I$(DB):=blank;

$TT_i(reimb):=blank;$ $TT_i(prem):=blank;$ $TT_i(cum\_int):=blank;$ $TT_i(cum\_tax):=blank;$ $TT_i(cum\_OPEB):=blank;$ $TT_i(cum\_DB):=blank;$ $TT_i(cum\_reimb):=blank;$ $TT_i(cum\_prem):=blank;$ and $TT_i(bal):=blank.$ The Computer Program 7 also resets the variable that tracks the number of rows in the Transaction Table:

TTC:=0.

At Block 552, the Computer Program 7 initializes the internal variable that keeps track of the row of the Record Table that is to be added to the Transaction Table. The Computer Program 7 initializes the variable to be the first row of the Record Table:

CUR_REC=row number of record to be added to Transaction Table

CUR_REC:=1.

At Branch 554, the Computer Program 7 compares CUR_REC to CUR_NUM. If

CUR_REC≦CUR_NUM, then there are, in fact, more rows of the Record Table to be added to the Transaction Table. The logic then continues at Block 556, where the Computer Program 7 adds the data from row number CUR_REC in the Record Table to the Transaction Table.

Figure 31B:
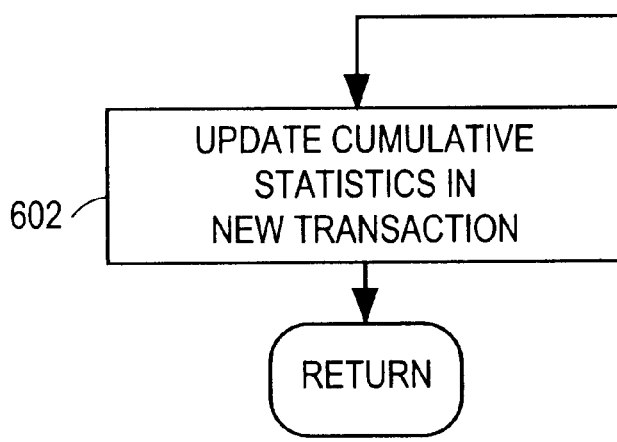
FIG. 31b is a flow chart diagramming the structure and operation of the invention's computer program.

This process corresponds to the three-step procedure outlined above and is illustrated in more detail in FIG. 31a and 31b.

Having added the record's data to the Transaction Table in Block 556, the Computer Program 7 then updates the index of the next entry in the Record Table to be added to the Transaction Table. In Block 558, the Computer Program 7 accomplishes this, setting

CUR_REC:=CUR_REC+1.

After the execution of Block 558, the Computer Program 7 is ready to enter the data from the next record into the Transaction Table, and the logic returns to Branch 554.

At Branch 554 if

CUR_REC>CUR_NUM, then the number of the next record to be added to the Transaction Table exceeds the number of the last entry in the Record Table that originally was to be added. At this point, there are, by definition, no more records that need to be added, and the logic proceeds to Branch 560.

At Branch 560, the Computer Program 7 tests whether CUR_DATE, the date through which the Transaction Table is to be constructed, exceeds $TT_{TTC}(date)$, the date of the last row in the Transaction Table. If CUR_DATE>$TT_{TTC}(date)$, then the logic proceeds to Blocks 562 and 564, in which the Computer Program 7 makes a last addition to the Transaction Table so that the table's final entry occurs on CUR_DATE. In Block 562 the Computer Program 7 sets ADD_DATE=date of new entry to be added to Transaction Table

ADD_DATE:=CUR_DATE.

Then, in Block 564, Update Transaction Table to ADD_DATE, the Computer Program 7 adds a new row with date ADD_DATE to the Transaction Table. The execution of Block 564 corresponds to steps one and two of the outline presented above, in which the Computer Program 7 adds a new line to the Transaction Table. The new line properly reflects the interest earned and taxes accrued between the date of the previous transaction in the table and CUR_DATE. The logic of Block 564 is presented in detail in FIG. 30. Having generated a Transaction Table through CUR_DATE, the logic returns, via Return, to the block from which the logic of FIG. 29 had originally followed.

If, however,

CUR_DATE=$TT_{TTC}(date)$, then the logic proceeds from Branch 560, via Return, to the block from which the logic of FIG. 29 had originally followed.

Figure 30:
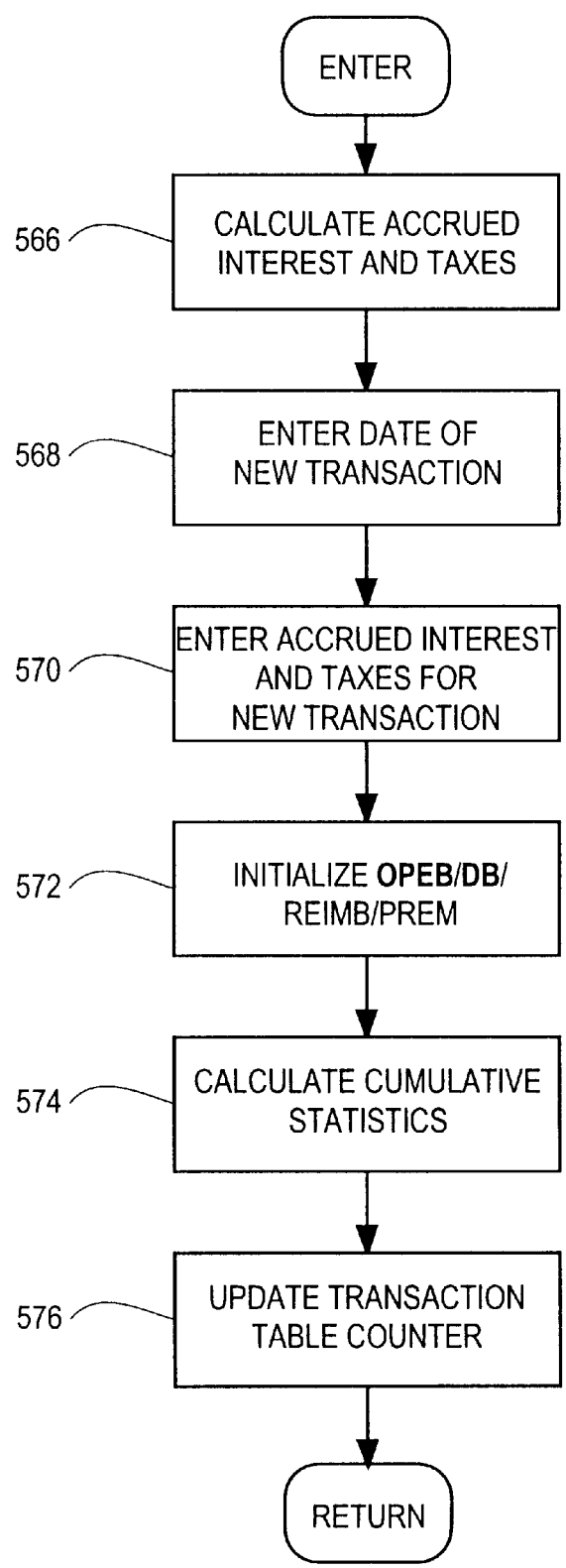
FIG. 30 is a flow chart diagramming the structure and operation of the invention's computer program.

We turn now to FIG. 30, whose logic follows from Block 502 in FIGS. 26a and 26b, Block 532 in FIGS. 27a and 27b, Block 564 in FIG. 29 and Block 582 in FIGS. 31a and 31b, Update Transaction Table to ADD_DATE. The logic proceeds from Enter to Block 566, Calculate Accrued Interest and Taxes. We note that prior to following the logic described in FIG. 30, the Computer Program 7 has set ADD_DATE to be a date that occurs strictly later than the date of the last entry in the Transaction Table, $TT_{TTC}(date)$.

In Block 566, the Computer Program 7 calculates the interest and taxes accrued on the Excess Account balance between the dates $TT_{TTC}(date)$ and ADD_DATE. Specifically, the Computer Program 7 first defines these variables INT_RATE=current day's interest rate;

TAX_RATE=current day's tax rate;

INUM=row number in Interest Rate Table of current day's interest rate;

TNUM=row number in Tax Rate Table of current day's tax rate;

INT=one day's interest accrual; and

TAX=one day's tax accrual;

and defines and initializes the variables

INT_EARNED=total interest earned on Excess Account balance

INT_EARNED:=0;

TAX_ACCRUED=tax accrued on interest earned

TAX_ACCRUED:=0; and

BALANCE=interim Excess Account balance

BALANCE:=$TT_{TTC}(bal)$.

For each day DAY, from the day after $TT_{TTC}(date)$ through ADD_DATE, the Computer Program 7 then performs the appropriate accruals:

NUM:=max{i: $IRT_i(date) \leq DAY$};

TNUM:=max{i: $TRT_i(date) \leq DAY$};

INT_RATE:=$IRT_{INUM}(rate)$;

TAX_RATE:=$TRT_{TNUM}(rate)$;

INT:=ROUND(BALANCE*((1+INT_RATE)$^{(1/365)}$−1), 2);

TAX:=ROUND(INT*TAX_RATE, 2);

INT_EARNED:=INT_EARNED+INT;

TAX_ACCRUED:=TAX_ACCRUED+TAX; and

BALANCE:=BALANCE+INT.

After these calculations have been repeated through ADD_DATE, INT_EARNED and TAX_ACCRUED properly reflect the interest earned and taxes accrued on the Excess Account balance as it grows, day by day, from $TT_{TTC}(date)$ through ADD_DATE.

We note that in this embodiment of the Computer Program 7, the daily interest calculation, as described above, reflects interest that is compounded daily. Other alternatives which are agreed upon in the Indenture Plan are acceptable as well. In particular, we set out below the calculation of INT when interest rates are compounded on a monthly basis. We assume, in this case, that the rates in the Interest Rate Table are updated on the same day of every month (e.s., the 1 st of the month). Then, letting MDAYS=number of days during the current month
the calculations for each day, I, become INUM:=max{i: $IRT_i$(date)≦DAY};
TNUM:=max{i: $TRT_i$(date)≦DAY};
MNUM:=number days in month of which day, DAY, is a part
INT_RATE:=$IRT_{INUM}$(rate);
TAX_RATE:=$TRT_{TNUM}$(rate);
INT:=ROUND(BALANCE*((1+INT_RATE)$^{1/12}$−1)/ MNUM, 2);
TAX:=ROUND(INT*TAX_RATE, 2);
INT_EARNED:=INT_EARNED+INT;
TAX_ACCRUED:=TAX_ACCRUED+TAX; and
BALANCE:=BALANCE+INT.

In Blocks 568 through 574, the Computer Program 7 constructs the new row in the Transaction Table. In particular, in Block 568, Enter Date of New Transaction, Computer Program 7 lets $TT_{TTC+1}$(date):=ADD_DATE.

In Block 570, Enter Accrued Interest and Taxes for New Transaction, the Computer Program 7 sets $TT_{TTC+1}$(int):=INT_EARNED; and
$TT_{TTC+1}$(tax):=TAX_ACCRUED.

In Block 572, Initialize OPEB/DB/reimb/prem, the Computer Program 7 assigns $TT_{TTC+1}$(OPEB:=0;
$TT_{TTC+1}$(DB):=0;
$TT_{TTC+1}$(reimb):=0; and
$TT_{TTC+1}$(prem):=0.

Finally, in Block 574, Calculate Cumulative Statistics, the Computer Program 7 calculates $TT_{TTC+1}$(cum_int):=$TT_{TTC}$(cum_int)+INT_EARNED;
$TT_{TTC+1}$(cum_tax):=$TT_{TTC}$(cum_tax)+TAX_ACCRUED;
$TT_{TTC+1}$(cum_OPEB):=$TT_{TTC}$(cum_OPEB);
$TT_{TTC+1}$(cum_DB):=$TT_{TTC}$(cum_DB);
$TT_{TTC+1}$(cum_reimb):=$TT_{TTC}$(cum_reimb);
$TT_{TTC+1}$(cum_prem):=$TT_{TTC}$(cum_prem); and
$TT_{TTC+1}$(bal):=$TT_{TTC}$(bal)+INT_EARNED.

At Block 576, Update Transaction Table Counter, the Computer Program 7 then updates the index of the number of rows in the Transaction Table to include the addition of a new row:

TTC:=TTC+1.

Having added a new row to the Transaction Table, the Computer Program 7 returns, via Return, to the block from which the entry into FIG. 30 followed.

We finally turn to FIGS. 31a and 31b whose logic follows from Block 556 of FIG. 29. We note that before executing the logic described in FIGS. 31a and 31b the Computer Program 7 has assigned to the variable CUR_REC the row number of an entry in the Record Table that is to be added to the Transaction Table. FIGS. 31a and 31b describes how the Computer Program 7 adds a Record Table entry to the Transaction Table.

The logic of FIGS. 31a and 31b proceeds from Enter to Block 578, in which the Computer Program 7 assigns the date of record CUR_REC to the variable ADD_DATE:

ADD_DATE:=$RT_{CUR\_REC}$(date).

Next, at Branch 580, the Computer Program 7 tests whether ADD_DATE falls after the date of the current last entry in the Transaction Table. If ADD_DATE>$TT_{TTC}$(date), then the logic continues at Block 582, Update Transaction Table to ADD_DATE, in which the Computer Program 7 adds a new entry, with date ADD_DATE, to the Transaction Table. This new entry has the appropriate entries for interest and taxes accrued since the previous Transaction Table entry, as well as zero values in the OPEB, DB, reimb, and prem columns. All of the row's cumulative statistics are updated to reflect these values. The details of the logic which guide the Computer Program 7 in this task have been described in detail in FIG. 30.

After the execution of Block 582, the logic continues at Branch 584. If, however, ADD_DATE=$TT_{TTC}$(date), then the logic proceeds directly from Branch 580 to Branch 584. In either case, before entering Branch 584, the date of the last transaction in the Transaction table, $TT_{TTC}$(date), equals the date of the record to be added, ADD_DATE.

At Branch 584, the Computer Program 7 tests whether the type of record being added to the Transaction Table is that of an OPEB expense. If $RT_{CUR\_REC}$(type)=OPEB, then the logic continues at Block 586, in which the Computer Program 7 updates the OPEB column of the latest Transaction Table entry to reflect the additional OPEB expenses accounted for in the new record:

$TT_{TTC}$(OPEB):=$TT_{TTC}$(OPEB)+$RT_{CUR\_REC}$(amount).

After executing Block 586, the Computer Program 7 continues at Block 602.

If, however, $RT_{CUR\_REC}$(type) .NE. OPEB, then the logic proceeds to Branch 588 in which the Computer Program 7 tests whether the record being added is of type DB. If $RT_{CUR\_REC}$(type)=DB, then the Computer Program 7 executes Blocks 590 and 592. This process entails updating the latest Transaction Table entry to reflect the cash deposit from the payment of the death benefit logged in CUR_REC of the Record Table.

In Block 590, the Computer Program 7 adds the value of the death benefit to the DB column of the last transaction:

$TT_{TTC}$(DB):=$TT_{TTC}$(DB)+$RT_{CUR\_REC}$(amount).

In Block 592, the Computer Program 7 calculates the interest earned on the death benefit, as well as the taxes accrued on the interest, between the time the death benefit was calculated and the time the payment was deposited into the Excess Account. The Computer Program 7 then adds this interest and tax to the int and tax columns of the latest Transaction Table entry, respectively, so that the entry properly reflects the interest and tax effects from the death benefit.

Specifically, the Computer Program 7 first defines these variables

INT_RATE=current day's interest rate;
TAX_RATE=current day's tax rate;
INUM=row number in Interest Rate Table of current day's interest rate;
TNUM=row number in Tax Rate Table of current day's tax rate;
INT=one day's interest accrual; and
TAX=one day's tax accrual;

and defines and initializes the variables

INT_EARNED=total interest earned on death benefit
INT_EARNED:=0;
TAX_ACCRUED=tax accrued on interest earned
TAX_ACCRUED:=0; and
BALANCE=interim balance of death benefit plus interest earned
BALANCE:=$RT_{CUR\_REC}$(amount).

For each day, DAY, from the day after RTcuR REc (dbdate) through ADD_DATE, the Computer Program 7 then performs the appropriate accruals:

INUM:=max{i: $IRT_i$(date)≦DAY};
TNUM:=max{i: $TRT_i$(date)≦DAY};
INT_RATE:=$IRT_{INUM}$(rate);
TAX_RATE:=$TRT_{TNUM}$(rate);
INT:=ROUND(BALANCE* $((1+INT\_RATE)^{(1/365)}-1)$, 2);
TAX:=ROUND(INT*TAX_RATE, 2);
INT_EARNED:=INT_EARNED+INT;
TAX_ACCRUED:=TAX_ACCRUED+TAX; and
BALANCE:=BALANCE+INT.

Having performed these calculations each day from the day after $RT_{CUR\_REC}$(dbdate) through ADD_DATE, the Computer Program 7 then adds the accrued interest and tax which it calculated for the death benefit to the appropriate columns in the latest Transaction Table entry:

$TT_{TTC}$(int):=$TT_{TTC}$(int)+INT_EARNED; and
$TT_{TTC}$(tax):=$TT_{TTC}$(tax)+TAX_ACCRUED.

Having added the death benefit, with associated interest and tax, to the Transaction Table, the Computer Program 7 continues its execution at Block 602. We note that the description of interest and tax calculations performed in Block 592 reflects interest that is compounded daily. As with the description of Block 566 in FIG. 30, an interest calculation that is based on monthly compounding—or any other convention that is agreed upon in the Indenture Plan—is entirely acceptable. We refer the reader to the description of Block 566 in FIG. 30 for an example of monthly compounding.

We continue with the case where at Branch 588 the Computer Program 7 finds $RT_{CUR\_REC}$(type) .NE. DB.

In this situation, the logic continues at Branch 594, where the Computer Program 7 tests whether the record to be added to the Transaction Table is of type reimb. If $RT_{CUR\_REC}$(type)=reimb then the logic continues at Block 596, in which the Computer Program 7 updates the reimb column of the last entry in the Transaction Table to reflect the addition of the new record:

$TT_{TTC}$(reimb):=$TT_{TTC}$(reimb)+$RT_{CUR\_REC}$(amount).

After the execution of Block 596, the Computer Program 7 continues at Block 602.

If, however, the Computer Program 7 finds $RT_{CUR\_REC}$(type) .NE. reimb, then the logic proceeds to Block 598, which simply states the fact that the record to be added to the Transaction Table is of type prem. We note that the fact that the Computer Program 7 has passed through Branches 584, 588, and 594 to Block 598, implies that record number CUR_REC in the Record Table is not of type OPEB, DB, or reimb. Therefore, the only other type that the record may be is type prem.

Having passed through Block 598, the logic continues at Block 600 in which the Computer Program 7 updates the prem column of the latest Transaction Table entry to reflect the addition of a new record of type prem:

$TT_{TTC}$(prem):=$TT_{TTC}$(prem)+$RT_{CUR\_REC}$(amount).

To summarize, in Branches 584, 588, and 594 the Computer Program 7 determines the type of record number CUR_REC. Based on the determination, in Blocks 586, 590–592, 596, and 600, the Computer Program 7 updates the appropriate columns of the Transaction Table to reflect the addition of the new record.

Finally, at Block 602, Update Cumulative Statistics in New Transaction, the Computer Program 7 then updates the columns of cumulative statistics as well:

$TT_{TTC}$(cum_int):=$TT_{TTC-1}$($cum_{int}$+$TTTTC$(int);
$TT_{TTC}$(cum_tax):=$TT_{TTC-1}$(cum_tax)+$TT_{TTC}$(tax);
$TT_{TTC}$(cum_OPEB):=$TT_{TTC-1}$(cum_OPEB)+$TT_{TTC}$(OPEB);
$TT_{TTC}$(cum_DB):=$TT_{TTC-1}$(cum_DB)+$TT_{TTC}$(DB);
$TT_{TTC}$(cum_reimb) $TT_{TTC-1}$(cum_reimb)+$TT_{TTC}$(reimb);
$TT_{TTC}$(cum_prem):=$TT_{TTC-1}$(cum_prem)+$TT_{TTC}$(prem); and
$TT_{TTC}$(bal):=$TT_{TTC-1}$(cum_bal)+$TT_{TTC}$(int)+$TT_{TTC}$(DB)-$TT_{TTC}$(reimb)-$TT_{TTC}$(prem).

Having updated the Transaction Table to include the data from record number CUR_REC of the Record Table, the logic returns to Block 556 of FIG. 29.

Appendix A

Specimen 1

| Record Table | | | |
|---|---|---|---|
| Number | Date | Type | Amount | DB-Date |
| 1 | 02/28/93 | OPEB | 1,000.00 | - |
| 2 | 03/15/93 | DB | 10,000.00 | 02/23/93 |
| 3 | 03/16/93 | reimb | 500.00 | - |
| 4 | 03/16/93 | prem | 500.00 | - |

| Interest Rate Table | |
|---|---|
| Date | Rate |
| 02/15/93 | 3.00% |

| Tax Rate Table | |
|---|---|
| Date | Rate |
| 02/15/93 | 49.00% |

Specimen 2

| Transaction Table | | | | | | | | | | | | |
|---|---|---|---|---|---|---|---|---|---|---|---|---|
| Date | Interest Accrued | Tax Expense | Corporate OPEB Expense | Receive DB or Distribut'n | Reimburse Expense | Reinvest in Premium | Cumultv Interest | Cumultv Taxes | Cumultv OPEB Expenses | Cumultv DBs/Dists | Cumultv Reimb's | Cumultv Reinv's | Cash Balance |
| 02/15/93 | - | - | - | - | - | - | - | - | - | - | - | - | - |
| 02/28/93 | - | - | 1,000.00 | - | - | - | - | - | 1,000.00 | - | - | - | - |
| 03/15/93 | 16.20 | 8.00 | - | 10,000.00 | - | - | 16.20 | 8.00 | 1,000.00 | 10,000.00 | - | - | 10,016.20 |
| 03/16/93 | 0.81 | 0.40 | - | - | 500.00 | 500.00 | 17.01 | 8.40 | 1,000.00 | 10,000.00 | 500.00 | 500.00 | 9,017.01 |

Specimen 3

Latest Entries from the Database:

| | | | |
|---|---|---|---|
| Latest Interest Rate on | 02/15/93 | @ | 3.00% |
| Latest Tax Rate on | 02/15/93 | @ | 49.00% |

| | |
|---|---|
| Date of Last Transaction in the Database: | 03/16/93 |
| Interest Rate as of Date of Last Transaction | 3.00% |
| Tax Rate as of Date of Last Transaction | 49.00% |

| | |
|---|---|
| Starting Cash Balance | $0.00 |
| Cumulative DB's/Distributions | 10,000.00 |
| Cumulative Expense Reimbursements | (500.00) |
| Cumulative Premium Reinvestments | (500.00) |
| Cumulative Interest Earned | 17.01 |
| Current Cash Balance | $9,017.01 |

| | |
|---|---|
| Cumulative OPEB Expenses | $1,000.00 |
| Cumulative Tax Expense | 8.40 |
| Cumulative Expense Reimbursements | (500.00) |
| Expenses not yet Reimbursed | $508.40 |

Specimen 4

| Transaction Table | | | | | | | | | | | | | |
|---|---|---|---|---|---|---|---|---|---|---|---|---|---|
| Date | Interest Accrued | Tax Expense | Corporate OPEB Expense | Receive DB or Distribut'n | Reimburse Expense | Reinvest in Premium | Cumulty Interest | Cumulty Taxes | Cumulty OPEB Expenses | Cumulty DBs/Dists | Cumulty Reimb's | Cumulty Reinv's | Cash Balance |
| 02/15/93 | - | - | - | - | - | - | - | - | - | - | - | - | - |
| 02/28/93 | - | - | 1,000.00 | - | - | - | - | - | 1,000.00 | - | - | - | - |
| 03/15/93 | 16.20 | 8.00 | - | 10,000.00 | - | - | 16.20 | 8.00 | 1,000.00 | 10,000.00 | - | - | 10,016.20 |
| 03/16/93 | 0.81 | 0.40 | - | - | 500.00 | 500.00 | 17.01 | 8.40 | 1,000.00 | 10,000.00 | 500.00 | 500.00 | 9,017.01 |
| 03/31/93 | 10.95 | 5.40 | - | - | - | - | 27.96 | 13.80 | 1,000.00 | 10,000.00 | 500.00 | 500.00 | 9,027.96 |
| 02/28/94 | 247.51 | 121.25 | - | - | - | - | 275.47 | 135.05 | 1,000.00 | 10,000.00 | 500.00 | 500.00 | 9,275.47 |

Specimen 5

| 1-MONTH REPORT | | | | | | | | | |
|---|---|---|---|---|---|---|---|---|---|
| Starting Date | Starting Balance | Period's OPEB Expenses | Period's DB's and Distribs | Period's OPEB Reimb | Period's Premium Reinv | Period's Interest | Period's Taxes | Ending Date | Ending Balance | System Balance | Variance from System |
| 02/28/93 | - | - | 10,000.00 | 500.00 | 500.00 | 27.96 | 13.80 | 03/31/93 | 9,027.96 | 9,027.73 | 0.23 |

Specimen 6

| 12-MONTH REPORT | | | | | | | | | | |
|---|---|---|---|---|---|---|---|---|---|---|
| Starting Date | Starting Balance | Period's OPEB Expenses | Period's DB's and Distribs | Period's OPEB Reimb | Period's Premium Reinv | Period's Interest | Period's Taxes | Ending Date | Ending Balance | System Balance | Variance from System |
| 02/28/93 | - | - | 10,000.00 | 500.00 | 500.00 | 275.47 | 135.05 | 02/28/94 | 9,275.47 | 9,298.70 | (23.23) |

Specimen 7

| Record Table | | | |
|---|---|---|---|
| Number | Date | Type | Amount | DB-Date |

| Interest Rate Table | |
|---|---|
| Date | Rate |
| 01/01/93 | 5.00% |

| Tax Rate Table | |
|---|---|
| Date | Rate |
| 01/01/93 | 50.00% |

Specimen 8

| Transaction Table | | | | | | | | | | | | | |
|---|---|---|---|---|---|---|---|---|---|---|---|---|---|
| Date | Interest Accrued | Tax Expense | Corporate OPEB Expense | Receive DB or Distribut'n | Reimburse Expense | Reinvest in Premium | Cumulty Interest | Cumulty Taxes | Cumulty OPEB Expenses | Cumulty DBs/Dists | Cumulty Reimb's | Cumulty Reinv's | Cash Balance |
| 01/01/93 | - | - | - | - | - | - | - | - | - | - | - | - | - |

Specimen 9

| Record Table | | | |
|---|---|---|---|
| Number | Date | Type | Amount | DB-Date |
| 1 | 02/28/93 | OPEB | 1,000.00 | - |

| Interest Rate Table | |
|---|---|
| Date | Rate |
| 02/15/93 | 3.00% |

| Tax Rate Table | |
|---|---|
| Date | Rate |
| 02/15/93 | 49.00% |

Specimen 10

| Record Table | | | | |
|---|---|---|---|---|
| Number | Date | Type | Amount | DB-Date |
| 1 | 02/28/93 | OPEB | 1,000.00 | - |
| 2 | 03/15/93 | DB | 10,000.00 | 02/23/93 |
| 3 | 03/16/93 | reimb | 500.00 | - |
| 4 | 03/16/93 | prem | 500.00 | - |

| Interest Rate Table | |
|---|---|
| Date | Rate |
| 02/15/93 | 3.00% |
| 04/01/93 | 5.00% |

| Tax Rate Table | |
|---|---|
| Date | Rate |
| 02/15/93 | 49.00% |

Specimen 11

| Record Table | | | | |
|---|---|---|---|---|
| Number | Date | Type | Amount | DB-Date |
| 1 | 02/28/93 | OPEB | 1,000.00 | - |
| 2 | 03/15/93 | DB | 10,000.00 | 02/23/93 |
| 3 | 03/16/93 | reimb | 500.00 | - |
| 4 | 03/16/93 | prem | 500.00 | - |

| Interest Rate Table | |
|---|---|
| Date | Rate |
| 02/15/93 | 3.00% |
| 04/01/93 | 5.00% |

| Tax Rate Table | |
|---|---|
| Date | Rate |
| 02/15/93 | 49.00% |
| 04/15/93 | 40.00% |

Specimen 12

| Record Table | | | | |
|---|---|---|---|---|
| Number | Date | Type | Amount | DB-Date |
| 1 | 02/28/93 | OPEB | 1,000.00 | - |
| 2 | 03/15/93 | DB | 10,000.00 | 02/23/93 |
| 3 | 03/16/93 | reimb | 500.00 | - |
| 4 | 03/16/93 | prem | 500.00 | - |
| 5 | 05/01/93 | OPEB | 1,000.00 | - |

| Interest Rate Table | |
|---|---|
| Date | Rate |
| 02/15/93 | 3.00% |
| 04/01/93 | 5.00% |

| Tax Rate Table | |
|---|---|
| Date | Rate |
| 02/15/93 | 49.00% |
| 04/15/93 | 40.00% |

Specimen 13

| Record Table | | | | |
|---|---|---|---|---|
| Number | Date | Type | Amount | DB-Date |
| 1 | 02/28/93 | OPEB | 1,000.00 | - |
| 2 | 03/15/93 | DB | 10,000.00 | 02/23/93 |
| 3 | 03/16/93 | reimb | 500.00 | - |
| 4 | 03/16/93 | prem | 500.00 | - |
| 5 | 05/01/93 | OPEB | 1,000.00 | - |
| 6 | 05/15/93 | DB | 50,000.00 | 03/27/93 |

| Interest Rate Table | |
|---|---|
| Date | Rate |
| 02/15/93 | 3.00% |
| 04/01/93 | 5.00% |

| Tax Rate Table | |
|---|---|
| Date | Rate |
| 02/15/93 | 49.00% |
| 04/15/93 | 40.00% |

Specimen 14

Record Table

| Number | Date | Type | Amount | DB-Date |
|---|---|---|---|---|
| 1 | 02/28/93 | OPEB | 1,000.00 | - |
| 2 | 03/15/93 | DB | 10,000.00 | 02/23/93 |
| 3 | 03/16/93 | reimb | 500.00 | - |
| 4 | 03/16/93 | prem | 500.00 | - |
| 5 | 05/01/93 | OPEB | 1,000.00 | - |
| 6 | 05/15/93 | DB | 50,000.00 | 03/27/93 |
| 7 | 06/01/93 | reimb | 1,500.00 | - |

Interest Rate Table

| Date | Rate |
|---|---|
| 02/15/93 | 3.00% |
| 04/01/93 | 5.00% |

Tax Rate Table

| Date | Rate |
|---|---|
| 02/15/93 | 49.00% |
| 04/15/93 | 40.00% |

Specimen 15

| Record Table | | | |
|---|---|---|---|
| Number | Date | Type | Amount | DB-Date |
| 1 | 02/28/93 | OPEB | 1,000.00 | - |
| 2 | 03/15/93 | DB | 10,000.00 | 02/23/93 |
| 3 | 03/16/93 | reimb | 500.00 | - |
| 4 | 03/16/93 | prem | 500.00 | - |
| 5 | 05/01/93 | OPEB | 1,000.00 | - |
| 6 | 05/15/93 | DB | 50,000.00 | 03/27/93 |
| 7 | 06/01/93 | reimb | 1,500.00 | - |
| 8 | 06/15/93 | prem | 30,000.00 | - |

| Interest Rate Table | |
|---|---|
| Date | Rate |
| 02/15/93 | 3.00% |
| 04/01/93 | 5.00% |

| Tax Rate Table | |
|---|---|
| Date | Rate |
| 02/15/93 | 49.00% |
| 04/15/93 | 40.00% |

Appendix B

```
A:A1: ^data
A:B1: ^data
A:C1: ^data
A:D1: ^data
A:E1: ^data
A:F1: ^data
A:G1: ^data
A:H1: ^data
A:I1: ^data
A:J1: ^data
A:K1: ^data
A:L1: [W11] ^data
A:M1: ^*
A:N1: ^trnsctns
A:O1: ^trnsctns
A:P1: ^trnsctns
A:Q1: ^trnsctns
A:R1: ^trnsctns
A:S1: ^trnsctns
A:T1: ^trnsctns
A:U1: ^trnsctns
A:V1: ^trnsctns
A:W1: ^trnsctns
A:X1: ^trnsctns
A:Y1: ^trnsctns
A:Z1: ^trnsctns
A:AA1: ^trnsctns
A:AB1: ^trnsctns
A:AC1: ^trnsctns
A:AD1: ^*
A:AE1: ^report
A:AF1: ^report
A:AG1: ^report
A:AH1: ^report
A:AI1: ^report
A:AJ1: ^report
A:AK1: ^report
A:AL1: ^report
A:AM1: ^report
A:AN1: ^report
A:AO1: ^report
A:AP1: ^report
A:AQ1: ^report
A:AR1: ^report
A:AS1: ^report
A:AT1: ^report
A:AU1: ^report
A:AV1: **
A:AW1: 'GLOBAL DATA AND RANGES
A:M2: ^*
A:N2: 'TRANSACTION SUMMARY
A:AD2: ^*
```

```
A:AI2: "Corporate
A:AJ2: "Receive
A:AL2: "Reinvest
A:AP2: "Cumultv
A:AV2: "*
A:A3:  'RECORDS OF EXPENSES, DISTRIBUTIONS, AND REINVESTMENTS
A:H3:  "INTEREST RATES
A:K3:  "TAX RATES
A:M3:  ^*
A:Q3:  "Corporate
A:R3:  "Receive
A:T3:  "Reinvest
A:X3:  "Cumultv
A:AD3: ^*
A:AG3: "Interest
A:AH3: "Tax
A:AI3: "OPEB
A:AJ3: "DB or
A:AK3: "Reimburse
A:AL3: "in
A:AN3: "Cumultv
A:AO3: "Cumultv
A:AP3: "OPEB
A:AQ3: "Cumultv
A:AR3: "Cumultv
A:AS3: "Cumultv
A:AU3: "Cash
A:AV3: "*
A:AX3: 'RANGE
A:AY3: [W11] "VALUE
A:BA3: 'COMMENT
A:M4:  ^*
A:O4:  "Interest
A:P4:  "Tax
A:Q4:  "OPEB
A:R4:  "DB or
A:S4:  "Reimburse
A:T4:  "in
A:V4:  "Cumultv
A:W4:  "Cumultv
A:X4:  "OPEB
A:Y4:  "Cumultv
A:Z4:  "Cumultv
A:AA4: "Cumultv
A:AC4: "Cash
A:AD4: ^*
A:AF4: "Date
A:AG4: "Accrued
A:AH4: "Expense
A:AI4: "Expense
A:AJ4: "Distribut'n
A:AK4: "Expense
```

```
A:AL4: "Premium
A:AN4: "Interest
A:AO4: "Taxes
A:AP4: "Expenses
A:AQ4: "DBs/Dists
A:AR4: "Reimb's
A:AS4: "Reinv's
A:AU4: "Balance
A:AV4: "*
A:AW4: 'record
A:AX4: 'rec_tbl
A:AY4: [W11] "range
A:BA4: 'OPEB expense / DB / reimbursement / premium data table
A:A5: "Number
A:B5: "Date
A:C5: "Type
A:D5: "Amount
A:E5: "DB-Date
A:H5: "Date
A:I5: "Rate
A:K5: "Date
A:L5: [W11] "Rate
A:M5: ^*
A:N5: "Date
A:O5: "Accrued
A:P5: "Expense
A:Q5: "Expense
A:R5: "Distribut'n
A:S5: "Expense
A:T5: "Premium
A:V5: "Interest
A:W5: "Taxes
A:X5: "Expenses
A:Y5: "DBs/Dists
A:Z5: "Reimb's
A:AA5: "Reinv's
A:AC5: "Balance
A:AD5: ^*
A:AE5: 'start date
A:AF5: (D4) 34028
A:AG5: (,2) 0
A:AH5: (,2) 0
A:AI5: (,2) 1000
A:AJ5: (,2) 0
A:AK5: (,2) 0
A:AL5: (,2) 0
A:AN5: (,2) 0
A:AO5: (,2) 0
A:AP5: (,2) 1000
A:AQ5: (,2) 0
A:AR5: (,2) 0
A:AS5: (,2) 0
```

```
A:AU5: (,2) 0
A:AV5: "*
A:AW5: 'table
A:AX5: 'tl_rec
A:AY5: [W11] "range
A:BA5: 'top-left corner of OPEB expense / DB / reimbursement / premium data table
A:A6: 1
A:B6: (D4) 34028
A:C6: (G) "OPEB
A:D6: (,2) 1000
A:E6: (D4) 0
A:H6: (D4) 34015
A:I6: (P2) 0.03
A:K6: (D4) 34015
A:L6: (P2) [W11] 0.49
A:M6: ^*
A:N6: (D4) +$INIT_DATE
A:O6: (,2) 0
A:P6: (,2) 0
A:Q6: (,2) 0
A:R6: (,2) 0
A:S6: (,2) 0
A:T6: (,2) 0
A:V6: (,2) 0
A:W6: (,2) 0
A:X6: (,2) 0
A:Y6: (,2) 0
A:Z6: (,2) 0
A:AA6: (,2) 0
A:AC6: (,2) +$INIT_BAL
A:AD6: ^*
A:AE6: 'end date
A:AF6: (D4) 34393
A:AG6: (,2) 247.51
A:AH6: (,2) 121.25
A:AI6: (,2) 0
A:AJ6: (,2) 0
A:AK6: (,2) 0
A:AL6: (,2) 0
A:AN6: (,2) 275.47
A:AO6: (,2) 135.05
A:AP6: (,2) 1000
A:AQ6: (,2) 10000
A:AR6: (,2) 500
A:AS6: (,2) 500
A:AU6: (,2) 9275.47
A:AV6: "*
A:AX6: 'rec_num
A:AY6: [W11] 6
A:BA6: 'number of records in the record table
A:A7: 2
A:B7: (D4) 34043
```

```
A:C7: (G) "DB
A:D7: (,2) 10000
A:E7: (D4) 34023
A:M7: ^*
A:N7: (D4) 34028
A:O7: (,2) 0
A:P7: (,2) 0
A:Q7: (,2) 1000
A:R7: (,2) 0
A:S7: (,2) 0
A:T7: (,2) 0
A:V7: (,2) +V6+O7
A:W7: (,2) +W6+P7
A:X7: (,2) +X6+Q7
A:Y7: (,2) +Y6+R7
A:Z7: (,2) +Z6+S7
A:AA7: (,2) +AA6+T7
A:AC7: (,2) +$AC$6+V7+Y7-Z7-AA7
A:AD7: ^*
A:AV7: "*
A:A8: 3
A:B8: (D4) 34044
A:C8: (G) "reimb
A:D8: (,2) 500
A:E8: (D4) 0
A:M8: ^*
A:N8: (D4) 34043
A:O8: (,2) 16.2
A:P8: (,2) 8
A:Q8: (,2) 0
A:R8: (,2) 10000
A:S8: (,2) 0
A:T8: (,2) 0
A:V8: (,2) +V7+O8
A:W8: (,2) +W7+P8
A:X8: (,2) +X7+Q8
A:Y8: (,2) +Y7+R8
A:Z8: (,2) +Z7+S8
A:AA8: (,2) +AA7+T8
A:AC8: (,2) +$AC$6+V8+Y8-Z8-AA8
A:AD8: ^*
A:AE8: {Page} @IF(PRI_TYPE="Y"#OR#PRI_TYPE="y","ANNUAL REPORT",@IF(PRI_TYPE="M"#OR#PRI_TYPE="m","MONTHLY REPORT - CALENDAR MONTH",
A:AV8: "*
A:AW8: 'interest
A:AX8: 'int_tbl
A:AY8: [W11] "range
A:BA8: 'interest rate table
A:A9: (G) 4
A:B9: (D4) 34044
A:C9: (,2) "prem
A:D9: (,2) 500
A:E9: (D4) 0
```

```
A:M9: ^*
A:N9: (D4) 34044
A:O9: (,2) 0.81
A:P9: (,2) 0.4
A:Q9: (,2) 0
A:R9: (,2) 0
A:S9: (,2) 500
A:T9: (,2) 500
A:V9: (,2) +V8+O9
A:W9: (,2) +W8+P9
A:X9: (,2) +X8+Q9
A:Y9: (,2) +Y8+R9
A:Z9: (,2) +Z8+S9
A:AA9: (,2) +AA8+T9
A:AC9: (,2) +$AC$6+V9+Y9-Z9-AA9
A:AD9: ^*
A:AV9: "*
A:AW9: 'table
A:AX9: 'tl_int
A:AY9: [W11] "range
A:BA9: 'top-left corner of interest rate table
A:A10: (G) 5
A:B10: (D4) 34059
A:C10: (,2) "OPEB
A:D10: (,2) 0
A:E10: (D4) 0
A:M10: ^*
A:N10: (D4) 34059
A:O10: (,2) 10.95
A:P10: (,2) 5.4
A:Q10: (,2) 0
A:R10: (,2) 0
A:S10: (,2) 0
A:T10: (,2) 0
A:V10: (,2) +V9+O10
A:W10: (,2) +W9+P10
A:X10: (,2) +X9+Q10
A:Y10: (,2) +Y9+R10
A:Z10: (,2) +Z9+S10
A:AA10: (,2) +AA9+T10
A:AC10: (,2) +$AC$6+V10+Y10-Z10-AA10
A:AD10: ^*
A:AH10: "Period's
A:AI10: "Period's
A:AJ10: "Period's
A:AK10: "Period's
A:AT10: "Variance
A:AV10: "*
A:AX10: 'int_num
A:AY10: [W11] 1
A:BA10: 'number of rates in the interest rate table
A:A11: (G) 6
```

```
A:B11: (D4) 34393
A:C11: (,2) "OPEB
A:D11: (,2) 0
A:E11: (D4) 0
A:M11: ^*
A:N11: (D4) 34393
A:O11: (,2) 247.51
A:P11: (,2) 121.25
A:Q11: (,2) 0
A:R11: (,2) 0
A:S11: (,2) 0
A:T11: (,2) 0
A:V11: (,2) +V10+O11
A:W11: (,2) +W10+P11
A:X11: (,2) +X10+Q11
A:Y11: (,2) +Y10+R11
A:Z11: (,2) +Z10+S11
A:AA11: (,2) +AA10+T11
A:AC11: (,2) +$AC$6+V11+Y11-Z11-AA11
A:AD11. ^*
A:AE11: {Page} "Starting
A:AF11: "Starting
A:AH11: "OPEB
A:AI11: "DB's and
A:AJ11: "OPEB
A:AK11: "Premium
A:AM11: "Period's
A:AN11: "Period's
A:AP11: "Ending
A:AQ11: "Ending
A:AS11: "System
A:AT11: "from
A:AV11: "*
A:M12: ^*
A:AD12: ^*
A:AE12: {Page} "Date
A:AF12: "Balance
A:AH12: "Expenses
A:AI12: "Distribs
A:AJ12: "Reimb
A:AK12: "Reinv
A:AM12: "Interest
A:AN12: "Taxes
A:AP12: "Date
A:AQ12: "Balance
A:AS12: "Balance
A:AT12: "System
A:AV12: "*
A:AW12: 'tax
A:AX12: 'tax_tbl
A:AY12: [W11] "range
A:BA12: 'tax rate table
```

```
A:M13: ^*
A:AD13: ^*
A:AE13: {Page} (D4) +START
A:AF13: (,2) +AU5
A:AH13: (,2) +AP6-AP5
A:AI13: (,2) +AQ6-AQ5
A:AJ13: (,2) +AR6-AR5
A:AK13: (,2) +AS6-AS5
A:AM13: (,2) +AN6-AN5
A:AN13: (,2) +AO6-AO5
A:AP13: (D4) +END
A:AQ13: (,2) +AU6
A:AS13: (,2) +$SYS_BAL
A:AT13: (,2) +AQ13-AS13
A:AV13: "*
A:AW13: 'table
A:AX13: 'tl_tax
A:AY13: [W11] "range
A:BA13: 'top-left corner of tax rate table
A:M14: ^*
A:AD14: ^*
A:AV14: "*
A:AX14: 'tax_num
A:AY14: [W11] 1
A:BA14: 'number of rates in the tax rate table
A:M15: ^*
A:AD15: ^*
A:AV15: "*
A:M16: ^*
A:AD16: ^*
A:AV16: "*
A:AW16: 'transaction
A:AX16: 'tra_tbl
A:AY16: [W11] "range
A:BA16: 'transaction history table
A:M17: ^*
A:AD17: ^*
A:AR17: (H) '{SET "PRINT-FOOTER-LEFT-TEXT";""}
A:AV17: "*
A:AW17: 'table
A:AX17: 'tl_tra
A:AY17: [W11] "range
A:BA17: 'top-left corner of transaction history table
A:M18: ^*
A:AD18: ^*
A:AR18: (H) '{SET "PRINT-FOOTER-CENTER-TEXT";""}
A:AV18: "*
A:AX18: 'tra_num
A:AY18: [W11] 5
A:BA18: 'number of transactions in the transaction table
A:M19: ^*
A:AD19: ^*
```

```
A:AR19: (H) '{SET "PRINT-FOOTER-RIGHT-TEXT";"@+"}
A:AV19: "*
A:M20: ^*
A:AD20: ^*
A:AR20: (H) '{SET "PRINT-SIZE";"FIT-COLUMNS"}
A:AV20: "*
A:AW20: 'report
A:AX20: 'rep_tbl
A:AY20: [W11] "range
A:BA20: 'report table
A:M21: ^*
A:AD21: ^*
A:AR21: (H) '{SET "PRINT-ORIENTATION";"LANDSCAPE"}
A:AV21: "*
A:AW21: 'table
A:AX21: 'sys_bal
A:AY21: (,2) [W11] 9027.73
A:BA21: 'system balance input for report generation
A:M22: ^*
A:AD22: ^*
A:AV22: "*
A:M23: ^*
A:AD23: ^*
A:AV23: "*
A:M24: ^*
A:AD24: ^*
A:AV24: "*
A:AW24: 'other
A:AX24: 'bal_tbl
A:AY24: [W11] "range
A:BA24: 'balance report
A:M25: ^*
A:AD25: ^*
A:AV25: "*
A:AW25: 'screens
A:AX25: 'nowhere
A:AY25: [W11] "range
A:BA25: 'blank screen when calculating
A:M26: ^*
A:AD26: ^*
A:AV26: "*
A:AX26: 'err_tbl
A:AY26: [W11] "range
A:BA26: 'screen to display error message
A:M27: ^*
A:AD27: ^*
A:AV27: "*
A:AX27: 'err_msg
A:AY27: [W11] "range
A:BA27: 'place to put error message
A:M28: ^*
A:AD28: ^*
```

```
A:AV28: "*
A:M29: ^*
A:AD29: ^*
A:AV29: "*
A:AW29: 'transact'n
A:AX29: 'init_date
A:AY29: (D4) [W11] 34015
A:BA29: 'date system initialized to
A:M30: ^*
A:AD30: ^*
A:AV30: "*
A:AW30: 'table
A:AX30: 'init_bal
A:AY30: (,2) [W11] 0
A:BA30: 'initial cash balance
A:M31: ^*
A:AD31: ^*
A:AV31: "*
A:AW31: 'stats
A:AX31: 'last_date
A:AY31: (D4) [W11] 34393
A:BA31: 'date of last transaction in the transaction table
A:M32: ^*
A:AD32: ^*
A:AV32: "*
A:AX32: 'cash_bal
A:AY32: (,2) [W11] 9275.47
A:BA32: 'cash balance at end of last transaction
A:M33: ^*
A:AD33: ^*
A:AV33: "*
A:AX33: 'net_exp
A:AY33: (,2) [W11] @VLOOKUP(LAST_DATE,TRA_TBL,9)+@VLOOKUP(LAST_DATE,TRA_TBL,10)-@VLOOKUP(LAST_DATE,TRA_TBL,12)
A:BA33: 'amount that still can be reimbursed for OPEB and tax expenses
A:M34: ^*
A:AD34: ^*
A:AV34: "*
A:M35: ^*
A:AD35: ^*
A:AV35: "*
A:AW35: 'other
A:AX35: 'debug
A:AY35: [W11] ERR
A:BA35: 'used for debugging code; not in final program
A:M36: ^*
A:AD36: ^*
A:AV36: "*
A:M37: ^*
A:AD37: ^*
A:AV37: "*
A:AW37: 'print
A:AX37: 'dat_bdr
```

```
A:AY37: [W11] "range
A:BA37: 'print border for data section of spreadsheet
A:M38: ^*
A:AD38: ^*
A:AV38: "*
A:AW38: 'borders
A:AX38: 'tra_bdr
A:AY38: [W11] "range
A:BA38: 'print border for transaction section of spreadsheet
A:M39: ^*
A:AD39: ^*
A:AV39: "*
A:M40: ^*
A:AD40: ^*
A:AV40: "*
A:AW40: \*
A:AX40: \*
A:AY40: [W11] \*
A:AZ40: \*
A:BA40: \*
A:BB40: \*
A:BC40: \*
A:BD40: \*
A:BE40: \*
A:AV41: "*
A:AW41: 'name
A:AX41: 'init
A:AV42: "*
A:AW42: 'purpose
A:AX42: 'initializes the record, interest rate, tax rate, and transaction tables
A:AV43: "*
A:AW43: 'called by
A:AX43: 'main_menu
A:AV44: "*
A:AW44: 'calls
A:AX44: '-
A:AV45: "*
A:AW45: \*
A:AV46: "*
A:AW46: 'locals
A:AX46: 'init_yr
A:AY46: [W11] 93
A:AV47: "*
A:AX47: 'init_mo
A:AY47: [W11] 2
A:AV48: "*
A:AX48: 'init_day
A:AY48: [W11] 15
A:AV49: "*
A:AX49: (L) 'init_int
A:AY49: (P2) [W11] 0.03
A:AV50: "*
```

```
A:AX50:  (L) 'init_tax
A:AY50:  (P2) [W11] 0.49
A:AV51:  "*
A:AV52:  "*
A:AW52:  "init
A:AX52:  '{BLANK rec_tbl}{GOTO}t1_rec~/rncrec_tbl~{BS}.{RIGHT 4}~
A:AV53:  "*
A:AX53:  '{BLANK int_tbl}{GOTO}t1_int~/rncint_tbl~{BS}.{RIGHT 1}~
A:AV54:  "*
A:AX54:  '{BLANK tax_tbl}{GOTO}t1_tax~/rnctax_tbl~{BS}.{RIGHT 1}~
A:AV55:  "*
A:AX55:  '{BLANK tra_tbl}{GOTO}t1_tra~/rnctra_tbl~{BS}.{RIGHT 15}~
A:AV56:  "*
A:AX56:  (L) '{get_year "Year contract begins (e.g., 1993)? ",init_yr}
A:AV57:  "*
A:AX57:  (L) '{get_mon "Month contract begins (e.g., 2 for February)? ",init_mo}
A:AV58:  "*
A:AX58:  (L) '{get_day "Day contract begins (e.g., 5 for the 5th)? ",init_day, init_yr, init_mo}
A:AV59:  "*
A:AX59:  '{LET init_date,@date(init_yr,init_mo,init_day)}~
A:AV60:  "*
A:AX60:  '{GOTO}t1_int~+init_date~/rv~~
A:AV61:  "*
A:AX61:  (L) '{get_rate "Initial Interest Rate Credited on Account Balance (e.g., 10.1 means 10.1%)? ",init_int}
A:AV62:  "*
A:AX62:  (L) '{RIGHT}+init_int~/rv~~
A:AV63:  "*
A:AX63:  '{GOTO}t1_tax~+init_date~/rv~~
A:AV64:  "*
A:AX64:  (L) '{get_rate "Initial Corporate Tax Rate (e.g., 35.5 means 35.5%)? ",init_tax}
A:AV65:  "*
A:AX65:  (L) '{RIGHT}+init_tax~/rv~~
A:AV66:  "*
A:AX66:  (L) '{get_amt "Net Excess Account Balance at Start Date?",init_bal}
A:AV67:  "*
A:AX67:  '{LET rec_num,0}{LET int_num,1}{LET tax_num,1}{LET tra_num,0}
A:AV68:  "*
A:AX68:  '{LET last_date,init_date}{LET cash_bal,init_bal}~
A:AV69:  "*
A:AX69:  '{RETURN}
A:AV70:  "*
A:AW70:  \*
A:AX70:  \*
A:AY70:  [W11] \*
A:AZ70:  \*
A:BA70:  \*
A:BB70:  \*
A:BC70:  \*
A:BD70:  \*
A:BE70:  \*
A:AV71:  "*
A:AW71:  'name
```

```
A:AX71:  'add
A:AV72:  "*
A:AW72:  'purpose
A:AX72:  'adds a new line to the transaction table, adding accrued interest and taxes
A:AV73:  "*
A:AW73:  'called by
A:AX73:  'new_rec, current, add_reimb, add_prem
A:AV74:  "*
A:AW74:  'calls
A:AX74:  'accrue
A:AV75:  "*
A:AW75:  \*
A:AV76:  "*
A:AW76:  'arg
A:AX76:  'add_date
A:AY76:  (D4) [W11] 34393
A:AV77:  "*
A:AW77:  '
A:AV78:  "*
A:AW78:  'locals
A:AX78:  'add_bal
A:AY78:  [W11] 9275.47000000000007
A:AZ78:  'interim cash balance
A:AV79:  "*
A:AX79:  'add_count
A:AY79:  (D4) [W11] 34394
A:AZ79:  'index for accruing interest and taxes each day
A:AV80:  "*
A:AX80:  'add_line
A:AY80:  [W11] 'range-->
A:AZ80:  (D4) 0
A:BA80:  (,2) 0
A:BB80:  (,2) 0
A:BC80:  (,2) 0
A:BD80:  (,2) 0
A:BE80:  (,2) 0
A:AV81:  "*
A:AX81:  'accr_int
A:AY81:  [W11] 247.51
A:AZ81:  'accrued interest on ADD_BAL
A:AV82:  "*
A:AX82:  'accr_tax
A:AY82:  [W11] 121.25
A:AZ82:  'accrued taxes on ADD_BAL
A:AV83:  "*
A:AV84:  "*
A:AW84:  "add
A:AX84:  '{LET add_bal,cash_bal}
A:AV85:  "*
A:AX85:  '{LET accr_int,0}
A:AV86:  "*
A:AX86:  '{LET accr_tax,0}
```

```
A:AV87:  "*
A:AX87:  '{FOR add_count,last_date+1,add_date,1,accrue}
A:AV88:  "*
A:AX88:  '{LET tra_num,tra_num+1}
A:AV89:  "*
A:AX89:  '{GOTO}tl_tra-{UP}{DOWN tra_num}/cadd_line~~
A:AV90:  "*
A:AX90:  '{GOTO}tl_tra~/rnctra_tbl~{BS}.{UP}{DOWN tra_num}{RIGHT 15}~
A:AV91:  "*
A:AX91:  '{GOTO}tl_tra~{UP}{DOWN tra_num}+add_date~/rv~~
A:AV92:  "*
A:AX92:  '{RIGHT}+accr_int~/rv~~
A:AV93:  "*
A:AX93:  '{RIGHT}+accr_tax~/rv~~
A:AV94:  "*
A:AX94:  '{LET last_date,add_date}
A:AV95:  "*
A:AX95:  '{LET cash_bal,@vlookup(last_date,tra_tbl,15)}~
A:AV96:  "*
A:AX96:  '{RETURN}
A:AV97:  "*
A:AV98:  "*
A:AW98:  \*
A:AX98:  \*
A:AY98:  [W11] \*
A:AZ98:  \*
A:BA98:  \*
A:BB98:  \*
A:BC98:  \*
A:BD98:  \*
A:BE98:  \*
A:AV99:  "*
A:AW99:  'name
A:AX99:  'accrue
A:AV100: "*
A:AW100: 'purpose
A:AX100: 'accrues one day's interest and taxes on ADD_BAL as of date, ADD_COUNT
A:AV101: "*
A:AW101: 'called by
A:AX101: 'add, db_accr
A:AV102: "*
A:AW102: 'calls
A:AX102: '~
A:AV103: "*
A:AW103: \*
A:AV104: "*
A:AW104: 'locals
A:AX104: 'daily_int
A:AY104: [W11] 0.75
A:AZ104: 'one day's interest on ADD_BAL
A:AV105: "*
A:AX105: 'daily_tax
```

```
A:AY105: [W11] 0.37
A:AZ105: 'taxes on day's interest on ADD_BAL
A:AV106: "*
A:AV107: "*
A:AW107: 'accrue
A:AX107: (L) '{LET daily_int,@round(add_bal*((1+@vlookup(add_count,int_tbl,1))^(1/365)-1),2)}
A:AV108: "*
A:AX108: (L) '{LET daily_tax,@round(daily_int*@vlookup(add_count,tax_tbl,1),2)}
A:AV109: "*
A:AX109: '{LET accr_int,accr_int+daily_int}
A:AV110: "*
A:AX110: '{LET accr_tax,accr_tax+daily_tax}
A:AV111: "*
A:AX111: (L) '{LET add_bal,add_bal+daily_int}~
A:AV112: "*
A:AX112: '{RETURN}
A:AV113: "*
A:AV114: "*
A:AW114: \*
A:AX114: \*
A:AY114: [W11] \*
A:AZ114: \*
A:BA114: \*
A:BB114: \*
A:BC114: \*
A:BD114: \*
A:BE114: \*
A:AV115: "*
A:AW115: 'name
A:AX115: 'balance
A:AV116: "chg 1/23/95   *
A:AW116: 'purpose
A:AX116: 'generates new transaction table to find current balance as of date of last record in the record table, or date requested
A:AV117: "*
A:AW117: 'called by
A:AX117: 'add_opeb, add_db, add_reimb, add_prem, add_int, add_tax, pr_tran, pr_bal
A:AV118: "*
A:AW118: 'calls
A:AX118: 'current
A:AV119: "*
A:AW119: \*
A:AV120: "*
A:AW120: 'arg
A:AX120: 'cur_date
A:AY120: (D4) [W11] +CUR_DATE
A:BA120: 'argument TO current
A:AV121: "*
A:AV122: "*
A:AW122: 'balance
A:AX122: '{GOTO}nowhere~{WINDOWSON}{WINDOWSOFF}{INDICATE "calculating . . ."}
A:AV123: "*
A:AX123: '{GOTO}tl_rec~{UP}{DOWN rec_num}{RIGHT}{LET cur_date,@cellpointer("contents")}~
```

```
A:AV124: "new 1/23/95  *
A:AX124: '{IF bal_type="S"#or#bal_type="s"}{LET cur_date,@date(bal_yr,bal_mo,bal_day)}{LET bal_type,"L"}
A:AV125: "*
A:AX125: '{current}
A:AV126: "*
A:AX126: '{GOTO}bal_tbl~{WINDOWSON}{WINDOWSOFF}{INDICATE " "}
A:AV127: "*
A:AX127: '{RETURN}
A:AV128: "*
A:AW128: \*
A:AX128: \*
A:AY128: [W11] \*
A:AZ128: \*
A:BA128: \*
A:BB128: \*
A:BC128: \*
A:BD128: \*
A:BE128: \*
A:AV129: "*
A:AW129: 'name
A:AX129: 'current
A:AV130: "*
A:AW130: 'purpose
A:AX130: 'generates new transaction table up to CUR_DATE
A:AV131: "*
A:AW131: 'called by
A:AX131: 'balance, pr_repo
A:AV132: "*
A:AW132: 'calls
A:AX132: 'new_rec, add
A:AV133: "*
A:AW133: \*
A:AV134: "*
A:AW134: 'args
A:AX134: 'cur_date
A:AY134: (D4) [W11] 34393
A:BA134: 'date for which current balance desired
A:AV135: "*
A:AX135: 'new_count
A:AY135: [W11] +NEW_COUNT
A:BA135: 'argument TO new_Rec
A:AV136: "*
A:AV137: "*
A:AW137: 'locals
A:AX137: 'cur_num
A:AY137: [W11] 6
A:AV138: "*
A:AV139: "*
A:AW139: 'current
A:AX139: '{LET cur_num,rec_num}
A:AV140: "*
A:AX140: '{GOTO}tl_rec~{UP}{DOWN rec_num}{RIGHT}
```

```
A:AV141: '*
A:AW141: "cur_lp:
A:AX141: '{IF @cellpointer("contents")>cur_date#and#cur_num>=1}{LET cur_num,cur_num-1}{UP}{BRANCH cur_lp}
A:AV142: '*
A:AX142: '{BLANK tra_tbl}{GOTO}tl_tra~/rnctra_tbl~{BS}.{RIGHT 15}~
A:AV143: '*
A:AX143: '{LET tra_num,0}{LET last_date,init_date}{LET cash_bal,init_bal}~
A:AV144: '*
A:AX144: '{FOR new_count,1,cur_num,1,new_rec}
A:AV145: '*
A:AX145: '{IF last_date<cur_date}{LET add_date,cur_date}{add}
A:AV146: '*
A:AX146: '{RETURN}
A:AV147: '*
A:AV148: '*
A:AW148: \*
A:AX148: \*
A:AY148: [W11] \*
A:AZ148: \*
A:BA148: \*
A:BB148: \*
A:BC148: \*
A:BD148: \*
A:BE148: \*
A:AV149: '*
A:AW149: 'name
A:AX149: 'new_rec
A:AV150: '*
A:AW150: 'purpose
A:AX150: 'add a record number NEW_COUNT to the transaction table
A:AV151: '*
A:AW151: 'called by
A:AX151: 'current
A:AV152: '*
A:AW152: 'calls
A:AX152: 'add, db_accr
A:AV153: '*
A:AW153: \*
A:AV154: '*
A:AW154: 'argument
A:AX154: 'new_count
A:AY154: [W11] 7
A:AV155: '*
A:AV156: '*
A:AW156: 'locals
A:AX156: 'new_date
A:AY156: (D4) [W11] 34393
A:AV157: '*
A:AX157: 'new_type
A:AY157: [W11] 'OPEB
A:AV158: '*
A:AX158: 'new_amt
```

```
A:AY158: (,2) [W11] 0
A:AV159: '*
A:AX159: 'new_dbday
A:AY159: (D4) [W11] 0
A:AV160: '*
A:AX160: 'new_bal
A:AY160: (,2) [W11] 0
A:AV161: '*
A:AV162: '*
A:AW162: 'new_rec
A:AX162: '{LET new_date,@vlookup(new_count,rec_tbl,1)}
A:AV163: '*
A:AX163: '{LET new_type,@vlookup(new_count,rec_tbl,2)}
A:AV164: '*
A:AX164: '{LET new_amt,@vlookup(new_count,rec_tbl,3)}
A:AV165: '*
A:AX165: '{LET new_dbday,@vlookup(new_count,rec_tbl,4)}
A:AV166: '*
A:AX166: '{IF new_date>last_date}{LET add_date,new_date}{add}
A:AV167: '*
A:AX167: '{GOTO}tl_tra~{UP}{DOWN tra_num}
A:AV168: '*
A:AX168: '{IF new_type="OPEB"}{RIGHT 3}
A:AV169: '*
A:AX169: '{IF new_type="DB"}{RIGHT 4}
A:AV170: '*
A:AX170: '{IF new_type="reimb"}{RIGHT 5}
A:AV171: '*
A:AX171: '{IF new_type="prem"}{RIGHT 6}
A:AV172: '*
A:AX172: '{LET new_bal,@cellpointer("contents")+new_amt+new_bal~/rv~~
A:AV173: '*
A:AX173: '{IF new_type="DB"}{db_accr}
A:AV174: '*
A:AX174: '{LET cash_bal,@vlookup(last_date,tra_tbl,15)}~
A:AV175: '*
A:AX175: '{RETURN}
A:AV176: '*
A:AV177: '*
A:AW177: \*
A:AX177: \*
A:AY177: [W11] \*
A:AZ177: \*
A:BA177: \*
A:BB177: \*
A:BC177: \*
A:BD177: \*
A:BE177: \*
A:AV178: '*
A:AW178: 'name
A:AX178: 'db_accr
A:AV179: '*
```

```
A:AW179: 'purpose
A:AX179: 'adds accrued interest and taxes for death benefit/distribution to the transaction table
A:AV180: "*
A:AW180: 'called by
A:AX180: 'new_rec
A:AV181: "*
A:AW181: 'calls
A:AX181: 'accrue
A:AV182: "*
A:AW182: \*
A:AV183: "*
A:AW183: 'locals
A:AX183: 'db_int
A:AY183: [W11] 16.2
A:AV184: "*
A:AX184: 'db_tax
A:AY184: [W11] 8
A:AV185: "*
A:AV186: "*
A:AW186: "db_accr
A:AX186: '{LET add_bal,new_amt}
A:AV187: "*
A:AX187: '{LET accr_int,0}
A:AV188: "*
A:AX188: '{LET accr_tax,0}
A:AV189: "*
A:AX189: '{FOR add_count,new_dbday+1,new_date,1,accrue}
A:AV190: "*
A:AX190: '{GOTO}tl_tra~{UP}{DOWN tra_num}
A:AV191: "*
A:AX191: '{RIGHT}{LET db_int,@cellpointer("contents")+accr_int}-+db_int-/rv--
A:AV192: "*
A:AX192: '{RIGHT}{LET db_tax,@cellpointer("contents")+accr_tax}-+db_tax-/rv--
A:AV193: "*
A:AX193: '{RETURN}
A:AV194: "*
A:AV195: "*
A:AW195: \*
A:AX195: \*
A:AY195: [W11] \*
A:AZ195: \*
A:BA195: \*
A:BB195: \*
A:BC195: \*
A:BD195: \*
A:BE195: \*
A:AV196: "*
A:AW196: 'locals for add_opeb, add_db, add_reimb, add_prem
A:AV197: "*
A:AX197: 'rec_yr
A:AY197: [W11] 94
A:AV198: "*
```

```
A:AX198: 'rec_mo
A:AY198: [W11] 2
A:AV199: '*
A:AX199: 'rec_day
A:AY199: [W11] 28
A:AV200: '*
A:AX200: 'rec_date
A:AY200: (D4) [W11] 34393
A:AV201: '*
A:AX201: 'rec_dbday
A:AY201: (D4) [W11] 34023
A:AV202: '*
A:AX202: 'rec_bal
A:AY202: (,2) [W11] 1000
A:AV203: '*
A:AX203: 'rec_amt
A:AY203: (,2) [W11] 0
A:AV204: '*
A:AX204: 'rec_error1
A:AY204: [W11] 'Can't enter date BEFORE date of last record or ON/BEFORE initialization date.
A:AV205: '*
A:AX205: 'rec_error2
A:AY205: [W11] 'Cannot reimburse MORE than the total of the previous unreimbursed expenses.
A:AV206: '*
A:AX206: 'rec_error3
A:AY206: [W11] 'Cannot reimburse/reinvest MORE than the amount of available cash.
A:AV207: '*
A:AX207: 'rec_error4
A:AY207: [W11] 'Can't have a DB/distribution occur BEFORE the 1st record in the database!
A:AV208: '*
A:AV209: '*
A:AW209: \*
A:AX209: \*
A:AY209: [W11] \*
A:AZ209: \*
A:BA209: \*
A:BB209: \*
A:BC209: \*
A:BD209: \*
A:BE209: \*
A:AV210: '*
A:AW210: 'name
A:AX210: 'add_opeb
A:AV211: '*
A:AW211: 'purpose
A:AX211: 'allows user to add an opeb expense to the record table
A:AV212: '*
A:AW212: 'called by
A:AX212: 'add2_menu
A:AV213: '*
A:AW213: 'calls
A:AX213: 'balance, error
```

```
A:AV214: "*
A:AW214: \*
A:AV215: "*
A:AW215: 'add_opeb
A:AX215: '{balance}
A:AV216: "*
A:AX216: (L) '{get_year "Year to record OPEB expense (e.g., 1993)? ",rec_yr}
A:AV217: "*
A:AX217: (L) '{get_mon "Month to record OPEB expense (e.g., 2 for February)? ",rec_mo}
A:AV218: "*
A:AX218: (L) '{get_day "Day to record OPEB expense (e.g., 5 for the 5th)? ",rec_day,rec_yr,rec_mo}
A:AV219: "*
A:AX219: '{LET rec_date,@date(rec_yr,rec_mo,rec_day)}~
A:AV220: "*
A:AX220: '{IF rec_date<last_date#or#rec_date<=init_date}{LET err_msg,rec_error1}{error}{RETURN}
A:AV221: "*
A:AX221: (L) '{get_amt "Amount of OPEB expense? ",rec_amt}
A:AV222: "*
A:AX222: '{LET rec_num,rec_num+1}
A:AV223: "*
A:AX223: '{GOTO}t1_rec~{UP}{DOWN rec_num}+rec_num~/rv~~
A:AV224: "*
A:AX224: '{RIGHT}+rec_date~/rv~~
A:AV225: "*
A:AX225: '{RIGHT}"OPEB~
A:AV226: "*
A:AX226: '{RIGHT}+rec_amt~/rv~~
A:AV227: "*
A:AX227: '{RIGHT}+0~
A:AV228: "*
A:AX228: '{GOTO}t1_rec~/rncrec_tbl~{BS}.{UP}{DOWN rec_num}{RIGHT 4}~
A:AV229: "*
A:AX229: '{balance}
A:AV230: "*
A:AX230: '{RETURN}
A:AV231: "*
A:AV232: "*
A:AW232: \*
A:AX232: \*
A:AY232: [W11] \*
A:AZ232: \*
A:BA232: \*
A:BB232: \*
A:BC232: \*
A:BD232: \*
A:AV233: "*
A:AW233: 'name
A:AX233: 'add_db
A:AV234: "*
A:AW234: 'purpose
A:AX234: 'allows user to add a credit for a death benefit/distribution to the record table
A:AV235: "*
```

```
A:AW235: 'called by
A:AX235: 'add2_menu
A:AV236: "*
A:AW236: 'calls
A:AX236: 'balance, error
A:AV237: "*
A:AW237: \*
A:AV238: "*
A:AW238: 'add_db
A:AX238: '{balance}
A:AV239: "*
A:AX239: (L) '{get_year "Year DB/distribution credited to account (e.g., 1993)? ",rec_yr}
A:AV240: "*
A:AX240: (L) '{get_mon "Month DB/distribution credited to account (e.g., 2 for February)? ",rec_mo}
A:AV241: "*
A:AX241: (L) '{get_day "Day DB/distribution credited to account (e.g., 5 for the 5th)? ",rec_day,rec_yr,rec_mo}
A:AV242: "*
A:AX242: '{LET rec_date,@date(rec_yr,rec_mo,rec_day)}-
A:AV243: "*
A:AX243: '{IF rec_date<last_date#or#rec_date<=init_date}{LET err_msg,rec_error1}{error}{RETURN}
A:AV244: "*
A:AX244: (L) '{get_year "Year DB/distribution occured  (e.g., 1993)? ",rec_yr}
A:AV245: "*
A:AX245: (L) '{get_mon "Month DB/distribution occured (e.g., 2 for February)? ",rec_mo}
A:AV246: "*
A:AX246: (L) '{get_day "Day DB/distribution occured (e.g., 5 for the 5th)? ",rec_day,rec_yr,rec_mo}
A:AV247: "*
A:AX247: '{LET rec_dbday,@date(rec_yr,rec_mo,rec_day)}-
A:AV248: "*
A:AX248: '{IF rec_dbday<init_date}{LET err_msg,rec_error4}{error}{RETURN}
A:AV249: "*
A:AX249: (L) '{get_amt "Amount of DB/distribution? ",rec_amt}
A:AV250: "*
A:AX250: '{LET rec_num,rec_num+1}
A:AV251: "*
A:AX251: '{GOTO}tl_rec~{UP}{DOWN rec_num}+rec_num~/rv~~
A:AV252: "*
A:AX252: '{RIGHT}+rec_date~/rv~~
A:AV253: "*
A:AX253: '{RIGHT}"DB~
A:AV254: "*
A:AX254: '{RIGHT}+rec_amt~/rv~~
A:AV255: "*
A:AX255: '{RIGHT}+rec_dbday~/rv~~
A:AV256: "*
A:AX256: '{GOTO}tl_rec~/rncrec_tbl~{BS}.{UP}{DOWN rec_num}{RIGHT 4}~
A:AV257: "*
A:AX257: '{balance}
A:AV258: "*
A:AX258: '{RETURN}
A:AV259: "*
A:AV260: "*
```

```
A:AW260: \*
A:AX260: \*
A:AY260: [W11] \*
A:AZ260: \*
A:BA260: \*
A:BB260: \*
A:BC260: \*
A:BD260: \*
A:AV261: "*
A:AW261: 'name
A:AX261: 'add_reimb
A:AV262: "*
A:AW262: 'purpose
A:AX262: 'allows user to add a request for expense reimbursement to the record table
A:AV263: "*
A:AW263: 'called by
A:AX263: 'add2_menu
A:AV264: "*
A:AW264: 'calls
A:AX264: 'balance, error, add
A:AV265: "*
A:AW265: \*
A:AV266: "*
A:AW266: 'add_reimb
A:AX266: '{balance}
A:AV267: "*
A:AX267: (L) '{get_year "Year to record expense reimbursement  (e.g., 1993)? ",rec_yr}
A:AV268: "*
A:AX268: (L) '{get_mon "Month to record expense reimbursement (e.g., 2 for February)? ",rec_mo}
A:AV269: "*
A:AX269: (L) '{get_day "Day to record expense reimbursement (e.g., 5 for the 5th)? ",rec_day,rec_yr,rec_mo}
A:AV270: "*
A:AX270: '{LET rec_date,@date(rec_yr,rec_mo,rec_day)}~
A:AV271: "*
A:AX271: '{IF rec_date<last_date#or#rec_date<=init_date}{LET err_msg,rec_error1}{error}{RETURN}
A:AV272: "*
A:AX272: '{IF rec_date>last_date}{LET add_date,rec_date}{add}{GOTO}bal_tbl~{WINDOWSON}{WINDOWSOFF}
A:AV273: "*
A:AX273: (L) '{get_amt "Amount to reimburse? ",rec_amt}
A:AV274: "*
A:AX274: '{IF rec_amt>net_exp+0.005}{LET err_msg,rec_error2}{error}{RETURN}
A:AV275: "*
A:AX275: '{IF rec_amt>cash_bal+0.005}{LET err_msg,rec_error3}{error}{RETURN}
A:AV276: "*
A:AX276: '{LET rec_num,rec_num+1}
A:AV277: "*
A:AX277: '{GOTO}tl_rec~{UP}{DOWN rec_num}+rec_num~/rv~~
A:AV278: "*
A:AX278: '{RIGHT}+rec_date~/rv~~
A:AV279: "*
A:AX279: '{RIGHT}"reimb~
A:AV280: "*
```

```
A:AX280: '{RIGHT}+rec_amt-/rv~~
A:AV281: "*
A:AX281: '{RIGHT}+0~
A:AV282: "*
A:AX282: '{GOTO}tl_rec~/rncrec_tbl~{BS}.{UP}{DOWN rec_num}{RIGHT 4}~
A:AV283: "*
A:AX283: '{balance}
A:AV284: "*
A:AX284: '{RETURN}
A:AV285: "*
A:AV286: "*
A:AW286: \*
A:AX286: \*
A:AY286: [W11] \*
A:AZ286: \*
A:BA286: \*
A:BB286: \*
A:BC286: \*
A:BD286: \*
A:AV287: "*
A:AW287: 'name
A:AX287: 'add_prem
A:AV288: "*
A:AW288: 'purpose
A:AX288: 'allows user to add request for premium reinvestment to the record table
A:AV289: "*
A:AW289: 'called by
A:AX289: 'add2_menu
A:AV290: "*
A:AW290: 'calls
A:AX290: 'balance, error, add
A:AV291: "*
A:AW291: \*
A:AV292: "*
A:AW292: 'add_prem
A:AX292: '{balance}
A:AV293: "*
A:AX293: (L) '{get_year "Year to record premium reinvestment (e.g., 1993)? ",rec_yr}
A:AV294: "*
A:AX294: (L) '{get_mon "Month to record premium reinvestment (e.g., 2 for February)? ",rec_mo}
A:AV295: "*
A:AX295: (L) '{get_day "Day to record premium reinvestment (e.g., 5 for the 5th)? ",rec_day,rec_yr,rec_mo}
A:AV296: "*
A:AX296: '{LET rec_date,@date(rec_yr,rec_mo,rec_day)}~
A:AV297: "*
A:AX297: '{IF rec_date<last_date#or#rec_date<=init_date}{LET err_msg,rec_error1}{error}{RETURN}
A:AV298: "*
A:AX298: '{IF rec_date>last_date}{LET add_date,rec_date}{add}{GOTO}bal_tbl~{WINDOWSON}{WINDOWSOFF}
A:AV299: "*
A:AX299: (L) '{get_amt "Amount to reinvest? ",rec_amt}
A:AV300: "*
A:AX300: '{IF rec_amt>cash_bal+0.005}{LET err_msg,rec_error3}{error}{RETURN}
```

```
A:AV301: '*
A:AX301: '{LET rec_num,rec_num+1}
A:AV302: '*
A:AX302: '{GOTO}t1_rec~{UP}{DOWN rec_num}+rec_num-/rv~~
A:AV303: '*
A:AX303: '{RIGHT}+rec_date-/rv~~
A:AV304: '*
A:AX304: '{RIGHT}"prem-
A:AV305: '*
A:AX305: '{RIGHT}+rec_amt-/rv~~
A:AV306: '*
A:AX306: '{RIGHT}+0-
A:AV307: '*
A:AX307: '{GOTO}t1_rec~/rncrec_tbl~{BS}.{UP}{DOWN rec_num}{RIGHT 4}-
A:AV308: '*
A:AX308: '{balance}
A:AV309: '*
A:AX309: '{RETURN}
A:AV310: '*
A:AV311: '*
A:AW311: \*
A:AX311: \*
A:AY311: [W11] \*
A:AZ311: \*
A:BA311: \*
A:BB311: \*
A:BC311: \*
A:BD311: \*
A:BE311: \*
A:AV312: '*
A:AW312: 'name
A:AX312: 'add_int
A:AV313: '*
A:AW313: 'purpose
A:AX313: 'allows user to add an interest rate to the interest rate table
A:AV314: '*
A:AW314: 'called by
A:AX314: 'add_menu
A:AV315: '*
A:AW315: 'calls
A:AX315: 'balance, error
A:AV316: '*
A:AW316: \*
A:AV317: '*
A:AW317: 'locals
A:AX317: 'int_yr
A:AY317: [W11] 94
A:AV318: '*
A:AX318: 'int_mo
A:AY318: [W11] 5
A:AV319: '*
A:AX319: 'int_day
```

```
A:AY319: [W11] 1
A:AV320: '*
A:AX320: 'int_date
A:AY320: (D4) [W11] @DATE(INT_YR,INT_MO,INT_DAY)
A:AV321: '*
A:AX321: (L) 'int_last
A:AY321: (D4) [W11] 34515
A:AV322: '*
A:AX322: 'int_amt
A:AY322: (P2) [W11] 0.095
A:AV323: '*
A:AX323: 'int_error
A:AY323: [W11] 'The date entered does NOT occur AFTER the last date entered in the database.
A:AV324: '*
A:AV325: '*
A:AW325: 'add_int
A:AX325: '{balance}
A:AV326: '*
A:AX326: (L) '{get_year "Year new rate takes effect (e.g., 1993)? ",int_yr}
A:AV327: '*
A:AX327: (L) '{get_mon "Month new rate takes effect (e.g., 2 for February)? ",int_mo}
A:AV328: '*
A:AX328: (L) '{get_day "Day new rate takes effect (e.g., 5 for the 5th)? ",int_day,int_yr,int_mo}
A:AV329: '*
A:AX329: '{GOTO}int_date~+@date(int_yr,int_mo,int_day)~
A:AV330: '*
A:AX330: (L) '{GOTO}tl_int~{UP}{DOWN int_num}{LET int_last,@cellpointer("contents")}
A:AV331: '*
A:AX331: (L) '{IF int_date<=@max(last_date,int_last)}{LET err_msg,int_error}{error}{RETURN}
A:AV332: '*
A:AX332: (L) '{get_rate "Rate (e.g., 10.1 means 10.1%)? ",int_amt}
A:AV333: '*
A:AX333: '{LET int_num,int_num+1}
A:AV334: '*
A:AX334: '{GOTO}tl_int~{UP}{DOWN int_num}
A:AV335: '*
A:AX335: '+int_date~/rv~~{RIGHT}+int_amt~/rv~~
A:AV336: '*
A:AX336: '/rncint_tbl~{DOWN}~
A:AV337: '*
A:AX337: '{GOTO}bal_tbl~{WINDOWSON}{WINDOWSOFF}
A:AV338: '*
A:AX338: '{RETURN}
A:AV339: '*
A:AW339: \*
A:AX339: \*
A:AY339: [W11] \*
A:AZ339: \*
A:BA339: \*
A:BB339: \*
A:BC339: \*
A:BD339: \*
```

```
A:BE339: \*
A:AV340: "*
A:AW340: 'name
A:AX340: 'add_tax
A:AV341: "*
A:AW341: 'purpose
A:AX341: 'allows user to add a tax rate to the tax rate table
A:AV342: "*
A:AW342: 'called by
A:AX342: 'add_menu
A:AV343: "*
A:AW343: 'calls
A:AX343: 'balance, error
A:AV344: "*
A:AW344: \*
A:AV345: "*
A:AW345: 'locals
A:AX345: 'tax_yr
A:AY345: [W11] 94
A:AV346: "*
A:AX346: 'tax_mo
A:AY346: [W11] 12
A:AV347: "*
A:AX347: 'tax_day
A:AY347: [W11] 1
A:AV348: "*
A:AX348: 'tax_date
A:AY348: (D4) [W11] @DATE(TAX_YR,TAX_MO,TAX_DAY)
A:AV349: "*
A:AX349: (L) 'tax_last
A:AY349: (D4) [W11] 34335
A:AV350: "*
A:AX350: 'tax_amt
A:AY350: (P2) [W11] 0.4
A:AV351: "*
A:AX351: 'tax_error
A:AY351: [W11] 'The date entered does NOT occur AFTER the last date entered in the database.
A:AV352: "*
A:AV353: "*
A:AW353: 'add_tax
A:AX353: '{balance}
A:AV354: "*
A:AX354: (L) '{get_year "Year new rate takes effect (e.g., 1993)? ",tax_yr}
A:AV355: "*
A:AX355: (L) '{get_mon "Month new rate takes effect (e.g., 2 for February)? ",tax_mo}
A:AV356: "*
A:AX356: (L) '{get_day "Day new rate takes effect (e.g., 5 for the 5th)? ",tax_day,tax_yr,tax_mo}
A:AV357: "*
A:AX357: '{GOTO}tax_date~+@date(tax_yr,tax_mo,tax_day)~
A:AV358: "*
A:AX358: (L) '{GOTO}tl_tax~{UP}{DOWN tax_num}{LET tax_last,@cellpointer("contents")}
A:AV359: "*
```

```
A:AX359: (L) '{IF tax_date<=@max(last_date,tax_last)}{LET err_msg,int_error}{error}{RETURN}
A:AV360: "*
A:AX360: (L) '{get_rate "Rate (e.g., 35.5 means 35.5%)? ",tax_amt}
A:AV361: "*
A:AX361: '{LET tax_num,tax_num+1}
A:AV362: "*
A:AX362: '{GOTO}tl_tax-{UP}{DOWN tax_num}
A:AV363: "*
A:AX363: '+tax_date~/rv~~{RIGHT}+tax_amt~/rv~~
A:AV364: "*
A:AX364: '/rnctax_tbl-{DOWN}~
A:AV365: "*
A:AX365: '{GOTO}bal_tbl-{WINDOWSON}{WINDOWSOFF}
A:AV366: "*
A:AX366: '{RETURN}
A:AV367: "*
A:AW367: \*
A:AX367: \*
A:AY367: [W11] \*
A:AZ367: \*
A:BA367: \*
A:BB367: \*
A:BC367: \*
A:BD367: \*
A:BE367: \*
A:AV368: "*
A:AW368: 'name
A:AX368: 'main
A:AV369: "*
A:AW369: 'purpose
A:AX369: 'main macro that boots up the system
A:AV370: "*
A:AW370: 'called by
A:AX370: '-
A:AV371: "*
A:AW371: 'calls
A:AX371: 'main_menu
A:AV372: "*
A:AW372: \*
A:AV373: "*
A:AW373: "main
A:AX373: '{GOTO}nowhere~{WINDOWSOFF}{PANELOFF clear}{INDICATE ""}
A:AV374: "*
A:AX374: '{MENUBRANCH main_menu}
A:AV375: "*
A:AX375: '{RESTART}{BRANCH \a}
A:AV376: "*
A:AW376: \*
A:AX376: \*
A:AY376: [W11] \*
A:AZ376: \*
A:BA376: \*
```

```
A:BB376: \*
A:BC376: \*
A:BD376: \*
A:BE376: \*
A:AV377: "*
A:AW377: 'name
A:AX377: 'main_menu
A:AV378: "*
A:AW378: 'purpose
A:AX378: 'menu
A:AV379: "*
A:AW379: 'called by
A:AX379: 'main
A:AV380: "*
A:AW380: 'calls
A:AX380: 'add_menu, print_menu, save, delete, init, quit_menu
A:AV381: "*
A:AW381: \*
A:AV382: "*
A:AW382: "main_menu
A:AX382: 'Add
A:AY382: [W11] 'Print
A:AZ382: 'Save
A:BA382: 'Delete
A:BB382: 'Init
A:BC382: 'Quit
A:AV383: "*
A:AX383: 'Add a new transaction or rate to the database.
A:AY383: [W11] 'Print out the database or a report.
A:AZ383: 'Save the current version of the spreadsheet.
A:BA383: 'Delete records, interest rates, tax rates.
A:BB383: 'Initialize the spreadsheet.  Erases all current data.
A:BC383: 'Quit the program.
A:AV384: "*
A:AX384: '{MENUBRANCH add_menu}
A:AY384: [W11] '{MENUBRANCH pr_menu}
A:AZ384: '{save}{MENUBRANCH main_menu}
A:BA384: '{deleet}{MENUBRANCH main_menu}
A:BB384: '{init}{MENUBRANCH main_menu}
A:BC384: '{MENUBRANCH quit_menu}
A:AV385: (L) "*
A:AX385: '{RESTART}{BRANCH \a}
A:AY385: [W11] '{RESTART}{BRANCH \a}
A:AZ385: '{RESTART}{BRANCH \a}
A:BA385: '{RESTART}{BRANCH \a}
A:BB385: '{RESTART}{BRANCH \a}
A:BC385: '{RESTART}{BRANCH \a}
A:AV386: "*
A:AW386: \*
A:AX386: \*
A:AY386: [W11] \*
A:AZ386: \*
```

```
A:BA386:  \*
A:BB386:  \*
A:BC386:  \*
A:BD386:  \*
A:BE386:  \*
A:AV387:  '*
A:AW387:  'name
A:AX387:  'add_menu
A:AV388:  '*
A:AW388:  'purpose
A:AX388:  'menu
A:AV389:  '*
A:AW389:  'called by
A:AX389:  'add_menu
A:AV390:  '*
A:AW390:  'calls
A:AX390:  'add2_menu, add_int, add_tax, main_menu
A:AV391:  '*
A:AW391:  \*
A:AV392:  '*
A:AW392:  'add_menu
A:AX392:  'Record
A:AY392:  [W11] 'Interest
A:AZ392:  'Tax
A:BA392:  'Quit
A:AV393:  '*
A:AX393:  'Add an OPEB expense, a reimbursement, a DB, or premium reinvestment.
A:AY393:  [W11] 'Add an interest rate to the database.
A:AZ393:  'Add a tax rate to the database.
A:BA393:  'Return to the previous menu.
A:AV394:  '*
A:AX394:  '{MENUBRANCH add2_menu}
A:AY394:  [W11] '{add_int}{MENUBRANCH add_menu}
A:AZ394:  '{add_tax}{MENUBRANCH add_menu}
A:BA394:  '{MENUBRANCH main_menu}
A:AV395:  '*
A:AX395:  '{RESTART}{BRANCH \a}
A:AY395:  [W11] '{RESTART}{BRANCH \a}
A:AZ395:  '{RESTART}{BRANCH \a}
A:BA395:  '{RESTART}{BRANCH \a}
A:AV396:  '*
A:AW396:  \*
A:AX396:  \*
A:AY396:  [W11] \*
A:AZ396:  \*
A:BA396:  \*
A:BB396:  \*
A:BC396:  \*
A:BD396:  \*
A:BE396:  \*
A:AV397:  '*
A:AW397:  'name
```

```
A:AX397:  'add2_menu
A:AV398:  "*
A:AW398:  'purpose
A:AX398:  'menu
A:AV399:  "*
A:AW399:  'called by
A:AX399:  'add_menu
A:AV400:  "*
A:AW400:  'calls
A:AX400:  'add_opeb, add_db, add_reimb, add_prem, add_menu
A:AV401:  "*
A:AW401:  \*
A:AV402:  "*
A:AW402:  'add2_menu
A:AX402:  'OPEB
A:AY402:  [W11] 'DB
A:AZ402:  'Reimburse
A:BA402:  'Premium
A:BB402:  'Quit
A:AV403:  "*
A:AX403:  'Add an OPEB expense to the database.
A:AY403:  [W11] 'Add a death benefit or distribution to the database.
A:AZ403:  'Add an expense reimbursement to the database.
A:BA403:  'Add a premium reinvestment to the database.
A:BB403:  'Return to the previous menu.
A:AV404:  "*
A:AX404:  '{add_opeb}{MENUBRANCH add2_menu}
A:AY404:  [W11] '{add_db}{MENUBRANCH add2_menu}
A:AZ404:  '{add_reimb}{MENUBRANCH add2_menu}
A:BA404:  '{add_prem}{MENUBRANCH add2_menu}
A:BB404:  '{MENUBRANCH add_menu}
A:AV405:  "*
A:AX405:  '{RESTART}{BRANCH \a}
A:AY405:  [W11] '{RESTART}{BRANCH \a}
A:AZ405:  '{RESTART}{BRANCH \a}
A:BA405:  '{RESTART}{BRANCH \a}
A:BB405:  '{RESTART}{BRANCH \a}
A:AV406:  "*
A:AW406:  \*
A:AX406:  \*
A:AY406:  [W11] \*
A:AZ406:  \*
A:BA406:  \*
A:BB406:  \*
A:BC406:  \*
A:BD406:  \*
A:BE406:  \*
A:AV407:  "*
A:AW407:  'name
A:AX407:  'pr_menu
A:AV408:  "*
A:AW408:  'purpose
```

```
A:AX408:  'menu
A:AV409:  "*
A:AW409:  'called by
A:AX409:  'main_menu
A:AV410:  "*
A:AW410:  'calls
A:AX410:  'pr_data, pr_tran, pr_bal, pr_repo, main_menu
A:AV411:  "*
A:AW411:  \*
A:AV412:  "*
A:AW412:  "pr_menu
A:AX412:  'Data
A:AY412:  [W11] 'Transactions
A:AZ412:  'Balance
A:BA412:  'Reports
A:BB412:  'Quit
A:AV413:  "chg 1/23/95 *
A:AX413:  'Print out expenses and reimbursements, DB's, premiums, interest and tax rates.
A:AY413:  [W11] 'Print out a chronological record of all transactions.
A:AZ413:  'Print out cumulative statistics as of last transaction date, or specified date.
A:BA413:  'Print out a monthly or yearly reconciliation report.
A:BB413:  'Return to the previous menu.
A:AV414:  "*
A:AX414:  '{pr_data}{MENUBRANCH pr_menu}
A:AY414:  [W11] '{pr_tran}{MENUBRANCH pr_menu}
A:AZ414:  '{pr_bal}{MENUBRANCH pr_menu}
A:BA414:  '{pr_repo}{MENUBRANCH pr_menu}
A:BB414:  '{MENUBRANCH main_menu}
A:AV415:  "*
A:AX415:  '{RESTART}{BRANCH \a}
A:AY415:  [W11] '{RESTART}{BRANCH \a}
A:AZ415:  '{RESTART}{BRANCH \a}
A:BA415:  '{RESTART}{BRANCH \a}
A:BB415:  '{RESTART}{BRANCH \a}
A:AV416:  "*
A:AW416:  \*
A:AX416:  \*
A:AY416:  [W11] \*
A:AZ416:  \*
A:BA416:  \*
A:BB416:  \*
A:BC416:  \*
A:BD416:  \*
A:BE416:  \*
A:AV417:  "*
A:AW417:  'name
A:AX417:  'pr_data
A:AV418:  "*
A:AW418:  'purpose
A:AX418:  'print out data in the record, interest rate, and tax rate tables
A:AV419:  "*
A:AW419:  'called by
```

```
A:AX419: 'pr_menu
A:AV420: "*
A:AW420: 'calls
A:AX420: '-
A:AV421: "*
A:AW421: \*
A:AV422: "*
A:AW422: 'locals
A:AX422: 'dat_num
A:AY422: [W11] 1
A:AV423: "*
A:AV424: "*
A:AW424: "pr_data
A:AX424: '{LET dat_num,@max(rec_num,int_num,tax_num)}
A:AV425: "*
A:AX425: '{GOTO}tl_rec~
A:AV426: "*
A:AX426: (L) '{CALC}:plcm75~btdat_bdr~qqrcrs.{UP}{DOWN dat_num}{RIGHT 11}~g
A:AV427: "*
A:AX427: '{RETURN}
A:AV428: "*
A:AW428: \*
A:AX428: \*
A:AY428: [W11] \*
A:AZ428: \*
A:BA428: \*
A:BB428: \*
A:BC428: \*
A:BD428: \*
A:BE428: \*
A:AV429: "*
A:AW429: 'name
A:AX429: 'pr_tran
A:AV430: "*
A:AW430: 'purpose
A:AX430: 'print out a transaction table through the date of the last record in the record table
A:AV431: "*
A:AW431: 'called by
A:AX431: 'pr_menu
A:AV432: "*
A:AW432: 'calls
A:AX432: 'balance
A:AV433: "*
A:AW433: \*
A:AV434: "*
A:AW434: "pr_tran
A:AX434: '{balance}
A:AV435: "*
A:AX435: '{GOTO}tl_tra~
A:AV436: "*
A:AX436: (L) '{CALC}:plcm55~bttra_bdr~qqrcrs.{UP}{DOWN tra_num}{RIGHT 15}~g
A:AV437: "*
```

```
A:AX437: '{RETURN}
A:AV438: "*
A:AW438: \*
A:AX438: \*
A:AY438: [W11] \*
A:AZ438: \*
A:BA438: \*
A:BB438: \*
A:BC438: \*
A:BD438: \*
A:BE438: \*
A:AV439: "*
A:AW439: 'name
A:AX439: 'pr_bal
A:AV440: "chg 1/23/95  *
A:AW440: 'purpose
A:AX440: 'print out cumulative stats as of date of last record in the record table, or as of a specified date
A:AV441: "*
A:AW441: 'called by
A:AX441: 'pr_menu
A:AV442: "*
A:AW442: 'calls
A:AX442: 'balance
A:AV443: "*
A:AW443: \*
A:AV444: (L) "new 1/23/95  *
A:AW444: 'locals
A:AX444: 'bal_type
A:AY444: [W11] 'L
A:AV445: (L) "new 1/23/95  *
A:AX445: 'bal_yr
A:AY445: [W11] 93
A:AV446: (L) "new 1/23/95  *
A:AX446: 'bal_mo
A:AY446: [W11] 3
A:AV447: (L) "new 1/23/95  *
A:AX447: 'bal_day
A:AY447: [W11] 3
A:AV448: "*
A:AX448: 'bal_error
A:AY448: [W11] 'Can't enter date ON/BEFORE initialization date.
A:AV449: "*
A:AV450: (L) "new 1/23/95  *
A:AW450: "pr_bal
A:AX450: '{GETLABEL "As of last transaction date or a specified date (l = last, s = specified)? ",bal_type}
A:AV451: (L) "new 1/23/95  *
A:AX451: '{IF bal_type<>"L"#and#bal_type<>"l"#and#bal_type<>"S"#and#bal_type<>"s"}{BEEP}{BEEP}{BRANCH pr_repo}
A:AV452: (L) "new 1/23/95  *
A:AX452: '{IF bal_type<>"S"#or#bal_type<>"S"}{BRANCH pr_bal2}
A:AV453: (L) "new 1/23/95  *
A:AX453: '{get_year "Year of balance date requested (e.g., 1993)? ",bal_yr}
A:AV454: (L) "new 1/23/95  *
```

```
A:AX454:  '{get_mon "Month of balance date requested (e.g., 2 for February)? ",bal_mo}
A:AV455:  (L) "new 1/23/95  *
A:AX455:  (L) '{get_day "Day of balance date requested (e.g., 5 for the 5th)?",bal_day,bal_yr,bal_mo}
A:AV456:  (L) "new 1/24/95  *
A:AX456:  (L) '{IF @date(bal_yr,bal_mo,bal_day)<=int_last}{LET err_msg,bal_error}{error}{RETURN}
A:AV457:  (L) "new 1/23/95  *
A:AW457:  "pr_bal2
A:AX457:  '{balance}
A:AV458:  "*
A:AX458:  '{CALC}:plcnbcaqqrcrsbal_tbl~g
A:AV459:  "*
A:AX459:  '{RETURN}
A:AV460:  "*
A:AW460:  \*
A:AX460:  \*
A:AY460:  [W11] \*
A:AZ460:  \*
A:BA460:  \*
A:BB460:  \*
A:BC460:  \*
A:BD460:  \*
A:BE460:  \*
A:AV461:  "*
A:AW461:  'name
A:AX461:  'pr_repo
A:AV462:  "*
A:AW462:  'purpose
A:AX462:  'print out 1-month or 12-month report, comparing final cashbalance to user supplied balance
A:AV463:  "*
A:AW463:  'called by
A:AX463:  'pr_menu
A:AV464:  "*
A:AW464:  'calls
A:AX464:  'error, current
A:AV465:  "*
A:AW465:  \*
A:AV466:  "*
A:AW466:  'locals
A:AX466:  'pri_type
A:AY466:  [W11] 'y
A:AV467:  "*
A:AX467:  'pri_yr
A:AY467:  [W11] 94
A:AV468:  "*
A:AX468:  'pri_mo
A:AY468:  [W11] 2
A:AV469:  (L) "new 1/23/95  *
A:AX469:  'pri_day
A:AY469:  [W11] 28
A:AV470:  "*
A:AX470:  'pri_strt
A:AY470:  [W11] 'location on transaction sheet
```

```
A:AV471: '*
A:AX471: 'pri_end
A:AY471: [W11] 'location on transaction sheet
A:AV472: '*
A:AX472: 'pri_frst
A:AY472: (D4) [W11] 34028
A:AV473: '*
A:AX473: 'pri_last
A:AY473: (D4) [W11] 34393
A:AV474: '*
A:AX474: 'pri_error
A:AY474: [W11] 'Can't generate report that ends BEFORE start of contract!
A:AV475: '*
A:AV476: '*
A:AW476: 'pr_repo
A:AX476: '{GETLABEL "Monthly or yearly report (m = monthly, y = yearly)? ",pri_type}
A:AV477: '*
A:AX477: '{IF pri_type<>"M"#and#pri_type<>"m"#and#pri_type<>"Y"#and#pri_type<>"y"}{BEEP}{BEEP}{BRANCH pr_repo}
A:AV478: (L) "new 1/23/95 *
A:AX478: (L) '{IF pri_type<>"Y"#and#pri_type<>"y"}{GETLABEL "Calendar month or non-Calendar month (m = calendar, n = non-calendar)
A:AV479: '*
A:AX479: (L) '{get_year "Year in which reporting period ends (e.g., 1993)? ",pri_yr}
A:AV480: "chg 1/23/95 *
A:AX480: (L) '{get_mon "Month in which reporting period ends (e.g., 2 for February)? ",pri_mo}
A:AV481: (L) "new 1/23/95 *
A:AX481: '{IF pri_type<>"M"#or#pri_type<>"M"}{get_day "Day on which reporting period ends (e.g., 5 for the 5th)?",pri_day,pri_yr,p
A:AV482: "chg 1/23/95 *
A:AX482: '{IF pri_type="M"#or#pri_type="m"}{LET pri_last,@if(pri_mo=12,@date(pri_yr+1,1,1)-1,@date(pri_yr,pri_mo+1,1)-1)}
A:AV483: (L) "new 1/23/95 *
A:AX483: '{IF pri_type<>"M"#and#pri_type<>"m"}{LET pri_last,@date(pri_yr,pri_mo,pri_day)}
A:AV484: '*
A:AX484: '{IF pri_type="M"#or#pri_type="m"}{LET pri_frst,@date(pri_yr,pri_mo,1)-1}
A:AV485: '*
A:AX485: '{IF pri_type="Y"#or#pri_type="y"}{LET pri_frst,@date(@year(pri_last)-1,@month(pri_last),@day(pri_last))}
A:AV486: (L) "new 1/23/95 *
A:AX486: '{IF pri_type="N"#or#pri_type="n"}{IF pri_mo=2#or#pri_mo=4#or#pri_mo=6#or#pri_mo=8#or#pri_mo=9#or#pri_mo=11}{LET pri_frst
A:AV487: (L) "new 1/23/95 *
A:AX487: '{IF pri_type="N"#of#pri_type="n"{IF pri_mo=1}{LET pri_frst,@date(pri_yr-1,12,pri_day)}
A:AV488: (L) "new 1/23/95 *
A:AX488: '{IF pri_type="N"#or#pri_type="n"}{IF pri_mo=5#or#pri_mo=7#or#pri_mo=10#or#pri_mo=12#and#pri_day<31}{LET pri_frst,@date(p
A:AV489: (L) "new 1/23/95 *
A:AX489: '{IF pri_type="N"#or#pri_type="n"}{IF pri_mo=5#or#pri_mo=7#or#pri_mo=10#or#pri_mo=12#and#pri_day=31}{LET pri_frst,@date(p
A:AV490: (L) "new 1/23/95 *
A:AX490: '{IF pri_type="N"#or#pri_type="n"}{IF pri_mo=3#and#pri_day<29}{LET pri_frst,@date(pri_yr,2,pri_day)}
A:AV491: (L) "new 1/23/95 *
A:AX491: '{IF pri_type="N"#or#pri_type="n"}{IF pri_mo=3#and#pri_day>28}{LET pri_frst,@date(pri_yr,pri_mo,1)-1}
A:AV492: '*
A:AX492: '{GOTO}nowhere~{WINDOWSON}{WINDOWSOFF}{INDICATE "calculating . . ."}
A:AV493: '*
A:AX493: '{GOTO}t1_rec~{UP}{DOWN rec_num}{RIGHT}{LET cur_date,@cellpointer("contents")}~{current}
A:AV494: '*
A:AX494: '{IF pri_last<init_date}{LET err_msg,pri_error}{error}{RETURN}
```

```
A:AV495: "*
A:AX495: '{IF pri_frst<init_date}{LET pri_frst,init_date}~
A:AV496: "*
A:AX496: '{LET cur_date,pri_frst}{current}{GOTO}tl_tra~{UP}{DOWN tra_num}/rv.{RIGHT 15}~start~
A:AV497: "*
A:AX497: '{LET cur_date,pri_last}{current}{GOTO}tl_tra~{UP}{DOWN tra_num}/rv.{RIGHT 15}~end~
A:AV498: "*
A:AX498: '{INDICATE " "}{GETNUMBER "Account balance from central system as of ending date? ",sys_bal}
A:AV499: "*
A:AX499: '{CALC}:plcabcaqqrcrsrep_tbl~g
A:AV500: "*
A:AX500: '{RETURN}
A:AV501: "*
A:AV502: "*
A:AW502: \*
A:AX502: \*
A:AY502: [W11] \*
A:AZ502: \*
A:BA502: \*
A:BB502: \*
A:BC502: \*
A:BD502: \*
A:BE502: \*
A:AV503: "*
A:AW503: 'name
A:AX503: 'error
A:AV504: "*
A:AW504: 'purpose
A:AX504: 'displays an error message
A:AV505: "*
A:AW505: 'called by
A:AX505: 'various subroutines
A:AV506: "*
A:AW506: 'calls
A:AX506: '-
A:AV507: "*
A:AW507: \*
A:AV508: "*
A:AW508: 'local
A:AX508: "end_err
A:AY508: [W11] '
A:AZ508: 'dummy variable used to store nothing when user hits <ENTER> after an error
A:AV509: "*
A:AV510: "*
A:AW510: "error
A:AX510: '{GOTO}err_tbl~{WINDOWSON}{WINDOWSOFF}{INDICATE "ERROR"}
A:AV511: "*
A:AX511: '{BEEP 1}{BEEP 3}
A:AV512: "*
A:AX512: '{GETLABEL "Press <ENTER> to continue . . . ",end_err}
A:AV513: "*
A:AX513: '{GOTO}nowhere~{WINDOWSON}{WINDOWSOFF}{INDICATE " "}
```

```
A:AV514: "*
A:AX514: '{RETURN}
A:AV515: "*
A:AW515: \*
A:AX515: \*
A:AY515: [W11] \*
A:AZ515: \*
A:BA515: \*
A:BB515: \*
A:BC515: \*
A:BD515: \*
A:BE515: \*
A:AV516: "*
A:AW516: 'name
A:AX516: 'deleet
A:AV517: "*
A:AW517: 'purpose
A:AX517: 'deletes all records, interest rates, and tax rates in database ON or after auser-specified date
A:AV518: "*
A:AW518: 'called by
A:AX518: 'main_menu
A:AV519: "*
A:AW519: 'calls
A:AX519: 'error
A:AV520: "*
A:AW520: \*
A:AV521: "*
A:AW521: 'locals
A:AX521: 'del_yr
A:AY521: [W11] 95
A:AV522: "*
A:AX522: 'del_mo
A:AY522: [W11] 1
A:AV523: "*
A:AX523: 'del_day
A:AY523: [W11] 1
A:AV524: "*
A:AX524: 'del_date
A:AY524: (D4) [W11] 34700
A:AV525: "*
A:AX525: 'del_ans
A:AY525: [W11] 'y
A:AV526: "*
A:AX526: 'del_num
A:AY526: [W11] 2
A:AV527: "*
A:AX527: 'del_msg
A:AY527: [W11] "range
A:AV528: "*
A:AX528: 'del_error
A:AY528: [W11] 'If you want to delete all data to the initialization date, use INIT.
A:AV529: "*
```

```
A:AV530: '*
A:AW530: "deleet
A:AX530: (L) '{get_year "Year to delete records, interest rates, tax rates (e.g., 1993)? ",del_yr}
A:AV531: '*
A:AX531: (L) '{get_mon "Month to delete records, interest rates, tax rates (e.g., 2 for February)? ",del_mo}
A:AV532: '*
A:AX532: (L) '{get_day "Day to delete records, interest rates, tax rates (e.g., 5 for the 5th)? ",del_day,del_yr,del_mo}
A:AV533: '*
A:AX533: '{LET del_date,@date(del_yr,del_mo,del_day)}~
A:AV534: '*
A:AX534: '{IF del_date<=init_date}{LET err_msg,del_error}{error}{RETURN}
A:AV535: '*
A:AX535: '{GOTO}del_msg~{WINDOWSON}{WINDOWSOFF}
A:AV536: '*
A:AW536: "del_lp1:
A:AX536: '{GETLABEL "Sure you want to delete(Y/N)? ",del_ans}
A:AV537: '*
A:AX537: '{IF del_ans<>"Y"#and#del_ans<>"y"#and#del_ans<>"N"#and#del_ans<>"n"}{BEEP}{BEEP}{BRANCH del_lp1}
A:AV538: '*
A:AX538: '{IF del_ans="N"#or#del_ans="n"}{RETURN}
A:AV539: '*
A:AX539: '{LET del_num,rec_num}
A:AV540: '*
A:AX540: '{GOTO}tl_rec~{UP}{DOWN del_num}{RIGHT}
A:AV541: '*
A:AW541: "del_lp2:
A:AX541: '{IF @cellpointer("contents")>=del_date#and#del_num>=1}{LET del_num,del_num-1}{UP}{BRANCH del_lp2}
A:AV542: '*
A:AX542: '{GOTO}tl_rec~{DOWN del_num}
A:AV543: '*
A:AX543: '/re.{DOWN (rec_num-del_num)}{RIGHT 4}~
A:AV544: '*
A:AX544: '{LET rec_num,del_num}
A:AV545: '*
A:AX545: '{IF del_num=0}{LET del_num,1}
A:AV546: '*
A:AX546: '{GOTO}tl_rec~/rncrec_tbl~{BS}.{UP}{DOWN del_num}{RIGHT 4}~
A:AV547: '*
A:AX547: '{LET del_num,int_num}
A:AV548: '*
A:AX548: '{GOTO}tl_int~{UP}{DOWN del_num}
A:AV549: '*
A:AW549: "del_lp3:
A:AX549: '{IF @cellpointer("contents")>=del_date#and#del_num>=1}{LET del_num,del_num-1}{UP}{BRANCH del_lp3}
A:AV550: '*
A:AX550: '{IF del_num=0}{LET err_msg,del_error}{error}{RETURN}
A:AV551: '*
A:AX551: '{GOTO}tl_int~{DOWN del_num}
A:AV552: '*
A:AX552: '/re.{DOWN (rec_num-del_num)}{RIGHT 1}~
A:AV553: '*
A:AX553: '{LET int_num,del_num}
```

```
A:AV554: '*
A:AX554: '{GOTO}tl_int~/rncint_tbl~{BS}.{UP}{DOWN del_num}{RIGHT}~
A:AV555: '*
A:AX555: '{LET del_num,tax_num}
A:AV556: '*
A:AX556: '{GOTO}tl_tax~{UP}{DOWN del_num}
A:AV557: '*
A:AW557: "del_lp4:
A:AX557: '{IF @cellpointer("contents")>=del_date#and#del_num>=1}{LET del_num,del_num-1}{UP}{BRANCH del_lp4}
A:AV558: '*
A:AX558: '{IF del_num=0}{LET err_msg,del_error}{error}{RETURN}
A:AV559: '*
A:AX559: '{GOTO}tl_tax~{DOWN del_num}
A:AV560: '*
A:AX560: '/re.{DOWN (rec_num-del_num)}{RIGHT 1}~
A:AV561: '*
A:AX561: '{LET tax_num,del_num}
A:AV562: '*
A:AX562: '{GOTO}tl_tax~/rnctax_tbl~{BS}.{UP}{DOWN del_num}{RIGHT}~
A:AV563: '*
A:AX563: '{GOTO}nowhere~{WINDOWSON}{WINDOWSOFF}
A:AV564: '*
A:AX564: '{RETURN}
A:AV565: '*
A:AW565: \*
A:AX565: \*
A:AY565: [W11] \*
A:AZ565: \*
A:BA565: \*
A:BB565: \*
A:BC565: \*
A:BD565: \*
A:BE565: \*
A:AV566: '*
A:AW566: 'name
A:AX566: 'save
A:AV567: '*
A:AW567: 'purpose
A:AX567: 'saves the spreadsheet to the current filename
A:AV568: '*
A:AW568: 'called by
A:AX568: 'main_menu
A:AV569: '*
A:AW569: 'calls
A:AX569: '-
A:AV570: '*
A:AW570: \*
A:AV571: '*
A:AW571: "save
A:AX571: '{INDICATE "saving . . ."}
A:AV572: '*
A:AX572: '/fs~r.
```

```
A:AV573: "*
A:AX573: '{INDICATE " "}
A:AV574: "*
A:AX574: '{RETURN}
A:AV575: "*
A:AW575: \*
A:AX575: \*
A:AY575: [W11] \*
A:AZ575: \*
A:BA575: \*
A:BB575: \*
A:BC575: \*
A:BD575: \*
A:BE575: \*
A:AV576: "*
A:AW576: 'name
A:AX576: 'quit_menu
A:AV577: "*
A:AW577: 'purpose
A:AX577: 'makes the system quit
A:AV578: "*
A:AW578: 'called by
A:AX578: 'main_menu
A:AV579: "*
A:AW579: 'calls
A:AX579: 'main_menu
A:AV580: "*
A:AW580: \*
A:AV581: "*
A:AW581: 'quit_menu
A:AX581: 'No
A:AY581: [W11] 'Yes
A:AV582: "*
A:AX582: 'Return to the main menu.
A:AY582: [W11] 'Exit the program.
A:AV583: (L) "chg 1/24/95  *
A:AX583: '{MENUBRANCH main_menu}
A:AY583: [W11] '{QUIT}
A:AZ583: (L) '/qyy
A:AV584: "*
A:AX584: '{RESTART}{BRANCH \a}
A:AY584: [W11] '{RESTART}{BRANCH \a}
A:AV585: "*
A:AW585: \*
A:AX585: \*
A:AY585: [W11] \*
A:AZ585: \*
A:BA585: \*
A:BB585: \*
A:BC585: \*
A:BD585: \*
A:BE585: \*
```

```
A:AV586: '*
A:AW586: 'name
A:AX586: 'get_year
A:AV587: '*
A:AW587: 'purpose
A:AX587: 'gets user-input year and does error checking
A:AV588: '*
A:AW588: 'called by
A:AX588: 'init, add_opeb, add_db, add_reimb, add_prem, add_int, add_tax, pr_repo, delete
A:AV589: '*
A:AW589: 'calls
A:AX589: '--
A:AV590: '*
A:AW590: \*
A:AV591: '*
A:AW591: 'args
A:AX591: 'yr_msg
A:AY591: [W11] 'Year in which reporting period ends (e.g., 1993)?
A:AZ591: 'prompt for user input
A:AV592: '*
A:AX592: 'yr_cell
A:AY592: [W11] 'pri_yr
A:AZ592: 'range name to which user input returned
A:AV593: '*
A:AV594: '*
A:AW594: 'locals
A:AX594: 'yr_value
A:AY594: [W11] 1994
A:AZ594: 'the user-input value that is returned to "yr_cell"
A:AV595: '*
A:AX595: 'yr_error
A:AY595: (L) [W11] 'the year must be an integer between 1990 and 2090
A:AV596: '*
A:AV597: '*
A:AV598: '*
A:AW598: 'get_year
A:AX598: '{DEFINE yr_msg:s,yr_cell:s}
A:AV599: '*
A:AW599: "yr_loop:
A:AX599: '{GETNUMBER yr_msg,yr_value}
A:AV600: '*
A:AX600: '{IF @iserr(yr_value)}{LET err_msg,yr_error}{error}{BRANCH yr_loop}
A:AV601: '*
A:AX601: (L) '{IF yr_value<1990#or#yr_value>2090#or#yr_value<>@int(yr_value)}{LET err_msg,yr_error}{error}{BRANCH yr_loop}
A:AV602: '*
A:AX602: (L) '{LET @cell("contents",yr_cell),yr_value-1900}
A:AV603: '*
A:AX603: '{RETURN}
A:AV604: '*
A:AW604: \*
A:AX604: \*
A:AY604: [W11] \*
```

```
A:AZ604: \*
A:BA604: \*
A:BB604: \*
A:BC604: \*
A:BD604: \*
A:BE604: \*
A:AV605: "*
A:AW605: 'name
A:AX605: 'get_mon
A:AV606: "*
A:AW606: 'purpose
A:AX606: 'gets user-input month and does error checking
A:AV607: "*
A:AW607: 'called by
A:AX607: 'init, add_opeb, add_db, add_reimb, add_prem, add_int, add_tax, pr_repo, delete
A:AV608: "*
A:AW608: 'calls
A:AX608: '--
A:AV609: "*
A:AW609: \*
A:AV610: "*
A:AW610: 'args
A:AX610: 'mo_msg
A:AY610: [W11] 'Month in which reporting period ends (e.g., 2 for February)?
A:AZ610: 'prompt for user input
A:AV611: "*
A:AX611: 'mo_cell
A:AY611: [W11] 'pri_mo
A:AZ611: 'range name to which user input returned
A:AV612: "*
A:AV613: "*
A:AW613: 'locals
A:AX613: 'mo_value
A:AY613: [W11] 2
A:AZ613: 'the user-input value that is returned to "mo_cell"
A:AV614: "*
A:AX614: 'mo_error
A:AY614: (L) [W11] 'the month must be an integer between 1 and 12
A:AV615: "*
A:AV616: "*
A:AV617: "*
A:AW617: 'get_mon
A:AX617: '{DEFINE mo_msg:s,mo_cell:s}
A:AV618: "*
A:AW618: "mo_loop:
A:AX618: '{GETNUMBER mo_msg,mo_value}
A:AV619: "*
A:AX619: '{IF @iserr(mo_value)}{LET err_msg,mo_error}{error}{BRANCH mo_loop}
A:AV620: "*
A:AX620: '{IF mo_value<1#or#mo_value>12#or#mo_value<>@int(mo_value)}{LET err_msg,mo_error}{error}{BRANCH mo_loop}
A:AV621: "*
A:AX621: '{LET @cell("contents",mo_cell),mo_value}
```

```
A:AV622:  "*
A:AX622:  '{RETURN}
A:AV623:  "*
A:AW623:  \*
A:AX623:  \*
A:AY623:  [W11] \*
A:AZ623:  \*
A:BA623:  \*
A:BB623:  \*
A:BC623:  \*
A:BD623:  \*
A:BE623:  \*
A:AV624:  "*
A:AW624:  'name
A:AX624:  'get_day
A:AV625:  "*
A:AW625:  'purpose
A:AX625:  'gets user-input day and does error checking
A:AV626:  (L) "chg 1/23/95  *
A:AW626:  'called by
A:AX626:  (L) 'init, add_opeb, add_db, add_reimb, add_prem, add_int, add_tax,  delete,  print_repo
A:AV627:  "*
A:AW627:  'calls
A:AX627:  '--
A:AV628:  "*
A:AW628:  \*
A:AV629:  "*
A:AW629:  'args
A:AX629:  'day_msg
A:AY629:  [W11] 'Day on which reporting period ends (e.g., 5 for the 5th)?
A:AZ629:  'prompt for user input
A:AV630:  "*
A:AX630:  'day_cell
A:AY630:  [W11] 'pri_day
A:AZ630:  'range name to which user input returned
A:AV631:  "*
A:AX631:  (L) 'day_yr
A:AY631:  [W11] 94
A:AZ631:  (L) '2-digit year from previous user input
A:AV632:  "*
A:AX632:  (L) 'day_mo
A:AY632:  [W11] 2
A:AZ632:  (L) '2-digit month from previous user input
A:AV633:  "*
A:AV634:  "*
A:AW634:  'locals
A:AX634:  'day_value
A:AY634:  [W11] 28
A:AZ634:  'the user-input value that is returned to "mo_cell"
A:AV635:  "*
A:AX635:  (L) 'day_max
A:AY635:  (F0) [W11] 28
```

```
A:AZ635: (L) 'maximum number of days in month defined by day_yr and day_mo
A:AV636: "*
A:AX636: 'day_error
A:AY636: [W11] @REPLACE("The day must be an integer between 1 and ",41,0,@STRING(DAY_MAX,0))
A:AV637: "*
A:AV638: "*
A:AW638: 'get_day
A:AX638: (L) '{DEFINE day_msg:s,day_cell:s,day_yr:v,day_mo:v}
A:AY638: (L) [W11] '{DEFINE day_msg:s,day_cell:s,day_yr:v,day_mo:v}
A:AV639: "*
A:AX639: (L) '{LET day_max,@if(day_mo=12,31,@date(day_yr,day_mo+1,1)-@date(day_yr,day_mo,1))}-
A:AV640: "*
A:AW640: "day_loop:
A:AX640: (L) '{GETNUMBER day_msg,day_value}
A:AV641: "*
A:AX641: '{IF @iserr(day_value)}{LET err_msg,day_error}{error}{BRANCH day_loop}
A:AV642: "*
A:AX642: (L) '{IF day_value<1#or#day_value>day_max#or#day_value<>@int(day_value)}{LET err_msg,day_error}{error}{BRANCH day_loop}
A:AV643: "*
A:AX643: '{LET @cell("contents",day_cell),day_value}
A:AV644: "*
A:AX644: '{RETURN}
A:AV645: "*
A:AW645: \*
A:AX645: \*
A:AY645: [W11] \*
A:AZ645: \*
A:BA645: \*
A:BB645: \*
A:BC645: \*
A:BD645: \*
A:BE645: \*
A:AV646: "*
A:AW646: 'name
A:AX646: 'get_amount
A:AV647: "*
A:AW647: 'purpose
A:AX647: 'gets user-input dollar amount and does error checking
A:AV648: "*
A:AW648: 'called by
A:AX648: 'init, add_opeb, add_db, add_reimb, add_prem, pr_repo, delete
A:AV649: "*
A:AW649: 'calls
A:AX649: '--
A:AV650: "*
A:AW650: \*
A:AV651: "*
A:AW651: 'args
A:AX651: 'amt_msg
A:AY651: [W11] 'Amount of OPEB expense?
A:AZ651: 'prompt for user input
A:AV652: "*
```

```
A:AX652: 'amt_cell
A:AY652: [W11] 'rec_amt
A:AZ652: 'range name to which user input returned
A:AV653: "*
A:AV654: "*
A:AW654: 'locals
A:AX654: 'amt_value
A:AY654: [W11] 0
A:AZ654: 'the user-input value that is returned to "mo_cell"
A:AV655: "*
A:AX655: 'amt_error
A:AY655: (L) [W11] 'dollar amounts must be non-negative numbers
A:AV656: "*
A:AV657: "*
A:AV658: "*
A:AW658: 'get_amt
A:AX658: '{DEFINE amt_msg:s,amt_cell:s}
A:AV659: "*
A:AW659: "amt_loop:
A:AX659: '{GETNUMBER amt_msg,amt_value}
A:AV660: "*
A:AX660: '{IF @iserr(amt_value)}{LET err_msg,amt_error}{error}{BRANCH amt_loop}
A:AV661: "*
A:AX661: '{IF amt_value<0}{LET err_msg,amt_error}{error}{BRANCH amt_loop}
A:AV662: "*
A:AX662: '{LET @cell("contents",amt_cell),amt_value}
A:AV663: "*
A:AX663: '{RETURN}
A:AV664: "*
A:AW664: \*
A:AX664: \*
A:AY664: [W11] \*
A:AZ664: \*
A:BA664: \*
A:BB664: \*
A:BC664: \*
A:BD664: \*
A:BE664: \*
A:AV665: "*
A:AW665: 'name
A:AX665: 'get_rate
A:AV666: "*
A:AW666: 'purpose
A:AX666: 'gets user-input rate and does error checking
A:AV667: "*
A:AW667: 'called by
A:AX667: 'init, add_int, add_tax
A:AV668: "*
A:AW668: 'calls
A:AX668: '--
A:AV669: "*
A:AW669: \*
```

```
A:AV670: "*
A:AW670: 'args
A:AX670: 'rt_msg
A:AY670: [W11] 'Initial Corporate Tax Rate (e.g., 35.5 means 35.5%)?
A:AZ670: 'prompt for user input
A:AV671: "*
A:AX671: 'rt_cell
A:AY671: [W11] 'init_tax
A:AZ671: 'range name to which user input returned
A:AV672: "*
A:AV673: "*
A:AW673: 'locals
A:AX673: 'rt_value
A:AY673: [W11] 49
A:AZ673: 'the user-input value that is returned to "mo_cell"
A:AV674: "*
A:AX674: 'rt_error
A:AY674: (L) [W11] 'rates must be decimal numbers between 0.00 and 100.00
A:AV675: "*
A:AV676: "*
A:AV677: "*
A:AW677: 'get_rate
A:AX677: '{DEFINE rt_msg:s,rt_cell:s}
A:AV678: "*
A:AW678: "rt_loop:
A:AX678: '{GETNUMBER rt_msg,rt_value}
A:AV679: "*
A:AX679: '{IF @iserr(rt_value)}{LET err_msg,rt_error}{error}{BRANCH rt_loop}
A:AV680: "*
A:AX680: '{IF rt_value<0#or#rt_value>100}{LET err_msg,rt_error}{error}{BRANCH rt_loop}
A:AV681: "*
A:AX681: '{LET @cell("contents",rt_cell),rt_value/100}
A:AV682: "*
A:AX682: '{RETURN}
A:AV683: "*
A:AW683: \*
A:AX683: \*
A:AY683: [W11] \*
A:AZ683: \*
A:BA683: \*
A:BB683: \*
A:BC683: \*
A:BD683: \*
A:BE683: \*
A:AV684: (L) "new 1/24/95 *
A:AW684: 'name
A:AX684: (L) 'client_main
A:AV685: (L) "new 1/24/95 *
A:AW685: 'purpose
A:AX685: (L) 'main macro that boots up client the system
A:AV686: (L) "new 1/24/95 *
A:AW686: 'called by
```

```
A:AX686:  '-
A:AV687:  (L) "new 1/24/95  "
A:AW687:  'calls
A:AX687:  (L) 'main
A:AV688:  (L) "new 1/24/95  "
A:AW688:  \*
A:AV689:  (L) "new 1/24/95  "
A:AW689:  (L) "client_main
A:AX689:  (L) '{ONERROR QUIT2}
A:AV690:  (L) "new 1/24/95  "
A:AX690:  (L) '{BRANCH \a}
A:AV691:  (L) "new 1/24/95  "
A:AW691:  \*
A:AX691:  \*
A:AY691:  [W11] \*
A:AZ691:  \*
A:BA691:  \*
A:BB691:  \*
A:BC691:  \*
A:BD691:  \*
A:BE691:  \*
```

What is claimed is:

1. A computerized indenture plan allocation determination, management and reporting system for determining allocations relating to an indenture plan, managing indenture plan assets and reporting allocation information to at least one administration system, the system comprising:

a controller coupled to the at least one administration system, the controller receiving indenture plan information electronically transmitted from the at least one administration system to the controller;

at least one user workstation coupled to the controller, the at least one user workstation electronically transmitting expense information to the controller;

the controller, upon receipt of the expense information, determining allocation information, devoid of loan information, for the indenture plan, determining management information as a function of the indenture plan information, and electronically transmitting the allocation information and the management information to the at least one administration system and to the at least one user workstation.

2. The system of claim 1, wherein the indenture plan information reflects a restriction to reimbursing the indenture plan owner's costs incurred in paying for health care benefits.

3. The system of claim 1 wherein the expense information is input at the user workstation by a user.

4. The system of claim 3, wherein the indenture plan information reflects a restriction to reimbursing the indenture plan owner's costs incurred in paying for health care benefits.

5. The system of claim 1 wherein the expense information is received by the user workstation from an expert system.

6. The system of claim 5, wherein the indenture plan information reflects a restriction to reimbursing the indenture plan owner's costs incurred in paying for health care benefits.

7. The system of claim 1 wherein the expense information is received by the user workstation from an applications program.

8. The system of claim 7, wherein the indenture plan information reflects a restriction to reimbursing the indenture plan owner's costs incurred in paying for health care benefits.

9. The system of claim 1 wherein the management information includes information relating to reinvestment of distributions.

10. The system of claim 9, wherein the indenture plan information reflects a restriction to reimbursing the indenture plan owner's costs incurred in paying for health care benefits.

11. The system of claim 1 wherein the management information includes information relating to exchange of a policy.

12. The system of claim 11, wherein the indenture plan information reflects a restriction to reimbursing the indenture plan owner's costs incurred in paying for health care benefits.

13. The system of claim 1 wherein the management information includes information relating to surrender of a policy.

14. The system of claim 13, wherein the indenture plan information reflects a restriction to reimbursing the indenture plan owner's costs incurred in paying for health care benefits.

15. The system of claim 1 wherein the controller includes means for preventing overdrafts.

16. The system of claim 15, wherein the indenture plan information reflects a restriction to reimbursing the indenture plan owner's costs incurred in paying for health care benefits.

17. The system of claim 1 wherein the controller includes means for prevention of an under allocation.

18. The system of claim 17, wherein the indenture plan information reflects a restriction to reimbursing the indenture plan owner's costs incurred in paying for health care benefits.

19. The system of claim 1 wherein the indenture plan information includes distribution information.

20. The system of claim 19, wherein the indenture plan information reflects a restriction to reimbursing the indenture plan owner's costs incurred in paying for health care benefits.

21. The system of claim 1 wherein the controller includes means for limiting payment of indenture plan distributions.

22. The system of claim 21, wherein the indenture plan information reflects a restriction to reimbursing the indenture plan owner's costs incurred in paying for health care benefits.

23. The system of claim 1 wherein the controller includes means retaining indenture plan distributions.

24. The system of claim 23, wherein the indenture plan information reflects a restriction to reimbursing the indenture plan owner's costs incurred in paying for health care benefits.

25. The system of claim 1 wherein the controller reconciles allocation information with the at least one administration system indenture plan information.

26. The system of claim 25, wherein the indenture plan information reflects a restriction to reimbursing the indenture plan owner's costs incurred in paying for health care benefits.

27. The system of claim 1 wherein the controller includes:

a first means for determining allocation information for the indenture plan; and a second means for determining management information as a function of the indenture plan information.

28. The system of claim 27, wherein the indenture plan information reflects a restriction to reimbursing the indenture plan owner's costs incurred in paying for health care benefits.

29. The system of claim 1 wherein the at least one user workstation receives interest rate information and electronically transmits the expense information to the controller, and the controller, upon receipt of the interest rate information, determines allocation information for the indenture plan, determines management information as a function of the indenture plan information, and electronically transmits the allocation information and the management information to the at least one administration system and to the at least one user workstation.

30. The system of claim 29, wherein the indenture plan information reflects a restriction to reimbursing the indenture plan owner's costs incurred in paying for health care benefits.

31. The system of claim 29 wherein the management information includes earned interest allocations.

32. The system of claim 31, wherein the indenture plan information reflects a restriction to reimbursing the indenture plan owner's costs incurred in paying for health care benefits.

33. The system of claim 1 wherein the at least one user workstation receives tax rate information and electronically transmits the expense information to the controller, and the controller, upon receipt of the tax rate information, determines allocation information for the indenture plan, determines management information as a function of the indenture plan information, and electronically transmits the allocation information and the management information to the at least one administration system and to the at least one user workstation.

34. The system of claim 33, wherein the indenture plan information reflects a restriction to reimbursing the indenture plan owner's costs incurred in paying for health care benefits.

35. The system of claim 33 wherein the management information includes tax expense allocations.

36. The system of claim 35, wherein the indenture plan information reflects a restriction to reimbursing the indenture plan owner's costs incurred in paying for health care benefits.

37. The system of claim 1 wherein the at least one user workstation receives accounting events and electronically transmits the expense information to the controller, and the controller, upon receipt of the accounting events, determines allocation information for the indenture plan, determines management information as a function of the indenture plan information, and electronically transmits the allocation information and the management information to the at least one administration system and to the at least one user workstation.

38. The system of claim 37, wherein the indenture plan information reflects a restriction to reimbursing the indenture plan owner's costs incurred in paying for health care benefits.

39. The system of claim 37 wherein the controller includes means restructuring asset balances.

40. The system of claim 39, wherein the indenture plan information reflects a restriction to reimbursing the indenture plan owner's costs incurred in paying for health care benefits.

41. The system of claim 37 wherein the controller includes means for complying with accounting events.

42. The system of claim 41, wherein the indenture plan information reflects a restriction to reimbursing the indenture plan owner's costs incurred in paying for health care benefits.

43. The system of claim 1 wherein the controller generates at least one report.

44. The system of claim 43, wherein the indenture plan information reflects a restriction to reimbursing the indenture plan owner's costs incurred in paying for health care benefits.

45. The system of claim 43 wherein the at least one report is generated daily.

46. The system of claim 45, wherein the indenture plan information reflects a restriction to reimbursing the indenture plan owner's costs incurred in paying for health care benefits.

47. The system of claim 43 wherein the at least one report is electronically transmitted to the at least one user workstation.

48. The system of claim 47, wherein the indenture plan information reflects a restriction to reimbursing the indenture plan owner's costs incurred in paying for health care benefits.

49. A computerized real-time indenture plan allocation determination, management and reporting system for determining allocations relating to an indenture plan, managing indenture plan assets and reporting allocation information to at least one administration system, the system comprising:

a controller coupled to the at least one administration system, the controller receiving, in real-time, indenture plan information, devoid of loan information for the indenture plan, electronically transmitted by the at least one administration system;

at least one user workstation coupled to the controller, the at least one user workstation receiving expense information and electronically transmitting, in realtime, the expense information to the controller;

the controller, upon receipt of the expense information, determining allocation information for the indenture plan, determining management information as a function of the indenture plan information, and electronically transmitting, in realtime, the allocation information and the management information to the at least one administration system and to the at least one user workstation.

50. The system of claim 49, wherein the indenture plan information reflects a restriction to reimbursing the indenture plan owner's costs incurred in paying for health care benefits.

51. A controller for managing an indenture plan, comprising:

means for electronically receiving indenture plan information from at least one administration system, the indenture plan information for an indenture plan with a spendthrift option;

means for electronically receiving expense information from one or more user workstations;

means for determining allocation information for the indenture plan, upon receipt of the expense information;

means for determining management information as a function of the indenture plan information, upon receipt of the expense information; and means for electronically transmitting the allocation information and the management information to the at least one administration system.

52. The controller of claim 51, wherein the indenture plan information reflects a restriction to reimbursing the indenture plan owner's costs incurred in paying for health care benefits.

53. The controller of claim 51 further comprising means for electronically transmitting the allocation information and the management information to the one or more user workstations.

54. The controller of claim 53, wherein the indenture plan information reflects a restriction to reimbursing the indenture plan owner's costs incurred in paying for health care benefits.

55. A system for managing an indenture plan, comprising:

means for monitoring corporate benefits paid and comparing corporate benefits paid to cumulative life insurance policy distributions to a payer of the corporate benefits; and responsive to said means, real time means for comparing unreimbursed corporate benefit expenses with life insurance policy benefits payable to determine an amount available for distribution in managing an indenture plan with a spendthrift settlement option.

56. The system of claim 55, wherein the real time means for comparing unreimbursed corporate benefits expenses with life insurance policy benefits payable to determine an amount available for distribution includes means for comparing unreimbursed corporate benefits expenses with life insurance policy benefits payable to determine an amount available for distribution limited in accordance with an indenture plan restriction the distribution reimbursing payment of the unreimbursed corporate benefits expenses.

57. The system of claim 55 further comprising:

report generation means to prepare reports as required under Generally Accepted Accounting Principles; and means to communicate and reconcile information with information stored on external computer systems.

58. The system of claim 57, wherein the real time means for comparing unreimbursed corporate benefits expenses with life insurance policy benefits payable to determine an amount available for distribution includes means for comparing unreimbursed corporate benefits expenses with life insurance policy benefits payable to determine an amount available for distribution limited in accordance with an indenture plan restriction the distribution reimbursing payment of the unreimbursed corporate benefits expenses.

59. A method for determining allocations to an indenture plan, managing indenture plan assets and reporting allocation information to at least one administration system, comprising the steps of:

electronically transmitting indenture plan information from at least one administration system to a controller;

receiving expense information at one or more user workstations;

electronically transmitting the expense information from the one or more user workstations to the controller;

determining allocation information for the indenture plan, upon receipt of the expense information;

determining management information as a function of the indenture plan information, upon receipt of the expense information; and electronically transmitting the allocation information and the management information to the at least one administration system.

60. The method of claim 59, wherein the indenture plan information reflects a restriction to reimbursing the indenture plan owner's costs incurred in paying for health care benefits.

61. A method for managing an indenture plan in real time, the method comprising:

monitoring corporate benefits paid;

comparing corporate benefits paid to cumulative life insurance policy distributions; and in real time, comparing unreimbursed corporate benefit expenses with life insurance policy benefits payable to determine an amount available for distribution in managing an indenture plan operable without a trust and devoid of a loan.

62. The method of claim 61, wherein the amount available for distribution limited in accordance with an indenture plan restriction the distribution reimbursing payment of the corporate benefits paid.

63. A method implemented on a machine comprising an electrical digital computer having a processor, the digital computer in communication with an administration system and a workstation, the method comprising the steps of:

receiving indenture plan information related to an indenture plan from the administration system;

receiving expense information from the workstation;

engaging the digital computer to process the expense information to generate allocation information for the indenture plan;

engaging the digital computer to process the indenture plan information to generate management information;

transmitting the allocation information to at least one of the administration system and the workstation; and transmitting the management information to at least one of the administration system and the workstation.

64. The method of claim 63, wherein the indenture plan information reflects a restriction to reimbursing the indenture plan owner's costs incurred in paying for health care benefits.

65. A method implemented on a machine comprising an electrical digital computer having a processor, the digital computer in communication with an administration system and a workstation, the method comprising the steps of:

electronically receiving indenture plan information related to an indenture plan from the administration system;

electronically receiving expense information from the workstation;

upon receipt of the expense information, engaging the digital computer to process the expense information in real time to generate allocation information for the indenture plan;

engaging the digital computer to process the indenture plan information to generate management information;

transmitting the allocation information to at least one of the administration system and the workstation; and transmitting the management information to at least one of the administration system and the workstation.

66. The method of claim 65, wherein the indenture plan information reflects a restriction to reimbursing the indenture plan owner's costs incurred in paying for health care benefits.

\* \* \* \* \*